United States Patent
MolavianJazi et al.

(10) Patent No.: US 12,414,113 B2
(45) Date of Patent: Sep. 9, 2025

(54) DOWNLINK CONTROL INFORMATION FOR MULTI-CELL SCHEDULING

(71) Applicant: Samsung Electronics Co., Ltd., Suwon-si (KR)

(72) Inventors: Ebrahim MolavianJazi, San Jose, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 609 days.

(21) Appl. No.: 17/805,447

(22) Filed: Jun. 3, 2022

(65) Prior Publication Data

US 2022/0408464 A1 Dec. 22, 2022

Related U.S. Application Data

(60) Provisional application No. 63/212,342, filed on Jun. 18, 2021, provisional application No. 63/211,383, filed on Jun. 16, 2021.

(51) Int. Cl.
*H04W 72/21* (2023.01)
*H04L 1/1812* (2023.01)
(Continued)

(52) U.S. Cl.
CPC ....... *H04W 72/1273* (2013.01); *H04L 1/1812* (2013.01); *H04L 5/0053* (2013.01);
(Continued)

(58) Field of Classification Search
CPC ......... H04W 72/1273; H04W 72/0446; H04W 72/0453; H04W 72/23; H04W 48/10;
(Continued)

(56) References Cited

U.S. PATENT DOCUMENTS 11,838,132 B2 * 12/2023 Yeo ............... H04L 1/1812
2019/0253124 A1 * 8/2019 Awada ............ H04L 1/1621
(Continued)

FOREIGN PATENT DOCUMENTS

| WO | 2020037207 A1 | 2/2020 |
| WO | 2020215108 A2 | 10/2020 |
| WO | WO2021029738 A1 | 2/2021 |

OTHER PUBLICATIONS

3GPP TSG-RAN WG1#89, R1-1707291 Title:Discussion on DCI formats for sTTI scheduling (Year: 2017).*
(Continued)

*Primary Examiner* — Faruk Hamza
*Assistant Examiner* — Abusayeed M Haque

(57) ABSTRACT

Methods and apparatuses for down-link control information (DCI) for multi-cell scheduling. A method includes receiving first information for a first number of sets of serving cells, a first physical downlink control channel (PDCCH) providing a first downlink control information (DCI) format on a first cell, and a second PDCCH providing a second DCI format on a second cell; determining: parameters for reception or transmission of first physical downlink shared channels (PDSCHs) or physical uplink shared channel (PUSCHs), respectively, on a first set of serving cells based on the first DCI format, and parameters for reception or transmission of a second PDSCH or PUSCH, respectively, on the second cell based on the second DCI format. The method further includes receiving the first PDSCHs or transmitting the first PUSCHs on the first set of serving cells and receiving the second PDSCH or transmitting the second PUSCH on the second cell.

20 Claims, 16 Drawing Sheets

(51) Int. Cl.
   *H04L 5/00*      (2006.01)
   *H04W 8/24*      (2009.01)
   *H04W 72/0446*   (2023.01)
   *H04W 72/0453*   (2023.01)
   *H04W 72/1263*   (2023.01)
   *H04W 72/1273*   (2023.01)
   *H04W 72/23*     (2023.01)

(52) U.S. Cl.
   CPC ... *H04W 72/0446* (2013.01); *H04W 72/0453* (2013.01); *H04W 72/23* (2023.01)

(58) Field of Classification Search
   CPC ..... H04W 72/231; H04W 72/21; H04W 8/24; H04W 72/1263; H04L 5/0053; H04L 5/0094
   See application file for complete search history.

(56) References Cited

U.S. PATENT DOCUMENTS

| | | | |
|---|---|---|---|
| 2019/0349149 A1* | 11/2019 | Nam | H04W 72/23 |
| 2020/0053757 A1* | 2/2020 | Bagheri | H04L 5/10 |
| 2021/0014839 A1* | 1/2021 | Yang | H04L 5/0032 |
| 2021/0044397 A1 | 2/2021 | Khoshnevisan et al. | |
| 2022/0124786 A1* | 4/2022 | Mukherjee | H04W 74/0833 |
| 2022/0174624 A1* | 6/2022 | Wu | H04L 5/0094 |
| 2022/0287054 A1 | 9/2022 | Kim et al. | |

OTHER PUBLICATIONS

3GPP TSG RAN WG1 Meeting#60, R1-101423 Title:PUSCH resource allocation (Year: 2010).*
Extended European Search Report issued Aug. 2, 2024 regarding Application No. 22825355.5, 13 pages.
Ericsson, "Rel. 18 MIMO work item proposals", 3GPP TSG-RAN WG1 Meeting #104bis-e, R1-2103668, Apr. 2021, 9 pages.
TCL communication, "Enhancements on Multi-TRP for PDCCH, PUCCH and PUSCH", 3GPP TSG RAN WG1 Meeting #104bis-e, R1-2103660, Apr. 2021, 7 pages.
"3rd Generation Partnership Project; Technical Specification Group Radio Access Network; NR; User Equipment (UE) radio access capabilities (Release 16)", 3GPP TS 38.306 V16.4.0, Mar. 2021, 151 pages.
Moderator (OPPO), "Summary of email thread [IOI-e-NR-eMIMO-multiTRP-02]", 3GPP TSG RAN WG1 #101, R1-2004908, May 2020, 12 pages.
Moderator (Nokia, Nokia Shanghai Bell), "Summary #3 of Multi-TRP PUCCH and PUSCH Enhancements", 3GPP TSG RAN WG1 #105-e, R1-2106075, May 2021, 20 pages.
International Search Report and Written Opinion issued Sep. 27, 2022 regarding International Application No. PCT/KR2022/008556, 6 pages.
Nec, "Multi-cell PDSCH scheduling via a single DCI ", 3GPP TSG RAN WG1#105-e, R1-2105412, May 2021, 4 pages.
NTT Docomo, Inc., "Discussion on multi-cell PDSCH scheduling via a single DCI for NR DSS", 3GPP TSG RAN WG1#105-e, R1-2105724, May 2021, 3 pages.
"5G; NR; Physical channels and modulation (3GPP TS 38.211 version 16.5.0, Release 16)", ETSI TS 138 211 V16.5.0, Apr. 2021, 138 pgs.
"5G; NR; Multiplexing and channel coding (3GPP TS 38.212 version 16.5.0 Release 16)", ETSI TS 138 212 V16.5.0, Apr. 2021, 155 pages.
"5G; NR; Physical layer procedures for control (3GPP TS 38.213 version 16.5.0 Release 16)", ETSI TS 138 213 V16.5.0, Apr. 2021, 188 pages.
"5G; NR; Physical layer procedures for data (3GPP TS 38.214 version 16.5.0 Release 16)", ETSI TS 138 214 V16.5.0, Apr. 2021, 173 pages.
"5G; NR; Medium Access Control (MAC) protocol specification (3GPP TS 38.321 version 16.4.0 Release 16)", ETSI TS 138 321 V16.4.0, Apr. 2021, 159 pages.
"5G; NR; Radio Resource Control (RRC); Protocol specification (3GPP TS 38.331 version 16.4.1 Release 16)", ETSI TS 138 331 V16.4.1, Apr. 2021, 932 pages.
"5G; NR; NR and NG-RAN Overall description; Stage-2 (3GPP TS 38.300 version 16.5.0 Release 16)", ETSI TS 138 300 V16.5.0, Apr. 2021, 153 pages.

* cited by examiner

DOWNLINK CONTROL INFORMATION FOR MULTI-CELL SCHEDULING

CROSS-REFERENCE TO RELATED APPLICATION AND CLAIM OF PRIORITY

This application claims priority under 35 U.S.C. § 119(e) to U.S. Provisional Patent Application No. 63/211,383 filed on Jun. 16, 2021 and U.S. Provisional Patent Application No. 63/212,342 filed on Jun. 18, 2021. The above-identified provisional patent applications are hereby incorporated by reference in their entirety.

TECHNICAL FIELD

The present disclosure relates generally to wireless communication systems and, more specifically, the present disclosure relates to downlink control information (DCI) design for multi-cell scheduling as well as multi-cell scheduling information over a data channel.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to DCI design for multi-cell scheduling.

In one embodiment, a method is provided. The method includes receiving first information for a first number of sets of serving cells, a first physical downlink control channel (PDCCH) on a first cell, and a second PDCCH on a second cell. The first PDCCH provides a first downlink control information (DCI) format. The second PDCCH provides a second DCI format. The first cell and the second cell are different. The method further includes determining parameters for reception of first physical downlink shared channels (PDSCHs) or for transmission of first physical uplink shared channel (PUSCHs) on a first set of serving cells from the first number of sets of serving cells based on values of fields of the first DCI format, and parameters for reception of a second PDSCH or for transmission of a second PUSCH on the second cell based on values of fields of the second DCI format. The second cell is from the first set of serving cells. The method further includes receiving the first PDSCHs or transmitting the first PUSCHs on the first set of serving cells and receiving the second PDSCH or transmitting the second PUSCH on the second cell.

In another embodiment, a user equipment (UE) is provided. The UE includes a transceiver configured to receive first information for a first number of sets of serving cells, a first PDCCH on a first cell, and a second PDCCH on a second cell. The first PDCCH provides a first DCI format. The second PDCCH provides a second DCI format. The first cell and the second cell are different. The UE further includes a processor configured to determine: parameters for reception of first PDSCHs or for transmission of first PUSCHs on a first set of serving cells from the first number of sets of serving cells based on values of fields of the first DCI format, and parameters for reception of a second PDSCH or for transmission of a second PUSCH on the second cell based on values of fields of the second DCI format, wherein the second cell is from the first set of serving cells. The transceiver is further configured to receive the first PDSCHs or transmit the first PUSCHs on the first set of serving cells and receive the second PDSCH or transmit the second PUSCH on the second cell.

In yet another embodiment, a base station is provided. The base station includes a transceiver configured to transmit first information for a first number of sets of serving cells, a first PDCCH on a first cell, and a second PDCCH on a second cell. The first PDCCH provides a first DCI format. The second PDCCH provides a second DCI format. The first cell and the second cell are different. The base station further includes a processor configured to determine parameters for transmission of first PDSCHs or for reception of first PUSCHs on a first set of serving cells from the first number of sets of serving cells based on values of fields of the first DCI format, and parameters for transmission of a second PDSCH or for reception of a second PUSCH on the second cell, that is from the first number of sets of serving cells, based on values of fields of the second DCI format. The transceiver is further configured to transmit the first PDSCHs or receive the first PUSCHs on the first set of serving cells and transmit the second PDSCH or receive the second PUSCH on the second cell.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
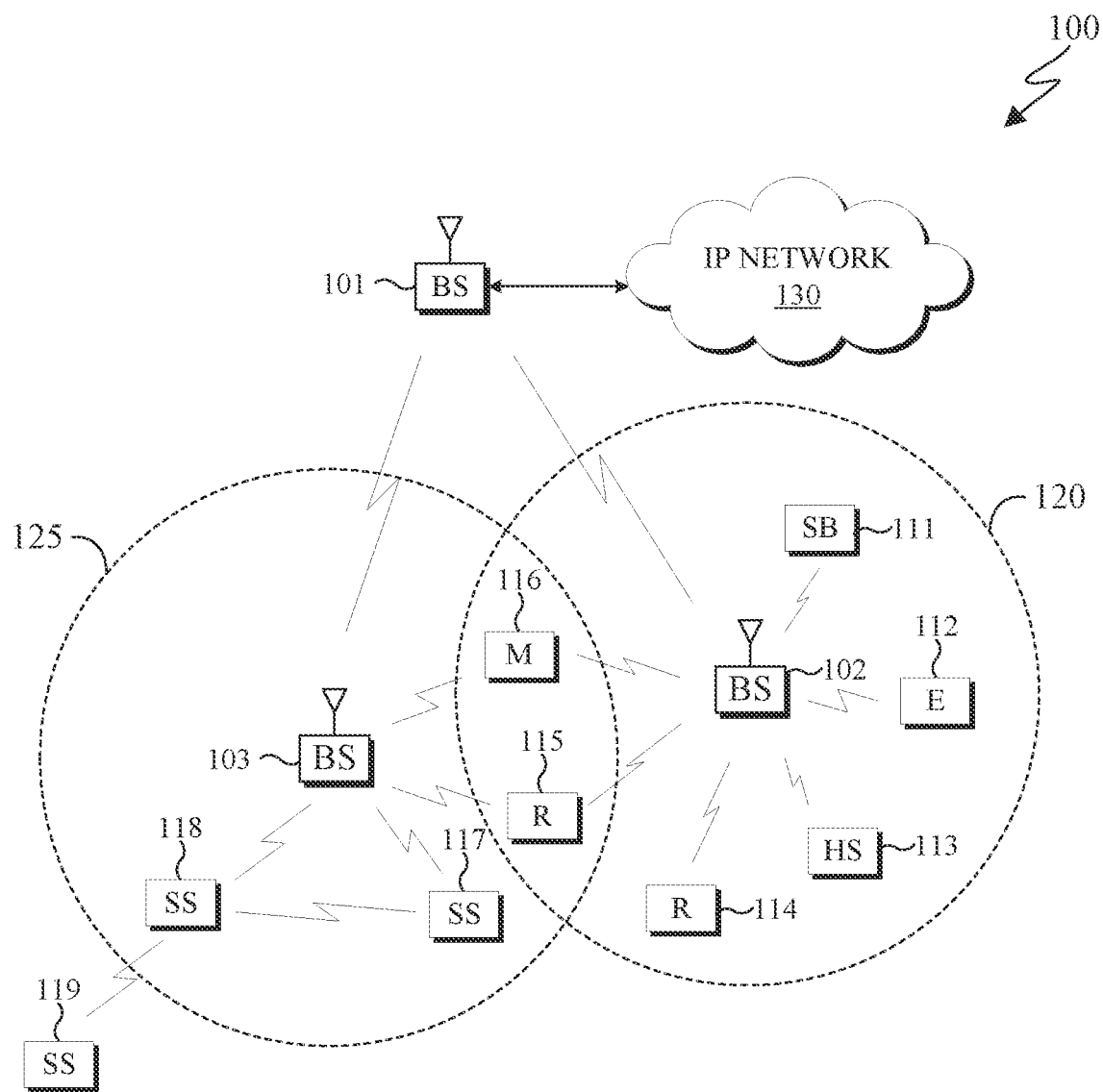
FIG. 1 illustrates an example wireless network according to embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 Rel-16 v16.5.0, "NR; Physical channels and modulation" (REF1); 3GPP TS 38.212 Rel-16 v16.5.0, "NR; Multiplexing and channel coding" (REF2); 3GPP TS 38.213 Rel-16 v16.5.0, "NR; Physical layer procedures for control" (REF3); 3GPP TS 38.214 Rel-16 v16.5.0, "NR; Physical layer procedures for data" (REF4); 3GPP TS 38.321 Rel-16 v16.4.0, "NR; Medium Access Control (MAC) protocol specification" (REF5); 3GPP TS 38.331 Rel-16 v16.4.1, "NR; Radio Resource Control (RRC) protocol specification" (REF6); and 3GPP TS 38.300 Rel-16 v16.5.0, "NR; NR and NG-RAN Overall Description; Stage 2" (REF7).

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point, a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

Figure 2:
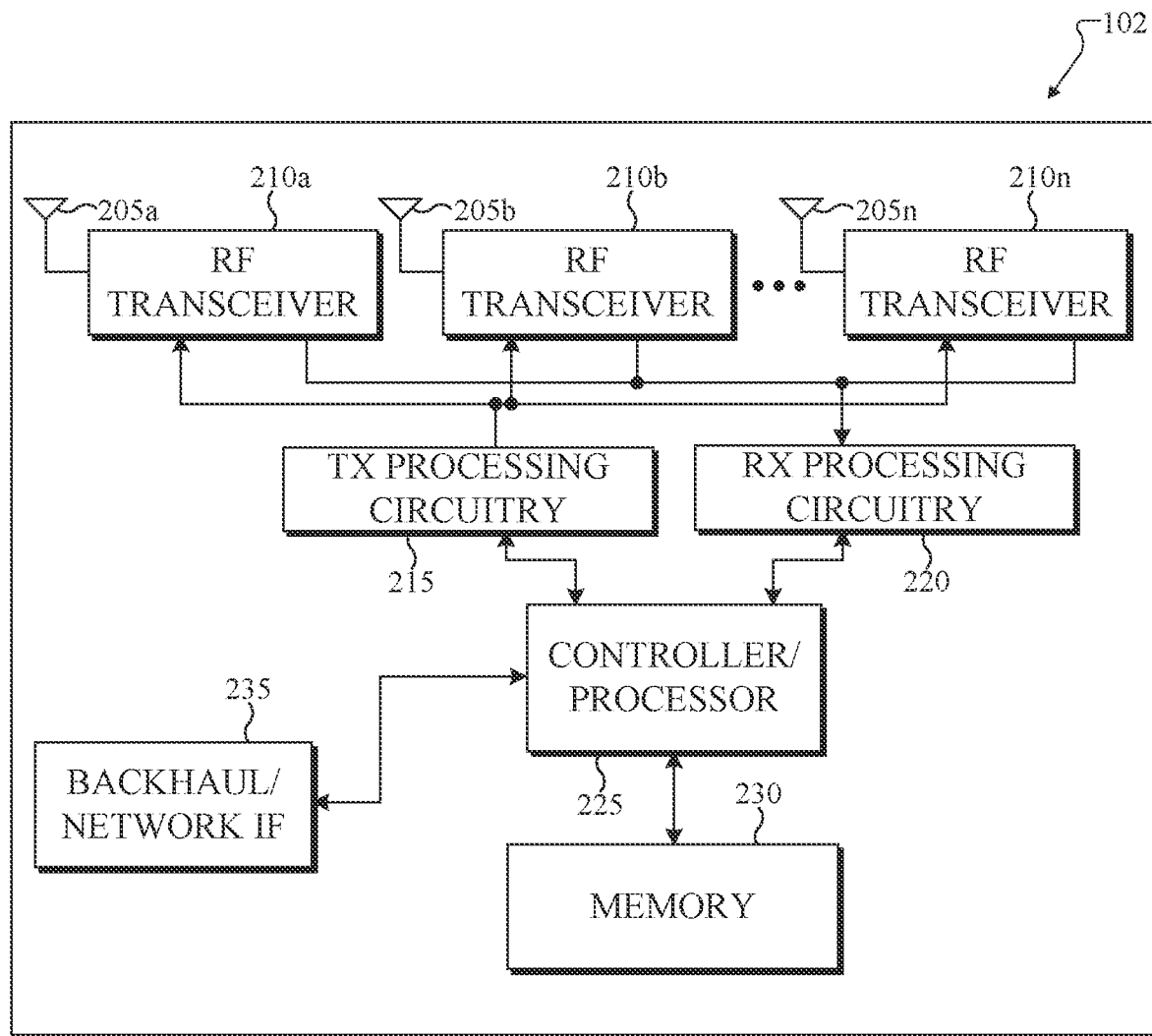
FIG. 2 illustrates an example base station (BS) according to embodiments of the present disclosure.
Figure 3:
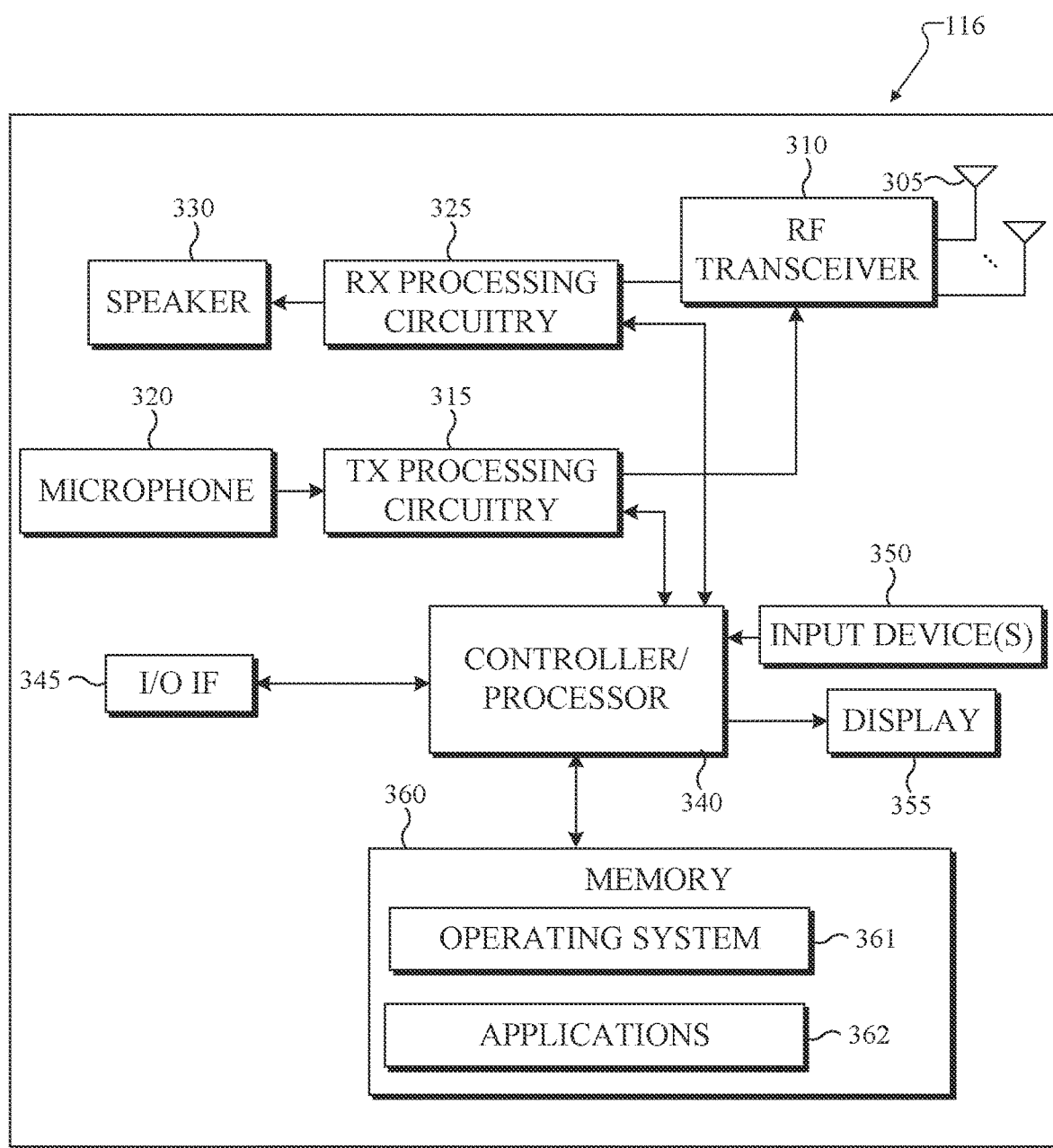
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes various gNodeB (bNG) such a base station, BS 101, a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-119 include circuitry, circuitry, programing, or a combination thereof for DCI design for multi-cell scheduling as well as multi-cell scheduling with scheduling information over data channel. In certain embodiments, and one or more of the BSs 101-103 includes circuitry, programing, or a combination thereof for DCI design for multi-cell scheduling as well as multi-cell scheduling with scheduling information over data channel.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support DCI design for multi-cell scheduling as well as multi-cell scheduling with scheduling information over data channel. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities, such as web real time communications (RTC). For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of the BS 102 (implemented using the RF transceivers 210a-210n, TX processing circuitry 275, and/or RX processing circuitry 270) support communication with aggregation of frequency division duplex (FDD) cells and time division duplex (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
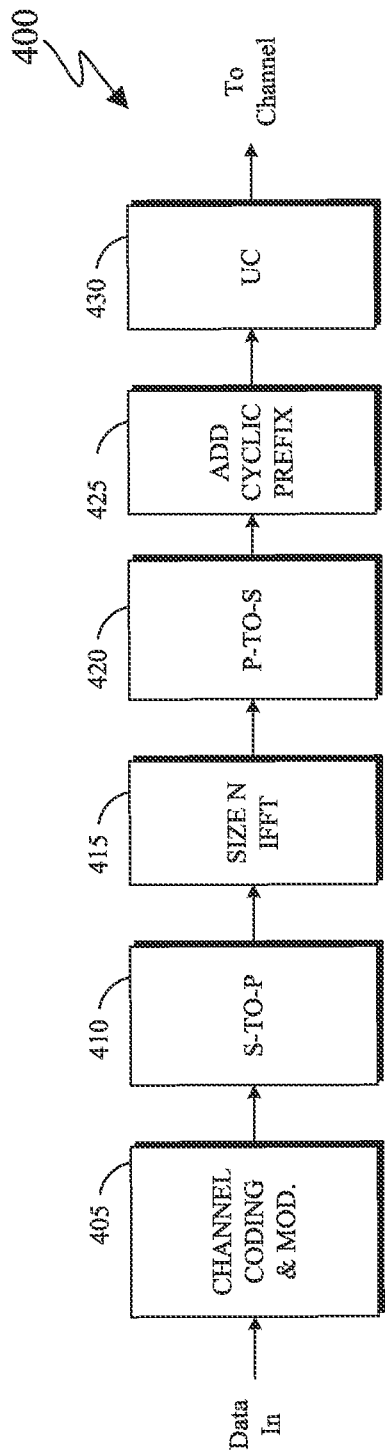
FIGS. 4 and 5 illustrate example wireless transmit and receive paths according to embodiments of the present disclosure.
Figure 5:
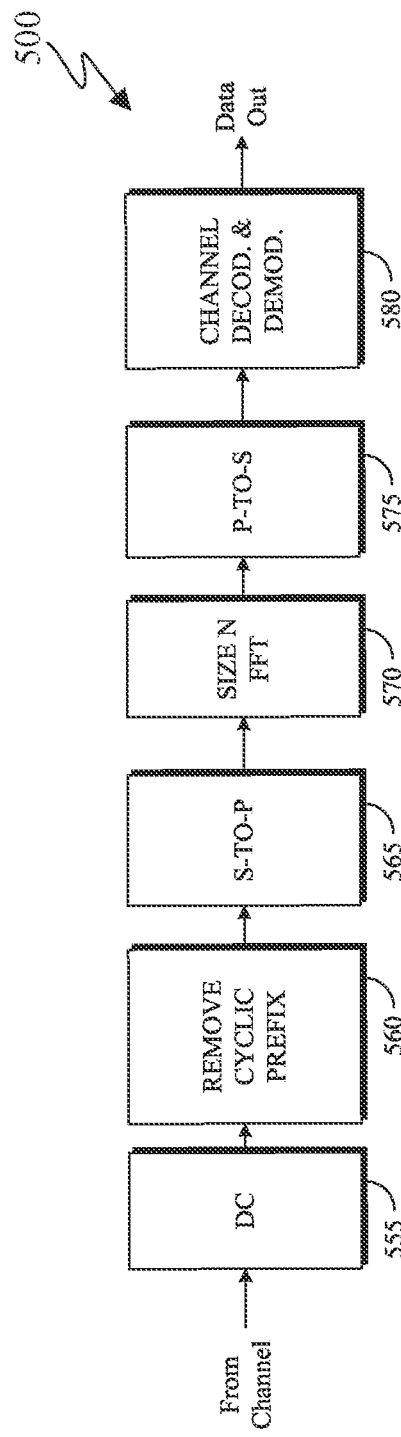

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support DCI design for multi-cell scheduling as well as multi-cell scheduling with scheduling information over data channel as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BSs 101-103 and may implement the receive path 500 for receiving in the downlink from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Embodiments of the present disclosure relates to a pre-5th-Generation (5G) or 5G or beyond 5G communication system to be provided for supporting one or more of: higher data rates, lower latency, higher reliability, improved coverage, and massive connectivity, and so on. Various embodiments apply to UEs operating with other radio access technologies (RATs) and/or standards, such as different releases/generations of 3GPP standards (including beyond 5G, 5G Advanced, 6G, and so on), IEEE standards (such as 802.16 WiMAX and 802.11 Wi-Fi and so on), and so forth.

Embodiments of the present disclosure considers enhancements for cross-carrier scheduling operation in a carrier aggregation (CA) framework to support joint scheduling of multiple cells.

Embodiments of the present disclosure take into consideration that in legacy 5G NR systems, a downlink or uplink data transmission can be scheduled only for a single serving cell. In other words, a DCI format provides scheduling information parameters for a PDSCH or a physical uplink shared channel (PUSCH) on a single serving cell. If the serving cell is a scheduled cell, the UE receives a DCI format for the PDSCH/PUSCH in a physical downlink control channel (PDCCH) that the UE receives on a corresponding scheduling cell. Based on a carrier indication field (CIF) in the DCI format, the UE can determine a serving cell on which the UE can receive the PDSCH or transmit the PUSCH.

However, legacy NR system does not support joint scheduling of multiple PDSCHs or multiple PUSCH on multiple cells using a single/common control signaling, such as by using a single DCI format. For such operation, the UE receives multiple DCI formats, wherein each DCI format can schedule one of the multiple PDSCHs or PUSCHs. Such operation achieves the intended outcome, but with possibly high signaling overhead. In various scenarios, it is possible that several scheduling parameters or corresponding UE operations are shared/common among the multiple PDSCHs or PUSCHs on the jointly scheduled cells, referred to as co-scheduled cells.

For example, the UE may use a same physical uplink control channel (PUCCH) resource to transmit hybrid automatic repeat request (HARQ)—acknowledgement (ACK) feedback corresponding to the multiple PDSCHs. Therefore, an indication for the same PUCCH resource (and corresponding operations for PUCCH transmission) may be unnecessarily repeated multiple times. In addition, in some scenarios, such as intra-band CA, it is likely that physical channel conditions are correlated, so various scheduling parameters pertaining link adaptation, MIMO/beamforming operation, and even possibly resource allocation can be common and repeated among the co-scheduled cells. Such unnecessary overhead in control signaling can be significant, especially when the number of co-scheduled cells are large, such as 4-8 cells. Last but not least, cyclic redundancy check (CRC) field needs to be repeated multiple times, which incurs significant signaling overhead, especially for large number of co-scheduled cells.

Therefore, embodiments of the present disclosure take into consideration that there is a need for multi-cell scheduling, wherein multiple cells can be jointly scheduled using reduced signaling overhead, such as by using only a single DCI format.

Embodiments of the present disclosure also take into consideration that there is a need to achieve multi-cell scheduling using a reasonable DCI format size, possibly same as a legacy DCI format size or slightly larger, while at the same time, the scheduling flexibility is not significantly compromised (or reasonably maintained) compared to a scenario with multiple separate (legacy) DCI formats for each cell.

Embodiments of the present disclosure further take into consideration that there is a need to take into account a number of co-scheduled cells and a relative similarity of channel/radio conditions among the co-scheduled cells, when designing a method for multi-cell scheduling.

Accordingly, the present disclosure provides methods and apparatus for multi-cell scheduling with reduced signaling overhead.

The present disclosure describes methods where a single-cell-scheduling DCI format schedules a first PDSCH on a first cell, and the first PDSCH includes scheduling information for a number of PDSCHs/PUSCHs on a number of co-scheduled cells. Scheduling information for the number of PDSCHs/PUSCHs can be provided in a number of modified DCIs (M-DCIs), each of which include full or partial scheduling information for a PDSCH/PUSCH from the number of PDSCHs/PUSCHs. In one option, the M-DCIs are included in a medium access control (MAC) control element (CE) in the first PDSCH. In another option, the M-DCIs are multiplexed in time/frequency resources of the first PDSCH. In the latter case, physical layer processing, such as coding, modulation, scrambling, and so on, for the M-DCIs can be same as or separate from that for the first PDSCH. In addition, the UE receives information about rate matching and resource allocation procedure for the M-DCIs that are multiplexed in the first PDSCH, so that the UE can identify and decode the M-DCIs.

The disclosure also describes methods for configuration or indication of a set of cells that are jointly scheduled, referred to as co-scheduled cells. The disclosure also explains various cell-common scheduling parameters that have common values applicable to all co-scheduled cells, and various cell-specific scheduling parameters that have individual values that are separately provided and applied for each co-scheduled cell.

Additionally, several approaches are disclosed for an enhanced multi-cell scheduling that provide values for scheduling parameters for multiple PDSCHs or multiple PUSCHs on multiple co-scheduled cells. The first approach considers concatenated DCI formats, wherein few DCI formats are appended to generate a DCI format for multi-cell scheduling. The Second approach relies on multi-cell mapping, wherein some DCI fields in a DCI format can be interpreted as multiple values for multiple co-scheduled cells, based on one-to-many configured mappings/tables, or configured offset parameters.

One motivation for multi-cell scheduling using a single DCI format is enhanced cross-carrier scheduling operation for larger number of cells, such as 4-8 cells, operating in an intra-band CA framework in frequency bands below 6 GHz or above 6 GHz, referred to as FR1 or FR2, respectively. In general, the embodiments apply to any deployments, verticals, or scenarios including inter-band CA, with eMBB, ultra reliable and low latency communication (URLLC) and industrial internet of things (IIoT) and extended reality (XR), massive machine type communication (mMTC), and internet of things (IoT), with sidelink/vehicle to anything (V2X) communications, with multi-TRP/beam/panel, in unlicensed/shared spectrum (NR-U), for non-terrestrial networks (NTN), for aerial systems such as unmanned aerial vehicles (UAVs) such as drones, for private or non-public networks (NPN), for operation with reduced capability (RedCap) UEs, and so on.

Embodiments of the disclosure for supporting multi-cell scheduling with reduced signaling overhead are summarized in the following and are fully elaborated further below. Combinations of the embodiments are also applicable but they are not described in detail for brevity.

For example, various embodiments described in greater detail below describes multi-cell scheduling operation as well as an indication of co-scheduled cells. For instance, a UE (such as the UE 116) can be provided one or more sets of co-scheduled cells by higher layers. The term set of co-scheduled cells is used to refer to a set of serving cells wherein the UE can be scheduled PDSCH receptions or PUSCH transmissions on two or more cells from the set of co-scheduled cells by a single DCI format, or by using complementary methods such as those described below. It is also possible that a PDSCH reception or a PUSCH transmission on any cell from the set of co-scheduled cells is scheduled by a DCI format that does not schedule any other PDSCH reception or PUSCH transmission on any other cells from the set of co-scheduled cells, such as for example by a DCI format not having a multi-cell scheduling capability or when there is no traffic associated with the other cells at a given time. Additionally, the UE can be indicated via a DCI format in a Physical Downlink Control Channel (PDCCH) or via a MAC CE in a PDSCH a subset of a set of co-scheduled cells, wherein cells of the subset can change across different PDCCH monitoring occasions, for example, as indicated by a corresponding DCI format.

For another example, various embodiments described in greater detail below describe single-cell DCI pointing to a PDSCH with multi-cell scheduling. For instance, a UE (such as the UE 116) can be provided information for multi-cell scheduling using a single-cell scheduling DCI format, namely a DCI format that schedules a first PDSCH on a first cell, wherein the first PDSCH includes scheduling information for reception of second PDSCH(s) or transmission of second PUSCH(s) on a subset from one or more sets of co-scheduled cells. This approach can be beneficial, for example, for co-scheduling several (such as 4-8) cells that have different channel characteristics or configurations, such as for inter-band CA operation.

For another example, various embodiments described in greater detail below describe a first option MAC CE for multi-cell scheduling. For instance, in a first option, the first PDSCH includes a MAC CE that provides scheduling information for the number of PDSCH(s) or PUSCH(s). Accordingly, the MAC CE can include a number of modified DCIs (M-DCIs), wherein each M-DCI includes full or partial scheduling information for a PDSCH/PUSCH from the number of PDSCH(s)/PUSCH(s).

For another example, various embodiments described in greater detail below describe a second option for multi-cell scheduling information multiplexed in a PDSCH. For instance, in a second option, the UE receives a first PDSCH that is scheduled by a single-cell scheduling DCI format, and the UE receives additional scheduling information for one or more PDSCH(s)/PUSCH(s) on one or more respective co-scheduled cell(s). For example, the additional scheduling information can be multiplexed in one or more respective time/frequency resource group(s) from the time/frequency resources allocated to the first PDSCH.

For another example, various embodiments described in greater detail below describe a physical layer processing for multi-cell scheduling information multiplexed in a PDSCH. For instance, physical layer processing of M-DCI(s) that are included in a PDSCH can be same as that for a DCI in a PDCCH, such as for the DCI scheduling the PDSCH, or can be same as that for data information/transport block in the PDSCH. Herein, physical layer processing refers to, for example, modulation, coding, scrambling, and so on.

For another example, various embodiments described in greater detail below describe resource allocation and rate matching for multi-cell scheduling information multiplexed on a PDSCH. For instance, a UE (such as the UE 116) can determine a number of coded modulation symbols corresponding to multi-scheduling information, such as M-DCIs, that are multiplexed in a first PDSCH scheduled by a single-cell scheduling DCI format, based on a scaling factor $\beta_{offset}^{PDSCH} = \beta_{offset}^{M-DCI}$ applied to a total (coded) payload size for the M-DCIs. Such scaling factor determines an effective channel coding rate of M-DCIs multiplexed on the first PDSCH, for flexible link adaptation and improved reliability of the M-DCIs according to physical channel conditions. The UE allocates the coded modulation symbols for M-DCIs to time/frequency resources within the first PDSCH, in a frequency-first, time-second manner, except for reserved resources corresponding to reference signals or other cell broadcast transmissions. The UE can start receiving the M-DCIs in a first symbol of the first PDSCH, or in a first symbol after first symbols with demodulation reference signal (DM-RS) REs in the first PDSCH.

For another example, various embodiments described in greater detail below describe cell-common vs. cell-specific scheduling parameters, including differential indication. For instance, a UE (such as the UE 116 that is configured for multi-cell scheduling by a single DCI format, can be provided a first set of cell-common scheduling information parameters (DCI format fields) whose values apply to all co-scheduled cells, and a second set of cell-specific scheduling information parameters with individual values for each of the co-scheduled cells. It is also possible that a DCI format for multi-cell scheduling also includes fields with values that are applicable per group of cells from the set of co-scheduled cells, wherein each group of cells is configured or indicated to the UE. The UE can determine DCI format fields with values that are cell-common or cell-group-specific or cell-specific based on the specifications of the system operation or based on information by higher layers. For fields with cell-specific values, the UE can be provided differential values for some cells, or for all cells except a first cell, relative to a value for the first cell, such as for example, a modulation and coding scheme (MCS) value when the physical channel/band conditions are correlated.

For another example, various embodiments described in greater detail below describe methods for providing scheduling information for multi-cell scheduling. For instance, for a UE (such as the UE 116) that is configured a set of co-scheduled cells, a DCI format for multi-cell scheduling can provide full or partial information for values of cell-common and cell-specific fields for scheduling PDSCH receptions or PUSCH transmissions on respective one or more cells from the set of co-scheduled cells. When the DCI format provides partial information, the UE can determine remaining information from RRC signaling, or by using other complementary methods.

For another example, various embodiments described in greater detail below describe a first approach by concatenating DCI format for multi-cell scheduling. For instance, a DCI format for multi-cell scheduling can provide separate values of fields for each of the multiple co-scheduled cells. A first value corresponds to a first cell, a second value corresponds to a second cell, and so on. Therefore, DCI format fields for the multiple cells are concatenated, thereby referring to such DCI format as a concatenated DCI format for multi-cell scheduling. This approach can be beneficial, for example, for co-scheduling cells that have different channel characteristics or configurations, such as for interband CA operation, or for co-scheduling a PDSCH reception and a PUSCH transmission.

For another example, various embodiments described in greater detail below describe a second approach by multi-cell scheduling via multi-cell mapping. For instance, a UE (such as the UE 116) can be provided information for multi-cell scheduling of multiple PDSCHs/PDCCHs on multiple respective cells using a multi-cell mapping, wherein a field in a DCI format can be interpreted to provide multiple values for a corresponding scheduling parameter for the multiple co-scheduled cells. Such interpretation can be based on a configured one-to-many mapping/table or based on multiple configured offset values for respective cells that are applied to a reference value indicated by the DCI format. This approach can be beneficial, for example, for co-scheduling cells that have several similar physical channel characteristics or configurations, such as for intraband CA operation.

As used here, the term "configuration" or "higher layer configuration" and variations thereof (such as "configured" and so on) are used to refer to one or more of: a system information signaling such as by a Master Information Block (MIB) or a system information block (SIB) (such as SIB1), a common or cell-specific higher layer/RRC signaling, or a dedicated or UE-specific or bandwidth part (BWP)-specific higher layer/RRC signaling.

Additionally, as used herein the term signal quality is used to refer to e.g., reference signal received power (RSRP) or reference signal received quality (RSRQ) or received signal strength indicator (RSSI) or signal to noise ratio (SNR) or signal to interference and noise ratio (SINR), with or without filtering such as L1 or L3 filtering, of a channel or a signal such as a reference signal (RS) including synchronized signal (SS) physical broadcast channel (PBCH) (also denoted as SS/PBCH block or SSB), channel state information reference signal (CSI-RS), or sounding reference signal (SRS).

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

In absence of CSI-RS configuration, and unless otherwise configured, the UE may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same code division multiplexing (CDM) group are quasi co-located with respect to Doppler shift, Doppler spread, average delay, delay spread, and spatial Rx. The UE may also assume that DM-RS ports associated with a PDSCH are quasi co-location (QCL) with QCL Type A, Type D (when applicable) and average gain. The UE may further assume that no DM-RS collides with the SS/PBCH block.

A UE (such as the UE 116) can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each transmission configuration indication (TCI)-State contains parameters for configuring a QCL relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first downlink (DL) RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info.

For example, a quasi co-location type of 'QCL-TypeA' can correspond to {Doppler shift, Doppler spread, average delay, delay spread}. For another example, a quasi co-location type of 'QCL-TypeB' can correspond to {Doppler shift, Doppler spread}. For another example, a quasi co-location type of 'QCL-TypeC' can correspond to {Doppler shift, average delay}. For yet another example, a quasi co-location type of 'QCL-TypeD' can correspond to 'QCL-TypeD': {Spatial Rx parameter}.

In certain embodiments, a UE (such as the UE 116) receives a MAC-CE activation command to map up to N, e.g., N=8 TCI states to the codepoints of the DCI field 'Transmission Configuration Indication'. When the HARQ-ACK information corresponding to the PDSCH carrying the (MAC-CE) activation command is transmitted in slot n, the indicated mapping between TCI states and codepoints of the DCI field 'Transmission Configuration Indication' should be applied after a MAC-CE application time, e.g., starting from the first slot that is after slot $n+3N_{slot}^{subframe,\mu}$ where $N_{slot}^{subframe,\mu}$ is a number of slot per subframe for subcarrier spacing (SCS) configuration µ.

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', then the UE may assume that the DM-RS ports of PDSCH(s) of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the qcl-Type is set to 'typeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

It is noted that if a UE is configured with enableDefaultTCIStatePerCoresetPoolIndex and the UE is configured by higher layer parameter PDCCH-Config that contains two different values of coresetPoolIndex in different ControlResourceSets, then the UE may assume that the DM-RS ports of PDSCH associated with a value of coresetPoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of coresetPoolIndex as the PDCCH scheduling that PDSCH, in the latest slot in which one or more CORESETs associated with the same value of coresetPoolIndex as the PDCCH scheduling that PDSCH within the active BWP of the serving cell are monitored by the UE. In this case, if the 'QCL-TypeD' of the PDSCH DM-RS is different from that of the PDCCH DM-RS with which they overlap in at least one symbol and they are associated with same coresetPoolIndex, the UE is expected to prioritize the reception of PDCCH associated with that CORESET. This also applies to the intra-band CA case (when PDSCH and the CORESET are in different component carriers).

It is also noted that if a UE is configured with enableTwoDefaultTCI-States, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme set to 'tdmSchemeA' or is configured with higher layer parameter repetitionNumber, and the offset between the reception of the DL DCI and the first PDSCH transmission occasion is less than the threshold timeDurationForQCL, the mapping of the TCI states to PDSCH transmission occasions is determined according to clause 5.1.2.1 by replacing the indicated TCI states with the TCI states corresponding to the lowest codepoint among the TCI codepoints containing two different TCI states based on the activated TCI states in the slot with the first PDSCH transmission occasion. In this case, if the 'QCL-TypeD' in both of the TCI states corresponding to the lowest codepoint among the TCI codepoints containing two different TCI states is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

In that above cases above, if none of configured TCI states for the serving cell of scheduled PDSCH is configured with qcl-Type set to 'typeD', the UE shall obtain the other QCL assumptions from the indicated TCI states for its scheduled PDSCH irrespective of the time offset between the reception of the DL DCI and the corresponding PDSCH.

If the PDCCH carrying the scheduling DCI is received on one component carrier, and the PDSCH scheduled by that DCI is on another component carrier: then the timeDurationForQCL is determined based on the subcarrier spacing of the scheduled PDSCH. If $\mu_{PDCCH} < \mu_{PDSCH}$ an additional timing delay $$d \frac{2^{\mu_{PDSCH}}}{2^{\mu_{PDCCH}}}$$

is added to the timeDurationForQCL, where d is defined in 5.2.1.5.1a-1, otherwise d is zero. For both the cases, when the UE is configured with enableDefaultBeamForCCS, and when the offset between the reception of the DL DCI and the corresponding PDSCH is less than the threshold timeDurationForQCL, and when the DL DCI does not have the TCI field present, the UE obtains its QCL assumption for the scheduled PDSCH from the activated TCI state with the lowest ID applicable to PDSCH in the active BWP of the scheduled cell.

For PUSCH scheduled by DCI format 0_0 on a cell and if the higher layer parameter enableDefaultBeamPL-For-PUSCH0-0 is set 'enabled', the UE is not configured with PUCCH resources on the active uplink (UL) BWP and the UE is in RRC connected mode, the UE shall transmit PUSCH according to the spatial relation, if applicable, with a reference to the RS configured with qcl-Type set to 'typeD' corresponding to the QCL assumption of the CORESET with the lowest ID on the active DL BWP of the cell.

For PUSCH scheduled by DCI format 0_0 on a cell and if the higher layer parameter enableDefaultBeamPL-For-PUSCH0 is set 'enabled', the UE is configured with PUCCH resources on the active UL BWP where all the PUCCH resource(s) are not configured with any spatial relation and the UE is in RRC connected mode, the UE shall transmit PUSCH according to the spatial relation, if applicable, with a reference to the RS configured with qcl-Type set to 'typeD' corresponding to the QCL assumption of the control resource set (CORESET) with the lowest ID on the active DL BWP of the cell in case CORESET(s) are configured on the cell.

In CA, two or more Component Carriers (CCs) are aggregated. A UE (such as the UE 116) may simultaneously receive or transmit on one or multiple CCs depending on its capabilities. For example, a UE with single timing advance capability for CA can simultaneously receive and/or transmit on multiple CCs corresponding to multiple serving cells sharing the same timing advance (multiple serving cells grouped in one Timing advance group (TAG)). For another example, a UE with multiple timing advance capability for CA can simultaneously receive and/or transmit on multiple CCs corresponding to multiple serving cells with different timing advances (multiple serving cells grouped in multiple TAGs). Next generation radio access network (NG-RAN) ensures that each TAG contains at least one serving cell. For yet another example, a non-CA capable UE can receive on a single CC and transmit on a single CC corresponding to one serving cell only (one serving cell in one TAG).

CA is supported for both contiguous and non-contiguous CCs. When CA is deployed frame timing and system frame number (SFN) are aligned across cells that can be aggregated, or an offset in multiples of slots between the primary cell (PCell)/primary secondary cell (PSCell) and a secondary cells (SCells) is configured to the UE. The maximum number of configured CCs for a UE is 16 for DL and 16 for UL.

When CA is configured, the UE only has one RRC connection with the network. At RRC connection establishment/re-establishment/handover, one serving cell provides the non-access stratum (NAS) mobility information, and at RRC connection re-establishment/handover, one serving cell provides the security input. This cell is referred to as the PCell. Depending on UE capabilities, SCells can be configured to form together with the PCell a set of serving cells. The configured set of serving cells for a UE therefore always consists of one PCell and one or more SCells.

The reconfiguration, addition, and removal of SCells can be performed by RRC. At intra-NR handover and during connection resume from RRC_INACTIVE, the network can also add, remove, keep, or reconfigure SCells for usage with the target PCell. When adding a new SCell, dedicated RRC signalling is used for sending all required system information of the SCell i.e., while in connected mode, UEs need not acquire broadcast system information directly from the SCells.

To enable reasonable UE battery consumption when CA is configured, an activation/deactivation mechanism of Cells is supported. When an SCell is deactivated, the UE does not need to receive the corresponding PDCCH or PDSCH, cannot transmit in the corresponding uplink, nor is it required to perform channel quality indicator (CQI) measurements. Conversely, when an SCell is active, the UE shall receive PDSCH and PDCCH (if the UE is configured to monitor PDCCH from this SCell) and is expected to be able to perform CQI measurements. NG-RAN ensures that while PUCCH SCell (a Secondary Cell configured with PUCCH) is deactivated, SCells of secondary PUCCH group (a group of SCells whose PUCCH signalling is associated with the PUCCH on the PUCCH SCell) should not be activated. NG-RAN ensures that SCells mapped to PUCCH SCell are deactivated before the PUCCH SCell is changed or removed.

When reconfiguring the set of serving cells SCells added to the set are initially activated or deactivated and SCells which remain in the set (either unchanged or reconfigured) do not change their activation status (activated or deactivated).

At handover or connection resume from RRC_INACTIVE, SCells are activated or deactivated.

To enable reasonable UE battery consumption when Bandwidth adaptation (BA) is configured, only one UL BWP for each uplink carrier and one DL BWP or only one DL/UL BWP pair can be active at a time in an active serving cell, all other BWPs that the UE is configured with being deactivated. On deactivated BWPs, the UE does not monitor the PDCCH, does not transmit on PUCCH, physical random access channel (PRACH) and Uplink shared channel (UL-SCH).

To enable fast SCell activation when CA is configured, one dormant BWP can be configured for an SCell. If the active BWP of the activated SCell is a dormant BWP, the UE stops monitoring PDCCH and transmitting SRS/PUSCH/PUCCH on the SCell but continues performing CSI measurements, Automatic gain control (AGC) and beam management, if configured. A DCI is used to control entering/leaving the dormant BWP for one or more SCell(s) or one or more SCell group(s).

The dormant BWP is one of the UE's dedicated BWPs configured by network via dedicated RRC signalling. The special cell (SpCell) and PUCCH SCell cannot be configured with a dormant BWP.

Cross-carrier scheduling with the CIF allows the PDCCH of a serving cell to schedule resources on another serving cell but with the following restrictions: (i) cross-carrier scheduling does not apply to PCell i.e., PCell is always scheduled via its PDCCH; (ii) when an SCell is configured with a PDCCH, that cell's PDSCH and PUSCH are always scheduled by the PDCCH on this SCell; (iii) when an SCell is not configured with a PDCCH, that SCell's PDSCH and PUSCH are always scheduled by a PDCCH on another serving cell; and (iv) the scheduling PDCCH and the scheduled PDSCH/PUSCH can use the same or different numerologies.

Some of the restrictions above may be relaxed. For example, dynamic spectrum sharing (DSS) allows LTE and NR to share the same carrier. As the number of NR devices in a network increases, it is important that sufficient scheduling capacity for NR UEs on the shared carriers is ensured. In the case of DSS operation, PDCCH enhancements for cross-carrier scheduling including can be considered such that PDCCH of an SCell, referred to as a special/scheduling SCell (sSCell), can schedule PDSCH or PUSCH on the P(S)Cell.

The PDCCH can be used to schedule DL transmissions on PDSCH and UL transmissions on PUSCH. Here the DCI on PDCCH includes downlink assignments containing at least modulation and coding format, resource allocation, and hybrid-ARQ information related to DL-SCH. The DCI on PDCCH also includes uplink scheduling grants containing at least modulation and coding format, resource allocation, and hybrid-ARQ information related to UL-SCH.

In addition to scheduling, PDCCH can be used for (i) activation and deactivation of configured PUSCH transmission with configured grant; (ii) activation and deactivation of PDSCH semi-persistent transmission; (iii) notifying one or more UEs of the slot format; (iv) notifying one or more UEs of the physical resource block(s) (PRB(s)) and OFDM symbol(s) where the UE may assume no transmission is intended for the UE; (v) transmission of transmit power control (TPC) commands for PUCCH and PUSCH; (vi) transmission of one or more TPC commands for SRS transmissions by one or more UEs; (vii) switching a UE's active bandwidth part; (viii) initiating a random access procedure; (ix) indicating the UE(s) to monitor the PDCCH during the next occurrence of the discontinuous reception (DRX) on-duration; and (x) in Integrated access and backhaul (IAB) context, indicating the availability for soft symbols of an IAB-DU.

A UE (such as the UE 116) monitors a set of PDCCH candidates in the configured monitoring occasions in one or more configured CORESETs according to the corresponding search space configurations.

A CORESET consists of a set of PRBs with a time duration of 1 to 3 OFDM symbols. The resource units Resource Element Groups (REGs) and Control Channel Elements (CCEs) are defined within a CORESET with each CCE consisting of a set of REGs. Control channels are formed by aggregation of CCE. Different code rates for the control channels are realized by aggregating different number of CCE. Interleaved and non-interleaved CCE-to-REG mapping are supported in a CORESET.

Polar coding is used for PDCCH. Each resource element group carrying PDCCH carries its own DM-RS. QPSK modulation is used for PDCCH.

A UE (such as the UE 116) monitors a set of PDCCH candidates in one or more CORESETs on the active DL BWP on each activated serving cell configured with PDCCH monitoring according to corresponding search space sets where monitoring implies decoding each PDCCH candidate according to the monitored DCI formats.

If a UE is provided monitoringCapabilityConfig for a serving cell, the UE obtains an indication to monitor PDCCH on the serving cell for a maximum number of PDCCH candidates and non-overlapping CCEs (i) per slot if monitoringCapabilityConfig=r15monitoringcapability, or (ii) per span if monitoringCapabilityConfig=r16monitoringcapability.

If the UE is not provided monitoringCapabilityConfig, the UE monitors PDCCH on the serving cell for a maximum number of PDCCH candidates and non-overlapping CCEs per slot.

A UE (such as the UE 116) can indicate a capability to monitor PDCCH according to one or more of the combinations (X, Y)=(2, 2), (4, 3), and (7, 3) per SCS configuration of $\mu=0$ and $\mu=1$. A span is a number of consecutive symbols in a slot where the UE is configured to monitor PDCCH. Each PDCCH monitoring occasion is within one span. If a UE monitors PDCCH on a cell according to combination (X, Y), the UE supports PDCCH monitoring occasions in any symbol of a slot with minimum time separation of X symbols between the first symbol of two consecutive spans, including across slots. A span starts at a first symbol where a PDCCH monitoring occasion starts and ends at a last symbol where a PDCCH monitoring occasion ends, where the number of symbols of the span is up to Y.

If a UE can support (i) a first set of $N_{cells,0}^{DL}$ serving cells where the UE is either not provided coresetPoolIndex or is provided coresetPoolIndex with a single value for all CORESETs on all DL BWPs of each scheduling cell from the first set of serving cells, and (ii) a second set of $N_{cells,1}^{DL}$ serving cells where the UE is not provided coresetPoolIndex or is provided coresetPoolIndex with a value 0 for a first CORESET, and with a value 1 for a second CORESET on any DL BWP of each scheduling cell from the second set of serving cells, then the UE determines, for the purpose of reporting pdcch-BlindDetectionCA, a number of serving cells as $N_{cells,0}^{DL}+R \cdot N_{cells,1}^{DL}$ where R is a value reported by the UE.

If a UE (such as the UE 116) indicates in UE-NR-Capability a carrier aggregation capability larger than 4 serving cells and the UE is not provided monitoringCapabilityConfig for any downlink cell or if the UE is provided monitoringCapabilityConfig=r15monitoringcapability for all downlink cells where the UE monitors PDCCH, the UE includes in UE-NR-Capability an indication for a maximum number of PDCCH candidates and for a maximum number of non-overlapped CCEs the UE can monitor per slot when the UE is configured for carrier aggregation operation over more than 4 cells. When a UE is not configured for NR-DC operation, the UE determines a capability to monitor a maximum number of PDCCH candidates and a maximum number of non-overlapped CCEs per slot that corresponds to $N_{cells}^{cap}$ downlink cells, where $N_{cells}^{cap}$ is $N_{cells,0}^{DL}+R \cdot N_{cells,1}^{DL}$ if the UE does not provide pdcch-BlindDetectionCA where $N_{cells,0}^{DL}+N_{cells,1}^{DL}$ is the number of configured downlink serving cells; otherwise, $N_{cells}^{cap}$ is the value of pdcch-BlindDetectionCA.

When a UE (such as the UE 116) is configured for NR-DC operation, the UE determines a capability to monitor a maximum number of PDCCH candidates and a maximum number of non-overlapped CCEs per slot that corresponds to $N_{cells}^{cap}=N_{cells}^{MCG}$ downlink cells for the master cell group (MCG) where $N_{cells}^{MCG}$ is provided by pdcch-BlindDetection for the MCG and determines a capability to monitor a maximum number of PDCCH candidates and a maximum number of non-overlapped CCEs per slot that corresponds to $N_{cells}^{cap}=N_{cells}^{SCG}$ downlink cells for the secondary cell group (SCG) where $N_{cells}^{SCG}$ is provided by pdcch-BlindDetection for the SCG. When the UE is configured for carrier aggregation operation over more than 4 cells, or for a cell group when the UE is configured for NR-DC operation, the UE does not expect to monitor per slot a number of PDCCH candidates or a number of non-overlapped CCEs that is larger than the maximum number as derived from the corresponding value of $N_{cells}^{cap}$.

If a UE (such as the UE 116) indicates in UE-NR-Capability-r16 a carrier aggregation capability larger than two downlink cells, the UE includes in UE-NR-Capability-r16 an indication for a maximum number of PDCCH candidates and a maximum number of non-overlapped CCEs that the UE can monitor per span when the UE is configured for carrier aggregation operation over more than two downlink cells with monitoringCapabilityConfig=r16monitoringcapability.

When a UE (such as the UE 116) is not configured for NR-DC operation and the UE is provided monitoringCapabilityConfig=r16monitoringcapability for all downlink cell where the UE monitors PDCCH, the UE determines a capability to monitor a maximum number of PDCCH candidates and a maximum number of non-overlapped CCEs per span that corresponds to $N_{cells}^{cap-r16}$ downlink cells, where $N_{cells}^{cap-r16}$ is the number of configured downlink cells if the UE does not provide pdcch-MonitoringCA; otherwise, $N_{cells}^{cap-r16}$ is the value of pdcch-MonitoringCA.

When the UE is configured for carrier aggregation operation over more than 2 cells, or for a cell group when the UE is configured for NR-DC operation, the UE does not expect to monitor per span a number of PDCCH candidates or a number of non-overlapped CCEs that is larger than the maximum number as derived from the corresponding value of $N_{cells}^{cap-r16}$.

If a UE (such as the UE 116) indicates in UE-NR-Capability a carrier aggregation capability larger than one downlink cell with monitoringCapabilityConfig=r15monitoringcapability or larger than one downlink cell with monitoringCapabilityConfig=r16monitoringcapability, the UE includes in UE-NR-Capability-r16 an indication for a maximum number of PDCCH candidates and a maximum number of non-overlapped CCEs the UE can monitor for downlink cells with monitoringCapabilityConfig=r15monitoringcapability or for downlink cells with monitoringCapabilityConfig=r16monitoringcapability when the UE is configured for carrier aggregation operation over more than two downlink cells with at least one downlink cell with monitoringCapabilityConfig=r15monitoringcapability and at least one downlink cell with monitoringCapabilityConfig=r16monitoringcapability.

When a UE is not configured for NR-DC operation, the UE determines a capability to monitor a maximum number of PDCCH candidates and a maximum number of non-overlapped CCEs per slot or per span that corresponds to $N_{cells,r15}^{cap-r16}$ downlink cells or to $N_{cells,r16}^{cap-r16}$ downlink cells, respectively. Here, $N_{cells,r15}^{cap-r16}$ is the number of configured downlink cells if the UE does not provide pdcch-BlindDetectionCA1; otherwise, if the UE reports only one combination of (pdcch-BlindDetectionCA1, pdcch-BlindDetectionCA2), $N_{cells,r15}^{cap-r16}$ is the value of pdcch-BlindDetectionCA1; else, $N_{cells,r15}^{cap-r16}$ is the value of pdcch-BlindDetectionCA1 from a combination of (pdcch-BlindDetectionCA1, pdcch-BlindDetectionCA2) that is provided by pdcch-BlindDetectionCA-CombIndicator. Additionally, $N_{cells,r16}^{cap-r16}$ is the number of configured downlink cells if the UE does not provide pdcch-BlindDetectionCA2; otherwise, if the UE reports only one combination of (pdcch-BlindDetectionCA1, pdcch-BlindDetectionCA2), $N_{cells,r16}^{cap-r16}$ is the value of pdcch-BlindDetectionCA2, else, $N_{cells,r16}^{cap-r16}$ is the value of pdcch-BlindDetectionCA2 from a combination of (pdcch-BlindDetectionCA1, pdcch-BlindDetectionCA2) that is provided by pdcch-BlindDetectionCA-CombIndicator.

A set of PDCCH candidates for a UE to monitor is defined in terms of PDCCH search space sets. A search space set can be a common search space (CSS) set or a UE specific search space (USS) set. A UE monitors PDCCH candidates in one or more of the following search spaces sets. For example, a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a system information (SI)-radio network temporary identifier (RNTI) on the primary cell of the MCG. For another example, a Type0A-PDCCH CSS set configured by searchSpaceOtherSystemInformation in PDCCH-ConfigCommon for a DCI format with CRC scrambled by a system information-RNTI (SI-RNTI) on the primary cell of the MCG. For another example, a Type1-PDCCH CSS set configured by ra-SearchSpace in PDCCH-ConfigCommon for a DCI format with CRC scrambled by a random access-RNTI (RA-RNTI), a MsgB-RNTI, or a temporary cell-RNTI (TC-RNTI) on the primary cell. For another example, a Type2-PDCCH CSS set configured by pagingSearchSpace in PDCCH-ConfigCommon for a DCI format with CRC scrambled by a paging-RNTI (P-RNTI) on the primary cell of the MCG. For another example, a Type3-PDCCH CSS set configured by SearchSpace in PDCCH-Config with searchSpaceType=common for DCI formats with CRC scrambled by INT-RNTI, slot format indication-RNTI (SFI-RNTI), TPC-PUSCH-RNTI, TPC-PUCCH-RNTI, TPC-SRS-RNTI, or cancelation indication-RNTI (CI-RNTI) and, only for the primary cell, cell-RNTI (C-RNTI), MCS-C-RNTI, CS-RNTI(s), or power savings (PS-RNTI). For yet another example, a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), sidelink-RNTI (SL-RNTI), SL-CS-RNTI, or SL Semi-Persistent Scheduling V-RNTI.

If a UE (such as the UE 116) is provided (i) one or more search space sets by corresponding one or more of searchSpaceZero, searchSpaceSIB1, searchSpaceOtherSystemInformation, pagingSearchSpace, ra-SearchSpace, or a CSS set by PDCCH-Config, and (ii) a SI-RNTI, a P-RNTI, a RA-RNTI, a MsgB-RNTI, a SFI-RNTI, an INT-RNTI, a TPC-PUSCH-RNTI, a TPC-PUCCH-RNTI, or a TPC-SRS-RNTI, then for a RNTI from any of these RNTIs, the UE does not expect to process information from more than one DCI format with CRC scrambled with the RNTI per slot.

For each DL BWP configured to a UE in a serving cell, the UE can be provided by higher layer signalling with P≤3 CORESETs if coresetPoolIndex is not provided, or if a value of coresetPoolIndex is same for all CORESETs if coresetPoolIndex is provided. Similarly, for each DL BWP configured to a UE in a serving cell, the UE can be provided by higher layer signalling with P≤5 CORESETs if coresetPoolIndex is not provided for a first CORESET, or is provided and has a value 0 for a first CORESET, and is provided and has a value 1 for a second CORESET.

For each CORESET, the UE is provided the following by ControlResourceSet. The UE can be provided, by ControlResourceSet, a CORESET index p, by controlResourceSetId or by controlResourceSetId-v1610, Here. 0<p<12 if coresetPoolIndex is not provided, or if a value of coresetPoolIndex is same for all CORESETs if coresetPoolIndex is provided. Additionally, 0<p<16 if coresetPoolIndex is not provided for a first CORESET, or is provided and has a value 0 for a first CORESET, and is provided and has a value 1 for a second CORESET. The UE can be provided, by ControlResourceSet, a DM-RS scrambling sequence initialization value by pdcch-DMRS-ScramblingID. The UE can be provided, by ControlResourceSet, a precoder granularity for a number of REGs in the frequency domain where the UE can assume use of a same DM-RS precoder by precoderGranularity. The UE can be provided, by ControlResourceSet, a number of consecutive symbols provided by duration. The UE can be provided, by ControlResourceSet, a set of resource blocks provided by frequencyDomainResources. The UE can be provided, by ControlResourceSet, CCE-to-REG mapping parameters provided by cce-REG-MappingType. The UE can be provided, by ControlResourceSet, an antenna port quasi co-location, from a set of antenna port quasi co-locations provided by TCI-State, indicating quasi co-location information of the DM-RS antenna port for PDCCH reception in a respective CORESET. Here, if the UE is provided by simultaneousTCI-UpdateList1 or simultaneousTCI-UpdateList2 up to two lists of cells for simultaneous TCI state activation, the UE applies the antenna port quasi co-location provided by TCI-States with same activated tci-StateID value to CORESETs with index p in all configured DL BWPs of all configured cells in a list determined from a serving cell index provided by a MAC CE command. The UE can be provided, by ControlResourceSet, an indication for a presence or absence of a transmission configuration indication (TCI) field for a DCI format, other than DCI format 1_0, that schedules PDSCH receptions or indicates SPS PDSCH release or indicates SCell dormancy or indicates a request for a Type-3 HARQ-ACK codebook report without scheduling PDSCH and is transmitted by a PDCCH in CORESET p, by tci-PresentInDCI or tci-PresentDCI-1-2.

When precoderGranularity=allContiguousRBs, a UE does not expect (i) to be configured a set of resource blocks of a CORESET that includes more than four sub-sets of resource blocks that are not contiguous in frequency and (ii) any RE of a CORESET to overlap with any RE determined from lte-CRS-ToMatchAround, or from LTE-CRS-PatternList, or with any RE of a SS/PBCH block.

For each CORESET in a DL BWP of a serving cell, a respective frequencyDomainResources provides a bitmap if a CORESET is not associated with any search space set configured with freqMonitorLocations, the bits of the bitmap have a one-to-one mapping with non-overlapping groups of 6 consecutive PRBs, in ascending order of the PRB index in the DL BWP bandwidth of $N_{RB}^{BWP}$ PRBs with starting common RB position $N_{BWP}^{start}$, where the first common RB of the first group of 6 PRBs has common RB index $6 \cdot \lceil N_{BWP}^{start}/6 \rceil$ if rb-Offset is not provided, or the first common RB of the first group of 6 PRBs has common RB index $N_{BWP}^{start}+N_{RB}^{offset}$ where $N_{RB}^{offset}$ is provided by rb-Offset. Similarly, for each CORESET in a DL BWP of a serving cell, a respective frequencyDomainResources provides a bitmap if a CORESET is associated with at least one search space set configured with freqMonitorLocations, the first $N_{RBG,set0}^{size}$ bits of the bitmap have a one-to-one mapping with non-overlapping groups of 6 consecutive PRBs, in ascending order of the PRB index in each RB set k in the DL BWP bandwidth of $N_{RB}^{BWP}$ PRBs with starting common RB position $RB_{s0+k,DL}^{start,\mu}$, see REF 4, where the first common RB of the first group of 6 PRBs has common RB index $RB_{s0+k,DL}^{start,\mu}+N_{RB}^{offset}$ and k is indicated by freqMonitorLocations if provided for a search space set; otherwise, k=0. $N_{RBG,set0}^{size}=\lfloor(N_{RB,set0}^{size}-N_{RB}^{offset})/6\rfloor$, $N_{RB,set0}^{size}$ is a number of available PRBs in the RB set 0 for the DL BWP, and $N_{RB}^{offset}$ provided by rb-Offset or $N_{RB}^{offset}=0$ if rb-Offset is not provided. If a UE is provided RB sets in the DL BWP, the UE expects that the RBs of the CORESET are within the union of the PRBs in the RB sets of the DL BWP.

For a CORESET other than a CORESET with index 0, if a UE has not been provided a configuration of TCI state(s) by tci-StatesPDCCH-ToAddList and tci-StatesPDCCH-ToReleaseList for the CORESET, or has been provided initial configuration of more than one TCI states for the CORESET by tci-StatesPDCCH-ToAddList and tci-StatesPDCCH-ToReleaseList but has not received a MAC CE activation command for one of the TCI states as described in REF 5, the UE assumes that the DM-RS antenna port associated with PDCCH receptions is quasi co-located with the SS/PBCH block the UE identified during the initial access procedure. Additionally, for a CORESET other than a CORESET with index 0, if a UE has been provided a configuration of more than one TCI states by tci-StatesPDCCH-ToAddList and tci-StatesPDCCH-ToReleaseList for the CORESET as part of Reconfiguration with sync procedure as described in REF6 but has not received a MAC CE activation command for one of the TCI states as described in REF 5, the UE assumes that the DM-RS antenna port associated with PDCCH receptions is quasi co-located with the SS/PBCH block or the CSI-RS resource the UE identified during the random access procedure initiated by the Reconfiguration with sync procedure as described in REF6.

For a CORESET with index 0, the UE assumes that a DM-RS antenna port for PDCCH receptions in the CORESET is quasi co-located with the one or more DL RS configured by a TCI state, where the TCI state is indicated by a MAC CE activation command for the CORESET, if any, or a SS/PBCH block the UE identified during a most recent random access procedure not initiated by a PDCCH order that triggers a contention-free random access procedure, if no MAC CE activation command indicating a TCI state for the CORESET is received after the most recent random access procedure.

For a CORESET other than a CORESET with index 0, if a UE (such as the UE 116) is provided a single TCI state for a CORESET, or if the UE receives a MAC CE activation command for one of the provided TCI states for a CORESET, the UE assumes that the DM-RS antenna port associated with PDCCH receptions in the CORESET is quasi co-located with the one or more DL RS configured by the TCI state. For a CORESET with index 0, the UE expects that a CSI-RS configured with qcl-Type set to 'typeD' in a TCI state indicated by a MAC CE activation command for the CORESET is provided by a SS/PBCH block if the UE receives a MAC CE activation command for one of the TCI states, the UE applies the activation command in the first slot that is after slot $k+3N_{slot}^{subframe,\mu}$ where where k is the slot where the UE would transmit a PUCCH with HARQ-ACK information for the PDSCH providing the activation command and $\mu$ is the SCS configuration for the PUCCH. The active BWP is defined as the active BWP in the slot when the activation command is applied.

For each DL BWP configured to a UE in a serving cell, the UE is provided by higher layers with S≤10. Search space sets where, for each search space set from the S search space sets, the UE is provided the following by SearchSpace. For example, the UE is provided a search space set index s, 0≤s<40, by searchSpaceId. For another example, the UE is provided an association between the search space set s and a CORESET p by controlResourceSetId or by controlResourceSetId-v1610. For another example, the UE is provided a PDCCH monitoring periodicity of $k_s$ slots and a PDCCH monitoring offset of $o_s$ slots, by monitoringSlotPeriodicityAndOffset. For another example, the UE is provided a PDCCH monitoring pattern within a slot, indicating first symbol(s) of the CORESET within a slot for PDCCH monitoring, by monitoringSymbolsWithinSlot. For another example, the UE is provided a duration of $T_s<k_s$ slots indicating a number of slots that the search space set s exists by duration. For another example, the UE is provided a number of PDCCH candidates $M_s^{(L)}$ per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively. For yet another example, the UE is provided an indication that search space set s is either a CSS set, or a USS set by searchSpaceType.

For another example, if search space set s is a CSS set, the UE is provided an indication by dci-Format0-0-AndFormat1-0 to monitor PDCCH candidates for DCI format 0_0 and DCI format 1_0. For another example, if search space set s is a CSS set, the UE is provided an indication by dci-Format2-0 to monitor one or two PDCCH candidates, or to monitor one PDCCH candidate per RB set if the UE is provided freqMonitorLocations for the search space set, for DCI format 2_0 and a corresponding CCE aggregation level. For another example, if search space set s is a CSS set, the UE is provided an indication by dci-Format2-1 to monitor PDCCH candidates for DCI format 2_1. For another example, if search space set s is a CSS set, the UE is provided an indication by dci-Format2-2 to monitor PDCCH candidates for DCI format 2_2. For another example, if search space set s is a CSS set, the UE is provided an indication by dci-Format2-3 to monitor PDCCH candidates for DCI format 2_3. For another example, if search space set s is a CSS set, the UE is provided an indication by dci-Format2-4 to monitor PDCCH candidates for DCI format 2_4. For yet another example, if search space set s is a CSS set, the UE is provided an indication by dci-Format2-6 to monitor PDCCH candidates for DCI format 2_6.

For another example, if search space set s is a USS set, the UE is provided an indication by dci-Formats to monitor PDCCH candidates either for DCI format 0_0 and DCI format 1_0, or for DCI format 0_1 and DCI format 1_1, or an indication by dci-FormatsExt to monitor PDCCH candidates for DCI format 0_2 and DCI format 1_2, or for DCI format 0_1, DCI format 1_1, DCI format 0_2, and DCI format 1_2, or for DCI format 3_0, or for DCI format 3_1, or for DCI format 3_0 and DCI format 3_1.

For yet another example, a bitmap by freqMonitorLocations, if provided, to indicate an index of one or more RB sets for the search space set s, where the MSB k in the bitmap corresponds to RB set k−1 in the DL BWP. For RB set k indicated in the bitmap, the first PRB of the frequency domain monitoring location confined within the RB set is given by $RB_{s0+k,DL}^{start,\mu} + N_{RB}^{offset}$, where $RB_{s0+k,DL}^{start,\mu}$ is the index of first common RB of the RB set k as described in REF 4, and $N_{RB}^{offset}$ is provided by rb-Offset or $N_{RB}^{offset}=0$ if rb-Offset is not provided. For each RB set with a corresponding value of 1 in the bitmap, the frequency domain resource allocation pattern for the monitoring location is determined based on the first $N_{RBG,set0}^{size}$ bits in frequencyDomainResources provided by the associated CORESET configuration.

If the monitoringSymbolsWithinSlot indicates to a UE to monitor PDCCH in a subset of up to three consecutive symbols that are same in every slot where the UE monitors PDCCH for all search space sets, the UE does not expect to be configured with a PDCCH SCS other than 15 kHz if the subset includes at least one symbol after the third symbol.

In certain embodiments, a UE (such as the UE 116) does not expect to be provided a first symbol and a number of consecutive symbols for a CORESET that results to a PDCCH candidate mapping to symbols of different slots.

In certain embodiments, a UE (such as the UE 116) does not expect any two PDCCH monitoring occasions on an active DL BWP, for a same search space set or for different search space sets, in a same CORESET to be separated by a non-zero number of symbols that is smaller than the CORESET duration.

In certain embodiments, a UE (such as the UE 116) determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $n_{s,f}^\mu$ in a frame with number $n_f$ if $(n_f \cdot N_{slot}^{frame,\mu} + n_{s,f}^\mu - o_s) \bmod k_s = 0$. The UE monitors PDCCH candidates for search space set s for $T_s$ consecutive slots, starting from slot $n_{s,f}^\mu$, and does not monitor PDCCH candidates for search space set s for the next $k_s - T_s$ consecutive slots.

A USS at CCE aggregation level $L \in \{1, 2, 4, 8, 16\}$ is defined by a set of PDCCH candidates for CCE aggregation level L.

If a UE is configured with CrossCarrierSchedulingConfig for a serving cell the carrier indicator field value corresponds to the value indicated by CrossCarrierSchedulingConfig.

For an active DL BWP of a serving cell on which a UE monitors PDCCH candidates in a USS, if the UE is not configured with a carrier indicator field, the UE monitors the PDCCH candidates without carrier indicator field. For an active DL BWP of a serving cell on which a UE monitors PDCCH candidates in a USS, if a UE is configured with a carrier indicator field, the UE monitors the PDCCH candidates with carrier indicator field.

A UE does not expect to monitor PDCCH candidates on an active DL BWP of a secondary cell if the UE is configured to monitor PDCCH candidates with carrier indicator field corresponding to that secondary cell in another serving cell. For the active DL BWP of a serving cell on which the UE monitors PDCCH candidates, the UE monitors PDCCH candidates at least for the same serving cell.

For a search space set s associated with CORESET p, the CCE indexes for aggregation level L corresponding to PDCCH candidate $m_{s,n_{CI}}$ of the search space set in slot $n_{s,f}^\mu$ for an active DL BWP of a serving cell corresponding to carrier indicator field value $n_{CI}$ are described in Equation (1), below.

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i \qquad (1)$$

Here in Equation (1), for any CSS, $Y_{p,n_{s,f}^\mu}=0$. Additionally for a USS, $Y_{p,n_{s,f}^\mu}=(A_p \cdot Y_{p,n_{s,f}^\mu-1}) \bmod D$, $Y_{p,-1}=n_{RNTI} \ne 0$, $A_p=39827$ for pmod3=0, $A_p=39829$ for pmod3=1, $A_p=39839$ for pmod3=2, and D=65537. Additionally, i=0, . . . , L−1. The expression $N_{CCE,p}$ is the number of CCEs, numbered from 0 to $N_{CCE,p}-1$, in CORESET p and, if any, per RB set. The expression $n_u$ is the carrier indicator field value if the UE is configured with a carrier indicator field by CrossCarrierSchedulingConfig for the serving cell on which PDCCH is monitored; otherwise, including for any CSS, $n_{CI}=0$. The expression $n_{CI}$ $m_{s,n_{CI}}=0, \ldots, M_{s,n_{CI}}^{(L)}-1$, where $M_{s,n_{CI}}^{(L)}$ is the number of PDCCH candidates the UE is configured to monitor for aggregation level L of a search space set s for a serving cell corresponding to $n_{CI}$. For any CSS, $M_{s,max}^{(L)}=M_{s,0}^{(L)}$. For a USS, $M_{s,max}^{(L)}$ is the maximum of $M_{s,n_{CI}}^{(L)}$ over all configured $n_{CI}$ values for a CCE aggregation level L of search space set s. Additionally, the RNTI value used for $n_{RNTI}$ is the C-RNTI.

In certain embodiments, a UE (such as the UE 116) expects to monitor PDCCH candidates for up to 4 sizes of DCI formats that include up to 3 sizes of DCI formats with CRC scrambled by C-RNTI per serving cell. (This rule is sometimes referred to as the "3+1" DCI format size budget.) The UE counts a number of sizes for DCI formats per serving cell based on a number of configured PDCCH candidates in respective search space sets for the corresponding active DL BWP.

A PDCCH candidate with index $m_{s_j,n_{CI}}$ for a search space set $s_j$ using a set of CCEs in a CORESET p on the active DL BWP for serving cell $n_{CI}$ is not counted for monitoring if there is a PDCCH candidate with index $m_{s_i,n_{CI}}$ for a search space set $s_i < s_j$, or if there is a PDCCH candidate with index $m_{s_j,n_{CI}}$ and $n_{s_j,n_{CI}} < m_{s_j,n_{CI}}$, in the CORESET p on the active DL BWP for serving cell $n_{CI}$ using a same set of CCEs, the PDCCH candidates have identical scrambling, and the corresponding DCI formats for the PDCCH candidates have a same size; otherwise, the PDCCH candidate with index $m_{s_j,n_{CI}}$ is counted for monitoring.

In certain embodiments, a UE (such as the UE 116) does not expect to be configured CSS sets that result to corresponding total, or per scheduled cell, numbers of monitored PDCCH candidates and non-overlapped CCEs per slot or per span that exceed the corresponding maximum numbers per slot or per span, respectively.

For same cell scheduling or for cross-carrier scheduling, a UE does not expect a number of PDCCH candidates, and a number of corresponding non-overlapped CCEs per slot or per span on a secondary cell to be larger than the corresponding numbers that the UE is capable of monitoring on the secondary cell per slot or per span, respectively. If a UE is provided monitoringCapabilityConfig=r16monitoringcapability for the primary cell, except the first span of each slot, the UE does not expect a number of PDCCH candidates and a number of corresponding non-overlapped CCEs per span on the primary cell to be larger than the corresponding numbers that the UE is capable of monitoring on the primary cell per span.

For cross-carrier scheduling, the number of PDCCH candidates for monitoring and the number of non-overlapped CCEs per span or per slot are separately counted for each scheduled cell.

In the downlink, the gNB (such as the BS 102) can dynamically allocate resources to UEs via the C-RNTI on PDCCH(s). A UE always monitors the PDCCH(s) in order to find possible assignments when its downlink reception is enabled (activity governed by DRX when configured). When CA is configured, the same C-RNTI applies to all serving cells.

The gNB may pre-empt an ongoing PDSCH transmission to one UE with a latency-critical transmission to another UE. The gNB can configure UEs to monitor interrupted transmission indications using INT-RNTI on a PDCCH. If a UE receives the interrupted transmission indication, the UE may assume that no useful information to that UE was carried by the resource elements included in the indication, even if some of those resource elements were already scheduled to this UE.

In addition, with Semi-Persistent Scheduling (SPS), the gNB can allocate downlink resources for the initial HARQ transmissions to UEs: RRC defines the periodicity of the configured downlink assignments while PDCCH addressed to CS-RNTI can either signal and activate the configured downlink assignment, or deactivate it; i.e., a PDCCH addressed to CS-RNTI indicates that the downlink assignment can be implicitly reused according to the periodicity defined by RRC, until deactivated. When required, retransmissions are explicitly scheduled on PDCCH(s).

The dynamically allocated downlink reception overrides the configured downlink assignment in the same serving cell, if they overlap in time. Otherwise a downlink reception according to the configured downlink assignment is assumed, if activated.

The UE may be configured with up to 8 active configured downlink assignments for a given BWP of a serving cell. When more than one is configured: (i) the network decides which of these configured downlink assignments are active at a time (including all of them); and (ii) each configured downlink assignment is activated separately using a DCI command and deactivation of configured downlink assignments is done using a DCI command, which can either deactivate a single configured downlink assignment or multiple configured downlink assignments jointly.

PUSCH may be scheduled with DCI on PDCCH, or a semi-static configured grant may be provided over RRC, where two types of operation are supported: (i) the first PUSCH is triggered with a DCI, with subsequent PUSCH transmissions following the RRC configuration and scheduling received on the DCI, or (ii) the PUSCH is triggered by data arrival to the UE's transmit buffer and the PUSCH transmissions follow the RRC configuration.

In the uplink, the gNB can dynamically allocate resources to UEs via the C-RNTI on PDCCH(s). A UE always monitors the PDCCH(s) in order to find possible grants for uplink transmission when its downlink reception is enabled (activity governed by DRX when configured). When CA is configured, the same C-RNTI applies to all serving cells.

In certain embodiments, the gNB may cancel a PUSCH transmission, or a repetition of a PUSCH transmission, or an SRS transmission of a UE for another UE with a latency-critical transmission. The gNB can configure UEs to monitor cancelled transmission indications using CI-RNTI on a PDCCH. If a UE receives the cancelled transmission indication, the UE shall cancel the PUSCH transmission from the earliest symbol overlapped with the resource or the SRS transmission overlapped with the resource indicated by cancellation.

In addition, with Configured Grants, the gNB can allocate uplink resources for the initial HARQ transmissions and HARQ retransmissions to UEs. Two types of configured uplink grants are defined, denoted as Type 1 and Type 2. With Type 1, RRC directly provides the configured uplink grant (including the periodicity). With Type 2, RRC defines the periodicity of the configured uplink grant while PDCCH addressed to CS-RNTI can either signal and activate the configured uplink grant or deactivate it; i.e., a PDCCH addressed to CS-RNTI indicates that the uplink grant can be implicitly reused according to the periodicity defined by RRC, until deactivated.

If the UE is not configured with enhanced intra-UE overlapping resources prioritization, the dynamically allocated uplink transmission overrides the configured uplink grant in the same serving cell, if they overlap in time. Otherwise an uplink transmission according to the configured uplink grant is assumed, if activated.

If the UE is configured with enhanced intra-UE overlapping resources prioritization, in case a configured uplink grant transmission overlaps in time with dynamically allocated uplink transmission or with another configured uplink grant transmission in the same serving cell, the UE prioritizes the transmission based on the comparison between the highest priority of the logical channels that have data to be transmitted and which are multiplexed or can be multiplexed in MAC PDUs associated with the overlapping resources. Similarly, in case a configured uplink grant transmissions or a dynamically allocated uplink transmission overlaps in time with a scheduling request transmission, the UE prioritizes the transmission based on the comparison between the priority of the logical channel which triggered the scheduling request and the highest priority of the logical channels that have data to be transmitted and which are multiplexed or can be multiplexed in MAC PDU associated with the overlapping resource. In case the MAC PDU associated with a deprioritized transmission has already been generated, the UE keeps it stored to allow the gNB to schedule a retransmission. The UE may also be configured by the gNB to transmit the stored MAC PDU as a new transmission using a subsequent resource of the same configured uplink grant configuration when an explicit retransmission grant is not provided by the gNB.

Retransmissions other than repetitions are explicitly allocated via PDCCH(s) or via configuration of a retransmission timer.

The UE may be configured with up to 12 active configured uplink grants for a given BWP of a serving cell. When more than one is configured, the network decides which of these configured uplink grants are active at a time (including all of them). Each configured uplink grant can either be of Type 1 or Type 2. For Type 2, activation and deactivation of configured uplink grants are independent among the serving cells. When more than one Type 2 configured grant is configured, each configured grant is activated separately using a DCI command and deactivation of Type 2 configured grants is done using a DCI command, which can either deactivate a single configured grant configuration or multiple configured grant configurations jointly.

When a supplementary uplink (SUL) is configured, the network should ensure that an active configured uplink grant on SUL does not overlap in time with another active configured uplink grant on the other UL configuration.

For both dynamic grant and configured grant, for a transport block, two or more repetitions can be in one slot, or across slot boundary in consecutive available slots with each repetition in one slot. For both dynamic grant and configured grant Type 2, the number of repetitions can be also dynamically indicated in the L1 signalling. The dynamically indicated number of repetitions shall override the RRC configured number of repetitions, if both are present.

In Multiple Transmit/Receive Point (multi-TRP) operation, a serving cell can schedule UE from two TRPs, providing better PDSCH coverage, reliability and/or data rates.

There are two different operation modes for multi-TRP: single-DCI and multi-DCI. For both modes, control of uplink and downlink operation is done by both physical layer and MAC. In single-DCI mode, UE is scheduled by the same DCI for both TRPs and in multi-DCI mode, UE is scheduled by independent DCIs from each TRP.

The downlink/uplink physical-layer processing of transport channels consists of the following steps: (i) Transport block CRC attachment; (ii) Code block segmentation and code block CRC attachment; (iii) Channel coding: LDPC coding; (iv) Physical-layer hybrid-ARQ processing; (v) Rate matching; (vi) Scrambling; (vii) Modulation: $\pi/2$ BPSK (only for uplink with transform precoding), QPSK, 16 QAM, 64 QAM and 256 QAM; (viii) Layer mapping; (ix) (for uplink only) Transform precoding (enabled/disabled by configuration), and pre-coding; and (x) Mapping to assigned resources and antenna ports.

In certain embodiments, the UE (such as the UE 116) assumes that at least one symbol with demodulation reference signal is present on each layer in which PDSCH is transmitted to a UE, and up to 3 additional DM-RS can be configured by higher layers. Phase Tracking RS may be transmitted on additional symbols to aid receiver phase tracking.

The UE transmits at least one symbol with demodulation reference signal on each layer on each frequency hop in which the PUSCH is transmitted, and up to 3 additional DM-RS can be configured by higher layers. Phase Tracking RS may be transmitted on additional symbols to aid receiver phase tracking.

When the UE is scheduled to receive PDSCH by a DCI, the Time domain resource assignment field value m of the DCI provides a row index m+1 to an allocation table. The indexed row defines the slot offset $K_0$, the start and length indicator SLIV, or directly the start symbol S and the allocation length L, and the PDSCH mapping type to be assumed in the PDSCH reception.

Given the parameter values of the indexed row the slot allocated for the PDSCH is $K_s$, where is described in Equation (2), below, if UE is configured with ca-SlotOffset for at least one of the scheduled and scheduling cells. As described in Equation (2), $$K_s = \left\lfloor n \cdot \frac{2^{\mu_{PDSCH}}}{2^{\mu_{PDCCH}}} \right\rfloor + K_0,$$

otherwise, and where n is the slot with the scheduling DCI, and $K_0$ is based on the numerology of PDSCH, and $\mu_{PDSCH}$ and $\mu_{PDCCH}$ are the subcarrier spacing configurations for PDSCH and PDCCH, respectively. Additionally, given the parameter values of the indexed row $N_{slot,\,offset,\,PDCCH}^{CA}$ and $\mu_{offset,PDCCH}$ are the $N_{slot,\,offset}^{CA}$ and the $\mu_{offset}$, respectively, which are determined by higher-layer configured ca-SlotOffset, for the cell receiving the PDCCH respectively, $N_{slot,\,offset,\,PDSCH}^{CA}$ and $\mu_{offset,PDSCH}$ are the $N_{slot,\,offset}^{CA}$ and the $\mu_{offset}$, respectively, which are determined by higher-layer configured ca-SlotOffset for the cell receiving the PDSCH.

$$K_s = \left\lfloor n \cdot \frac{2^{\mu_{PDSCH}}}{2^{\mu_{PDCCH}}} \right\rfloor + K_0 + \left\lfloor \left( \frac{N_{slot,offset,PDCCH}^{CA}}{2^{\mu_{offset,PDCCH}}} - \frac{N_{slot,offset,PDSCH}^{CA}}{2^{\mu_{offset,PDSCH}}} \right) \cdot 2^{\mu_{PDSCH}} \right\rfloor \quad (2)$$

When the UE is scheduled to transmit a transport block and no CSI report, or the UE is scheduled to transmit a transport block and a CSI report(s) on PUSCH by a DCI, the 'Time domain resource assignment' field value m of the DCI provides a row index m+1 to an allocated table. The indexed row defines the slot offset $K_2$, the start and length indicator SLIV, or directly the start symbol S and the allocation length L, the PUSCH mapping type, and the number of repetitions (if numberOfRepetitions is present in the resource allocation table) to be applied in the PUSCH transmission.

In certain embodiments, when the UE (such as the UE 116) is scheduled to transmit a PUSCH with no transport block and with a CSI report(s) by a 'CSI request' field value on a DCI, the 'Time domain resource assignment' field value m of the DCI provides a row index m+1 to an allocated table. The indexed row defines the start and length indicator Start and length indicator value (SLIV), or directly the start symbol S and the allocation length L, and the PUSCH mapping type to be applied in the PUSCH transmission and the $K_2$ value is determined as $$K_2 = \max_j Y_j(m+1),$$

where $Y_j(m+1)$ is the (m+1)th entry of $Y_j$ and $Y_j$, j=0, ..., $N_{REP}-1$ are the corresponding list entries of the higher layer parameter (i) reportSlotOffsetListDCI-0-2, if PUSCH is scheduled by DCI format 0_2 and reportSlotOffsetListDCI-0-2 is configured; (ii) reportSlotOffsetListDCI-0-1, if PUSCH is scheduled by DCI format 0_1 and reportSlotOffsetListDCI-0-1 is configured; (iii) reportSlotOffsetList, otherwise; in CSI-ReportConfig for the $N_{REP}$ triggered CSI Reporting Settings.

For example, the slot $K_s$ where the UE shall transmit the PUSCH is determined by $K_2$ as described in Equation (3), below, if UE is configured with ca-SlotOffset for at least one of the scheduled and scheduling cell. As described in Equation (3), $$K_s = \left\lfloor n \cdot \frac{2^{\mu_{PUSCH}}}{2^{\mu_{PDCCH}}} \right\rfloor + K_2,$$

otherwise, and where n is the slot with the scheduling DCI, $K_2$ is based on the numerology of PUSCH, and $\mu_{PUSCH}$ and $\mu_{PDCCH}$ are the subcarrier spacing configurations for PUSCH and PDCCH, respectively. Additionally, $N_{slot, offset, PDCCH}^{CA}$ and $\mu_{offset,PDCCH}$ are the $N_{slot, offset}^{CA}$ and the $\mu_{offset}$, respectively, which are determined by higher-layer configured ca-SlotOffset for the cell receiving the PDCCH, $N_{slot, offset, PUSCH}^{CA}$ and $\mu_{offset,PUSCH}$ are the $N_{slot, offset}^{CA}$ and the $\mu_{offset}$, respectively, which are determined by higher-layer configured ca-SlotOffset for the cell transmitting the PUSCH.

$$K_s = \left\lfloor n \cdot \frac{2^{\mu_{PUSCH}}}{2^{\mu_{PDCCH}}} \right\rfloor + K_2 + \left\lfloor \left( \frac{N_{slot,offset,PDCCH}^{CA}}{2^{\mu_{offset},PDCCH}} - \frac{N_{slot,offset,PUSCH}^{CA}}{2^{\mu_{offset},PUSCH}} \right) \cdot 2^{\mu_{PUSCH}} \right\rfloor \quad (3)$$

The information element ca-SlotOffset provides slot offset between the primary cell (PCell/PSCell) and the SCell in unaligned frame boundary with slot alignment and partial SFN alignment inter-band CA. Based on this field, the UE determines the time offset of the SCell. The granularity of this field is determined by the reference SCS for the slot offset (i.e., the maximum of PCell/PSCell lowest SCS among all the configured SCSs in DL/UL SCS-SpecificCarrierList in ServingCellConfigCommon or ServingCellConfigCommonSIB and this serving cell's lowest SCS among all the configured SCSs in DL/UL SCS-SpecificCarrierList in ServingCellConfigCommon or ServingCellConfigCommonSIB). The Network configures at most single non-zero offset duration in ms (independent on SCS) among CCs in the unaligned CA configuration. If the field is absent, the UE applies the value of 0. The slot offset value can only be changed with SCell release and add. Herein, scs-SpecificCarrierList provides a set of carriers for different subcarrier spacings (numerologies), which is defined in relation to Point A. The network configures a scs-SpecificCarrier at least for each numerology (SCS) that is used e.g., in a BWP.

For carrier aggregation of cells with unaligned frame boundaries, the slot offset $N_{slot,offset}^{CA}$ between a PCell/PScell and an SCell is determined by higher-layer parameter ca-SlotOffset for the SCell. The quantity $\mu_{offset}$ is defined as the maximum of the lowest subcarrier spacing configuration among the subcarrier spacings given by the higher-layer parameters scs-SpecificCarrierList configured for PCell/PSCell and the SCell, respectively. The slot offset $N_{slot, offset}^{CA}$ fulfills when the lowest subcarrier spacing configuration among the subcarrier spacings configured for the cell is µ=2 for both cells or µ=3 for both cells, the start of slot 0 for the cell whose point A has a lower frequency coincides with the start of slot $qN_{slot, offset}^{CA}$ mod $N_{slot}^{frame,\mu_{offset}}$ for the other cell where q=−1 if point A of the PCell/PSCell has a frequency lower than the frequency of point A for the SCell, otherwise q=1. Otherwise, the start of slot 0 for the cell with the lower subcarrier spacing of the lowest subcarrier spacing given by the higher-layer parameters scs-SpecificCarrierList configured for the two cells, or the Pcell/PSCell if both cells have the same lowest subcarrier spacing given by the higher-layer parameters scs-SpecificCarrierList configured for the two cells, coincides with the start of slot $qN_{slot, offset}^{CA}$ mod $N_{slot}^{frame,\mu_{offset}}$ for the other cell where q=−1 if the lowest subcarrier spacing configuration given by scs-SpecificCarrierList of the PCell/PSCell is smaller than or equal to the lowest subcarrier spacing given by scs-SpecificCarrierList for the SCell, otherwise q=1.

In certain embodiments, HARQ operation is supported for DL reception. In certain embodiments, Asynchronous Incremental Redundancy HARQ is supported. The gNB provides the UE with the HARQ-ACK feedback timing either dynamically in the DCI or semi-statically in an RRC configuration. Retransmission of HARQ-ACK feedback is supported for operation with shared spectrum channel access by using enhanced dynamic codebook and/or one-shot triggering of HARQ-ACK transmission for all configured CCs and HARQ processes in the PUCCH group. The UE may be configured to receive code block group based transmissions where retransmissions may be scheduled to carry a sub-set of all the code blocks of a TB.

In certain embodiments, HARQ operation is supported for UL transmission. In certain embodiments, Asynchronous Incremental Redundancy HARQ is supported. The gNB schedules each uplink transmission and retransmission using the uplink grant on DCI. For operation with shared spectrum channel access, UE can also retransmit on configured grants. The UE may be configured to transmit code block group based transmissions where retransmissions may be scheduled to carry a sub-set of all the code blocks of a transport block.

Up to two HARQ-ACK codebooks corresponding to a priority (high/low) can be constructed simultaneously. For each HARQ-ACK codebook, more than one PUCCH for HARQ-ACK transmission within a slot is supported. Each PUCCH is limited within one sub-slot, and the sub-slot pattern is configured per HARQ-ACK codebook.

The HARQ functionality ensures delivery between peer entities at Layer 1. A single HARQ process supports one TB when the physical layer is not configured for downlink/uplink spatial multiplexing, and when the physical layer is configured for downlink/uplink spatial multiplexing, a single HARQ process supports one or multiple TBs.

In case of CA, the multi-carrier nature of the physical layer is only exposed to the MAC layer for which one HARQ entity is required per serving cell. In both uplink and downlink, there is one independent HARQ entity per serving cell and one transport block is generated per assignment/grant per serving cell in the absence of spatial multiplexing. Each transport block and its potential HARQ retransmissions are mapped to a single serving cell.

It is noted that PUCCH carries the Uplink Control Information (UCI) from the UE (such as the UE 116) to the gNB (such as the BS 102). UCI includes at least hybrid automatic request acknowledgement (HARQ-ACK) information, scheduling request (SR), and channel state information (CSI).

UCI can be transmitted on a PUCCH or multiplexed in a PUSCH. UCI multiplexing in PUSCH is supported when UCI and PUSCH transmissions coincide in time, either due to transmission of a UL-SCH transport block or due to triggering of A-CSI transmission without UL-SCH transport block: (i) UCI carrying HARQ-ACK feedback with 1 or 2 bits is multiplexed by puncturing PUSCH; and (ii) in all other cases UCI is multiplexed by rate matching PUSCH.

For configured grants operation with shared spectrum channel access, a Configured Grant Uplink Control Information (CG-UCI) is transmitted in PUSCH scheduled by configured uplink grant. For operation with shared spectrum channel access, multiplexing of CG-UCI and PUCCH carrying HARQ-ACK feedback can be configured by the gNB. If not configured, when PUCCH overlaps with PUSCH scheduled by a configured grant within a PUCCH group and PUCCH carries HARQ ACK feedback, PUSCH scheduled by configured grant is skipped.

It is noted that throughout the present disclosure, embodiments are described in terms of multiple PDSCHs or multiple PUSCHs that are jointly scheduled on multiple serving cells, such as a subset/set of cells from among one or more sets of co-scheduled cells.

The embodiments can apply to various other scenarios such as when a UE is jointly scheduled to receive/transmit multiple PDSCHs/PUSCHs: (i) from/to multiple transmission-reception points (TRPs) or other communication entities, such as multiple distributed units (DUs) or multiple remote radio heads (RRHs) and so on, for example, in a distributed MIMO operation, wherein TRPs/DUs/RRHs can be associated with one or more cells; or (ii) in multiple time units, such as multiple slots or multiple transmission time intervals (TTIs); or (iii) on one or more TRPs/cells, wherein the UE can receive/transmit more than one PDSCH/PUSCH on each co-scheduled TRP/cell; or (iv) for multiple transport blocks (TBs), or for multiple codewords (CWs) corresponding to single TB or multiple TB s; or (v) for multiple semi-persistently scheduled PDSCHs (SPS PDSCHs) or for multiple configured grant PUSCHs (CG PUSCHs) that are jointly activated on one or multiple TRPs/cells.

Accordingly, any reference to "co-scheduled cells" can be replaced with/by "co-scheduled TRPs/DUs/RRHs" or "co-scheduled slots/TTIs", or "co-scheduled PDSCHs/PUSCHs", or "co-scheduled TBs/CWs", or "co-scheduled SPS-PDSCHs/CG-PUSCHs", and so on. Similar for other related terms, such as "multi-cell scheduling", and so on.

Various embodiments consider reception of multiple PDSCHs or transmission of multiple PUSCHs on respective cells, including carriers of a same cell such as on an UL carrier (also referred to as, a normal UL (NUL) carrier) or a SUL carrier. The embodiments also apply to cases where scheduling is for a mixture of PDSCHs and PUSCHs. For example, the UE can receive first PDSCHs on respective first cells and can transmit second PUSCHs on respective second cells, wherein the first PDSCHs and the second PUSCHs are jointly scheduled.

Various embodiments of the present disclosure describe multicell scheduling operations as well as an indication of co-scheduled cells. This is described in the following examples and embodiments, such as those of FIG. 6.

Figure 6:
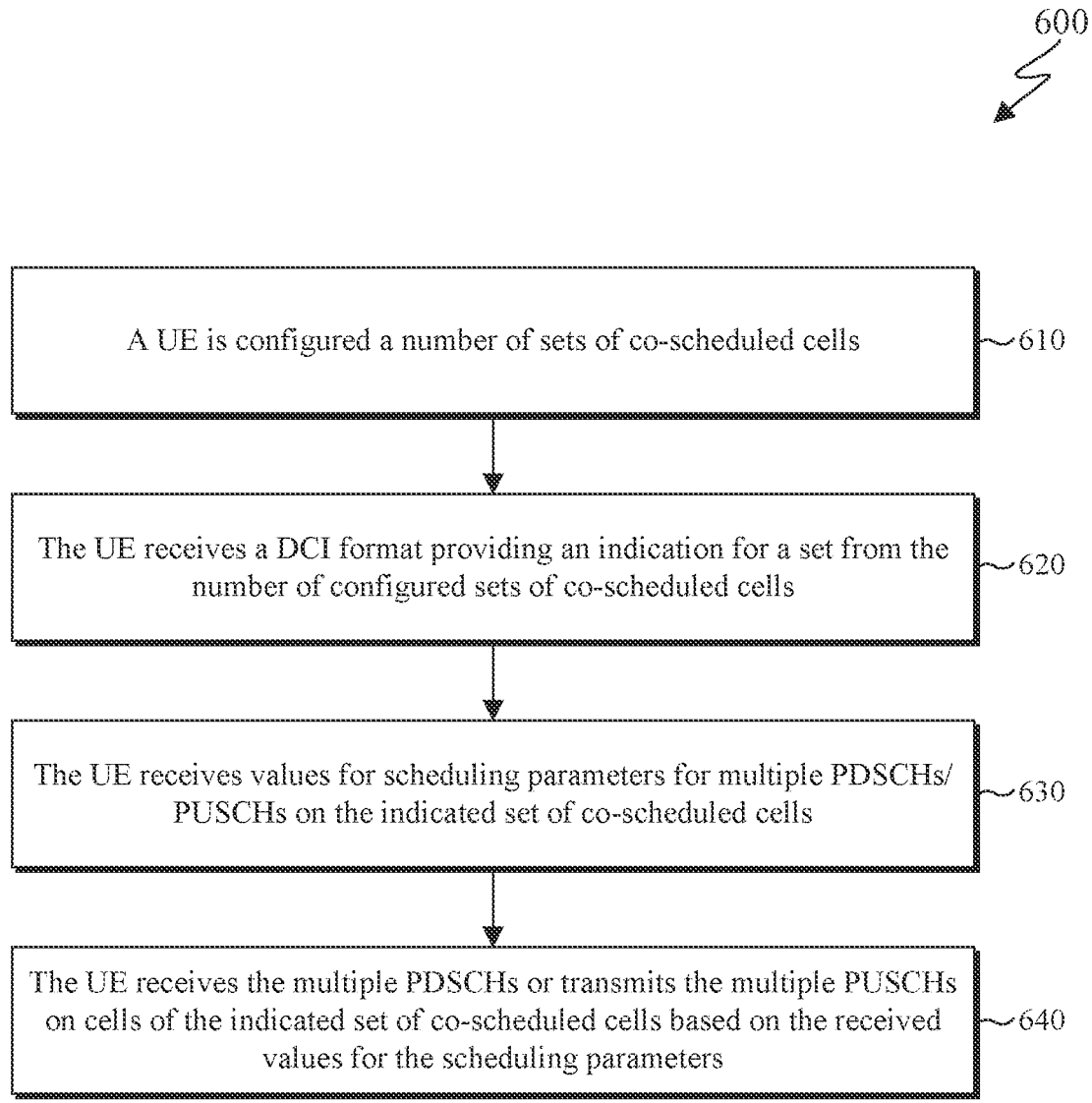
FIG. 6 illustrates a method for multi-cell scheduling for a UE that is configured a number of sets of co-scheduled cells according to embodiments of the present disclosure.

FIG. 6 illustrates a method 600 for multi-cell scheduling for a UE that is configured a number of sets of co-scheduled cells according to embodiments of the present disclosure. The steps of the method 600 of FIG. 6 can be performed by any of the UEs 111-119 of FIG. 1, such as the UE 116 of FIG. 3. The method 600 is for illustration only and other embodiments can be used without departing from the scope of the present disclosure.

In certain embodiments, a UE (such as the UE 116) can be provided one or more sets of co-scheduled cells by higher layers. The term set of co-scheduled cells is used to refer to a set of serving cells wherein the UE can be scheduled PDSCH receptions or PUSCH transmissions on two or more cells from the set of co-scheduled cells by a single DCI format, or by using complementary methods such as those described herein. It is also possible that a PDSCH reception or a PUSCH transmission on any cell from the set of co-scheduled cells is scheduled by a DCI format that does not schedule any other PDSCH reception or PUSCH transmission on any other cells from the set of co-scheduled cells, such as for example by a DCI format not having a multi-cell scheduling capability or when there is no traffic associated with the other cells at a given time. Additionally, the UE can be indicated via a DCI format in a PDCCH or a MAC CE in a PDSCH a subset of a set of co-scheduled cells, wherein cells of the subset can change across different PDCCH monitoring occasions, for example, as indicated by a corresponding DCI format.

Herein, operation with a cell or a set of cells refers to DL/UL transmissions on the cell(s), such as PDSCH receptions or PUSCH transmissions across the cell(s). Operation can also include other UE procedures or behaviors corresponding to DL/UL transmissions, such as reporting HARQ-ACK information, beam/CSI measurement or reporting, transmission or reception or processing of UL/DL reference signals, and so on.

In one example, the UE can be configured a number of sets of co-scheduled cells by higher layer signaling, such as by a UE-specific RRC configuration. For example, the UE can be configured a first set of cells, such as {cell #0, cell #1, cell #4, cell #7} and a second set {cell #2, cell #3, cell #5, cell #6}. The multiple sets of co-scheduled cells can be scheduled from a same scheduling cell or from different scheduling cells.

In one example, a set of co-scheduled cells can include a PCell/PSCell and one or more SCells. In another example, a set of co-scheduled cells can include only SCells. In one example, a scheduling cell can belong to a set of co-scheduled cells. In another example, the UE does not expect that a scheduling cell belongs to a set of co-scheduled cells.

In one example, per the specifications for the system operation, a set of co-scheduled cells is defined as a set of all scheduled cells from a same scheduling cell and additional higher layer configuration is not required for the set of co-scheduled cells. Accordingly, a DCI format for multi-cell scheduling, or other complementary methods, can jointly schedule any number of scheduled cells that have a same scheduling cell.

In another example, a set of co-scheduled cells can have two or more scheduling cells. For example, a UE can receive a DCI format for scheduling multiple co-scheduled cells on a first scheduling cell in a first PDCCH monitoring occasion, or on a second scheduling cell in a second PDCCH monitoring occasion. The DCI format can be one with CRC scrambled with any RNTI or restricted to CRC scrambled by a RNTI provided by UE-specific RRC signaling such as a C-RNTI, CS-RNTI, or MCS-C-RNTI. Such PDCCH monitoring from two scheduling cells can be simultaneous, for example in a same span, or same slot, or can be non-overlapping, such as in different slots (per higher layer configuration, or per indication in a PDCCH or via a MAC CE). The UE may (or may not) expect that both the first scheduling cell and the second scheduling cell can schedule, through PDCCH transmissions in a same time interval such as a span or a slot, transmissions or receptions on a same cell. The UE can also monitor PDCCH for detection of a DCI format providing scheduling only on one cell from the set of co-scheduled cells (single-cell scheduling DCI format). Also, for single-cell scheduling, the UE may be configured to monitor PDCCH for a first scheduled cell on (only) the first scheduling cell, and monitor PDCCH for a second scheduled cell on (only) the second scheduling cell.

In such a case, scheduling by two scheduling cells may apply only to multi-cell scheduling and may not apply to single-cell scheduling.

Different sets of co-scheduled cells can have a same number of cells, or can have different numbers of cells, for example, based on a separate configuration of scheduled cells per set of co-scheduled cells. Similarly, different sets of co-scheduled cells can have a same number of cells, or can have different numbers of cells based on a separate configuration, such as by UE-specific RRC signaling, of scheduled cells per set of co-scheduled cells.

A UE (such as the UE 116) can report one or more of: a maximum number of sets of co-scheduled cells, or a maximum number of cells within a set of co-scheduled cells, or a maximum total number of co-scheduled cells across different sets, or a maximum number of co-scheduled cells per PDCCH monitoring occasion, as capability(-ies) to the gNB. In one example, a number of set(s), or a number of cells within each set of co-scheduled cells, or a total number of co-scheduled cells, or a number of co-scheduled cells per PDCCH monitoring occasion can depend on an operating frequency band or a frequency range.

A UE (such as the UE 116) can also be configured a number of cells that do not belong to any of set(s) of co-scheduled cells. For example, the UE can be configured a cell #8 that does not belong to either the first set or the second set in the previous example.

In one example, restrictions can apply for co-scheduled cells and a UE can expect that co-scheduled cells in a corresponding set: (i) have a same numerology (SCS configuration and cyclic prefix (CP)); or (ii) have a same numerology for respective active DL/UL BWPs; or (iii) have a same duplex configuration, for example, all cells have FDD configuration or all cells have TDD configuration; or (iv) are within a same frequency band (intra-band CA).

A serving cell can belong only to a single set of co-scheduled cells, so that the sets of co-scheduled cells do not include any common cell, or can belong to multiple sets of co-scheduled cells to enable larger scheduling flexibility to a serving gNB. For example, a serving cell can belong to a first set of co-scheduled cells and to a second set of co-scheduled cells, when cells in the first and second sets of co-scheduled cells have a common feature such as a common numerology, duplex configuration, operating frequency band/range, and so on. In a further example, a serving cell can belong to both a first set of co-scheduled cells and to a second set of co-scheduled cells, when the serving cell has a first common feature with cells in the first set of co-scheduled cells, and a second common feature with cells in the second set of co-scheduled cells, wherein the first common feature can be different from the second common feature.

In a first approach, a UE expects to be provided multi-cell scheduling for all cells in a set of co-scheduled cells. For example, for a first set of co-scheduled cells including cells {cell #0, cell #1, cell #4, cell #7}, a DCI format schedules PDSCH receptions or PUSCH transmissions on all four cells in the first set of co-scheduled cells {cell #0, cell #1, cell #4, cell #7}.

In a second approach, the UE can be provided multi-cell scheduling for a subset of a set of co-scheduled cells. For example, a DCI format can schedule PDSCH receptions or PUSCH transmissions on only two cells, such as {cell #0, cell #4}, from the first set of cells.

In a first option for the second approach, the subset of cells can be indicated by a MAC CE. Such a MAC CE command can include one or more of: an indication for activation or deactivation/release of a subset of cells; an indication for a number of sets of co-scheduled cells; or an indication for a number of subsets of co-scheduled cells from a corresponding number of sets of co-scheduled cells.

For example, a MAC CE activates a first subset of a set of co-scheduled cells and subsequent DCI format(s) for multi-cell scheduling apply to the first subset of cells activated by the MAC CE. The UE can receive another MAC CE command that deactivates the first subset of co-scheduled cells, or activates a second subset of co-scheduled cells, wherein the second subset can be a subset of the same set of co-scheduled cells or a subset of a different set of co-scheduled cells. If a UE receives a MAC CE that deactivates the first subset of co-scheduled cells, but does not activate a second subset of co-scheduled cells, in one alternative, the UE does not expect to receive a DCI format for multi-cell scheduling, and the UE may not monitor PDCCH according to respective search space sets, until the UE receives a new MAC CE that activates a second subset of co-scheduled cells. In another alternative, the UE can receive DCI format(s) for multi-cell scheduling even before receiving a new MAC CE that activates a second subset of co-scheduled cells, but the UE expects to be provided an indication for a subset of co-scheduled cells by the DCI format(s), or by using complementary methods such as those described herein for multi-cell scheduling.

In a second option for the second approach, the subset of the set of co-scheduled cells can be provided by a DCI format in a PDCCH/PDSCH. The subset of cells can change between PDCCH monitoring occasions (MOs) for PDSCH/PUSCH scheduling as indicated by a corresponding DCI format. For example, a first DCI format in a first PDCCH MO indicates scheduling on a first subset of cells, while a second DCI format in a second PDCCH MO indicates scheduling on a second subset of cells. In one example, a DCI format for multi-cell scheduling provides indexes of cells that are co-scheduled or provides a configured index for the subset of co-scheduled cells or CIF values corresponding to the co-scheduled cells. For example, RRC signaling can indicate first/second/third indexes and corresponding first/second/third subsets from a set of co-scheduled cells (or first/second/third sets of co-scheduled cells), a fourth index can correspond to all cells from the set of co-scheduled cells (or to all sets of co-scheduled cells), and a first field of 2 bits in a DCI format can provide a value for the index to indicate the scheduled cells. It is also possible to include a 1-bit flag field to indicate whether the DCI format is for single-cell scheduling or for multi-cell scheduling in order for a UE to accordingly interpret the other fields of the DCI format. Then, for single-cell scheduling, the first field can be interpreted as a CIF field in case of cross-carrier scheduling. In another example, a DCI format for multi-cell scheduling provides a number of co-scheduled cells, and the indexes of the co-scheduled cells are provided by additional methods, such as by an additional DCI format or by higher layer signaling as described herein.

In one example, a CIF in a DCI format for multi-cell scheduling can indicate a subset of co-scheduled cells from a set of co-scheduled cells, wherein a mapping between values of the CIF and subsets of co-scheduled cells is configured by UE-specific RRC signaling. One value of the CIF can correspond to all cells from the set of co-scheduled cells (or all sets of co-scheduled cells). The indication can be by an index of the sub-set of co-scheduled cells or by a bitmap mapping to the sub-sets of co-scheduled cells. In another example, separate CIF values are indicated per co-scheduled cell, wherein an indication can be a cell index or a single-cell CIF index, or by a bitmap mapping to each of the co-scheduled cells. When the DCI format is always applicable to all cells in the set of co-scheduled cells, the DCI format does not include a CIF.

In a third option for the second approach, a UE can determine the indexes for the co-scheduled cells. For example, the UE can determine the indexes for the co-scheduled cells based on a PDCCH monitoring parameter, such as: (i) a CORESET index; or (ii) a search space set index, or a carrier indicator parameter n_CI corresponding to the search space set index; or (iii) a set of CCEs in the search space set or a first/last CCE in the search space set; in which the UE has received the DCI format for multi-cell scheduling.

According to the third option, the UE can be configured a mapping among values for PDCCH monitoring parameters, such as search space sets, and a number of co-scheduled cells or indexes of the co-scheduled cells. In one example, a first value for parameter n_CI in a search space set can indicate a first subset of co-scheduled cells, and a second value for parameter n_CI in the search space set can indicate a second subset of co-scheduled cells. According to this example, the parameter n_CI can correspond to a single cell (legacy behavior) or can correspond to a group of cells, such as a subset/set of co-scheduled cells.

In one example, the UE can be configured different search space sets for monitoring downlink DCI format(s) for multi-cell scheduling compared to uplink multi-cell scheduling. For example, the UE can be configured first search space set(s) for monitoring a DCI format 1_3 for multi-cell scheduling of PDSCHs for one or multiple set(s) of co-scheduled cells, and second search space set(s) for monitoring a DCI format 0_3 for multi-cell scheduling of PUSCHs for one or multiple set(s) of co-scheduled cells. In one example, such search space sets can also include DCI formats one or more downlink DCI format(s) such as 1_1 or 1_2 for single-cell scheduling of a PDSCH, or one or more uplink DCI format(s) such as 0_1 or 0_2 for single-cell scheduling of a PUSCH. In another example, such search space sets include DCIs format(s) for single-cell scheduling only for a corresponding link direction. For example, a search space set for monitoring DCI format for 1_3 for multi-cell scheduling of PDSCHs can only include DCI formats 1_1 or 1_2 for single-cell scheduling of a PDSCH (and not DCI formats 0_1 or 0_2 for single-cell scheduling of a PUSCH). Similar, a search space set for monitoring DCI format for 0_3 for multi-cell scheduling of PUSCHs can only include DCI formats 0_1 or 0_2 for single-cell scheduling of a PUSCH (and not DCI formats 1_1 or 1_2 for single-cell scheduling of a PDSCH). In one example, the UE does not expect that a search space set for monitoring a multi-cell scheduling is also configured for monitoring DCI formats for single-cell scheduling. It is noted that, a DCI format for multi-cell scheduling may be used for single-cell scheduling as well. The above methods can be beneficial, for example, to avoid waste of PDCCH candidates when UE has no or infrequent UL traffic, as the sizes of downlink and uplink DCI formats for multi-cell scheduling (or single-cell scheduling) can be different.

The method 600 as illustrated in FIG. 6 describes an example procedure for multi-cell scheduling for a UE that is configured a number of sets of co-scheduled cells. In step 610, a UE (such as the UE 116) is configured a number of sets of co-scheduled cells. In step 620, the UE receives a DCI format that includes a field with a value that provides an indication for a set from the number of configured sets of co-scheduled cells. It is also possible that the indication is alternatively or additionally provided via higher layer configuration or a MAC CE command. In step 430, the UE receives values for scheduling parameters by the DCI format for multiple PDSCHs/PUSCHs on cells of the indicated set of co-scheduled cells. In step 440, the UE receives the multiple PDSCHs or transmits the multiple PUSCHs on the indicated set of co-scheduled cells based on the received values for the scheduling parameters.

It is noted that, when a cell is configured to be in a set of co-scheduled cells, the UE can still receive (a PDCCH with) a DCI format that schedules a PDSCH reception or PUSCH transmission only on the cell (single-cell scheduling DCI format). The UE can distinguish a single-cell scheduling DCI format from a multi-cell scheduling DCI format via various methods, such as a DCI format size, or an RNTI used for scrambling a CRC of a DCI format for multi-cell scheduling, or by an explicit indication by a corresponding field in the DCI format.

A set of DL/UL transmissions on a respective set/subset of cells that are jointly scheduled by a single DCI format, or by using complementary methods such as those described herein, can refer to multiple PDSCHs or multiple PUSCHs that may or may not overlap in time. For example, the UE can be indicated to receive multiple PDSCHs or to transmit multiple PUSCHs on multiple co-scheduled cells wherein all receptions/transmissions are in a same slot or at least one reception/transmission is in a different slot than the remaining ones.

Multi-cell scheduling can be an optional UE feature with capability signaling that can additionally be separate for PDSCH receptions and for PUSCH transmissions. For example, a UE can report a capability for a maximum number of {2, 4, 8, 16} co-scheduled cells for the DL and a maximum of {2, 4} co-scheduled cells for the UL.

In certain embodiments, a UE (such as the UE 116) that is configured for multi-cell scheduling can be provided a first set of cell-common scheduling information parameters, whose values apply to all co-scheduled cells, and a second set of cell-specific scheduling information parameters, whose values apply for each corresponding co-scheduled cell. The UE can determine cell-common and cell-specific scheduling information parameters based on the specifications of the system operation, or based on higher layer configuration. For some cell-specific scheduling information parameters, the UE can be provided differential values compared to a reference value wherein the reference value can correspond, for example, to a first scheduled cell from a set of scheduled cells.

For a UE (such as the UE 116) that is configured a number of sets of co-scheduled cells, a DCI format for multi-cell scheduling can provide complete or partial scheduling information for cell-common or cell-specific scheduling parameters, for multiple PDSCH receptions or multiple PUSCH transmissions on respective multiple co-scheduled cells. When the DCI format for multi-cell scheduling provides partial scheduling information, the UE can determine remaining scheduling information from UE-specific RRC signaling, or by using other complementary methods.

In one example, a DCI format for multi-cell scheduling can have a same size as a DCI format for single cell scheduling. This can enable maintaining a total number of DCI format sizes when supporting multi-cell scheduling and avoid fragmentation of a number of PDCCH candidates that a UE can monitor over an increased number of DCI format sizes, thereby avoiding having a smaller number of PDCCH candidates per DCI format size. In another example, the UE does not expect to receive a DCI format for multi-cell scheduling that is same as or has a same size as a DCI format 1_0 or 0_0 as a differentiation between single-cell scheduling and multi-cell scheduling may not be possible since an additional field to provide such differentiation may not be possible to include in a DCI format 1_0 or 0_0.

Although FIG. 6 illustrates the method 600 various changes may be made to FIG. 6. For example, while the method 600 is shown as a series of steps, various steps could overlap, occur in parallel, occur in a different order, or occur multiple times. In another example, steps may be omitted or replaced by other steps. For example, steps of the method 600 can be executed in a different order.

Various embodiments of the present disclosure describe single-cell DCI pointing to a PDSCH with multi-cell scheduling.

In certain embodiments, a UE (such as the UE 116) can be provided multi-cell scheduling information using a single-cell scheduling DCI format that schedules a first PDSCH on a first cell, wherein the first PDSCH includes scheduling information for reception of second PDSCH(s) or transmission of second PUSCH(s) on a subset/set from a number of sets of co-scheduled cells.

The first PDSCH includes scheduling information for a number of PDSCHs/PUSCHs on a respective number of cells. In one example, the first cell is separate from the number of cells. In another example, such as when a PUSCH is scheduled, the first cell can be among the number of cells. In one example, the first cell can be a scheduling cell corresponding to the set of co-scheduled cells, so that the first cell is self-scheduling the first PDSCH. In another example, the first cell can be a scheduled cell different from the scheduling cell, so the first PDSCH is cross-carrier scheduled from the corresponding scheduling cell.

In one example, a number of PDSCH(s)/PUSCH(s) that are co-scheduled on a number of cells, can correspond to a same scheduling cell as a scheduling cell for the first PDSCH on the first cell.

In another example, a number of PDSCH(s)/PUSCH(s) that are co-scheduled on a number of cells, can correspond to a different scheduling cell than a scheduling cell for a first PDSCH on a first cell that includes the scheduling information for the number of PDSCH(s)/PUSCH(s) and the respective scheduled cells. For example, the first PDSCH is self-scheduled by the first cell, such as by the PCell and the number of PDSCH(s)/PUSCH(s) that are co-scheduled on the number of cells correspond to a second scheduling cell, such as an SCell. Such behavior can be beneficial, for example, when PDCCH receptions on the PCell are more reliable than on the SCell, or when the SCell is experiencing beam blockage, or when the SCell is experiencing PDCCH capacity limitations and needs to offload control signaling.

Various options are disclosed for a first PDSCH that provides multi-cell scheduling information. In all the options, the first PDSCH includes information for a number of PDSCH(s)/PUSCH(s) on a number of co-scheduled cell(s). Scheduling information for each PDSCH/PUSCH from the number of PDSCH(s)/PUSCH(s) on a cell from the number of co-scheduled cells is referred to as a modified DCI (M-DCI) as it may not include all fields that are present in a DCI format for single-cell scheduling. In addition to a number of M-DCIs corresponding to a number of co-scheduled cells, the first PDSCH can include scheduling information, such as indication for cell-common scheduling parameters, or additional scheduling information about the first PDSCH, as described in the following embodiments.

In one example, the UE receives an indication of the set of co-scheduled cells, such as a 'set-level' CIF, in a first PDCCH/DCI that schedules the first PDSCH. In another example, the UE receives such indication for the set of co-scheduled cells, for example a 'set-level' CIF, within the first PDSCH.

Various embodiments of the present disclosure describe a first option for MAC CE for multi-cell scheduling. This is described in the following examples and embodiments, such as those of FIGS. 7 and 8.

Figure 7:
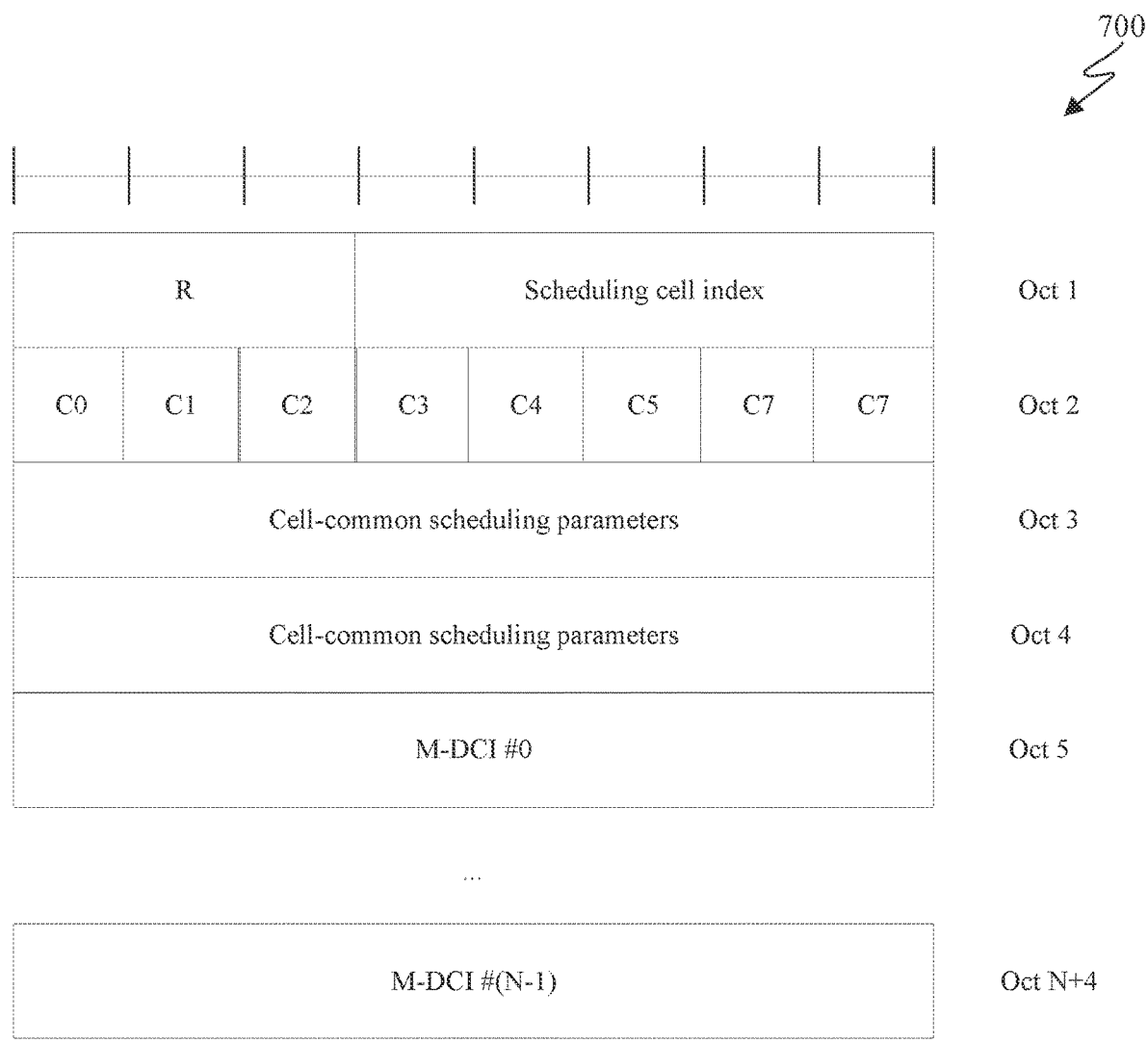
FIG. 7 illustrates a method structure for a medium access control (MAC) control element (CE) for multi-cell scheduling according to embodiments of the present disclosure.
Figure 8:
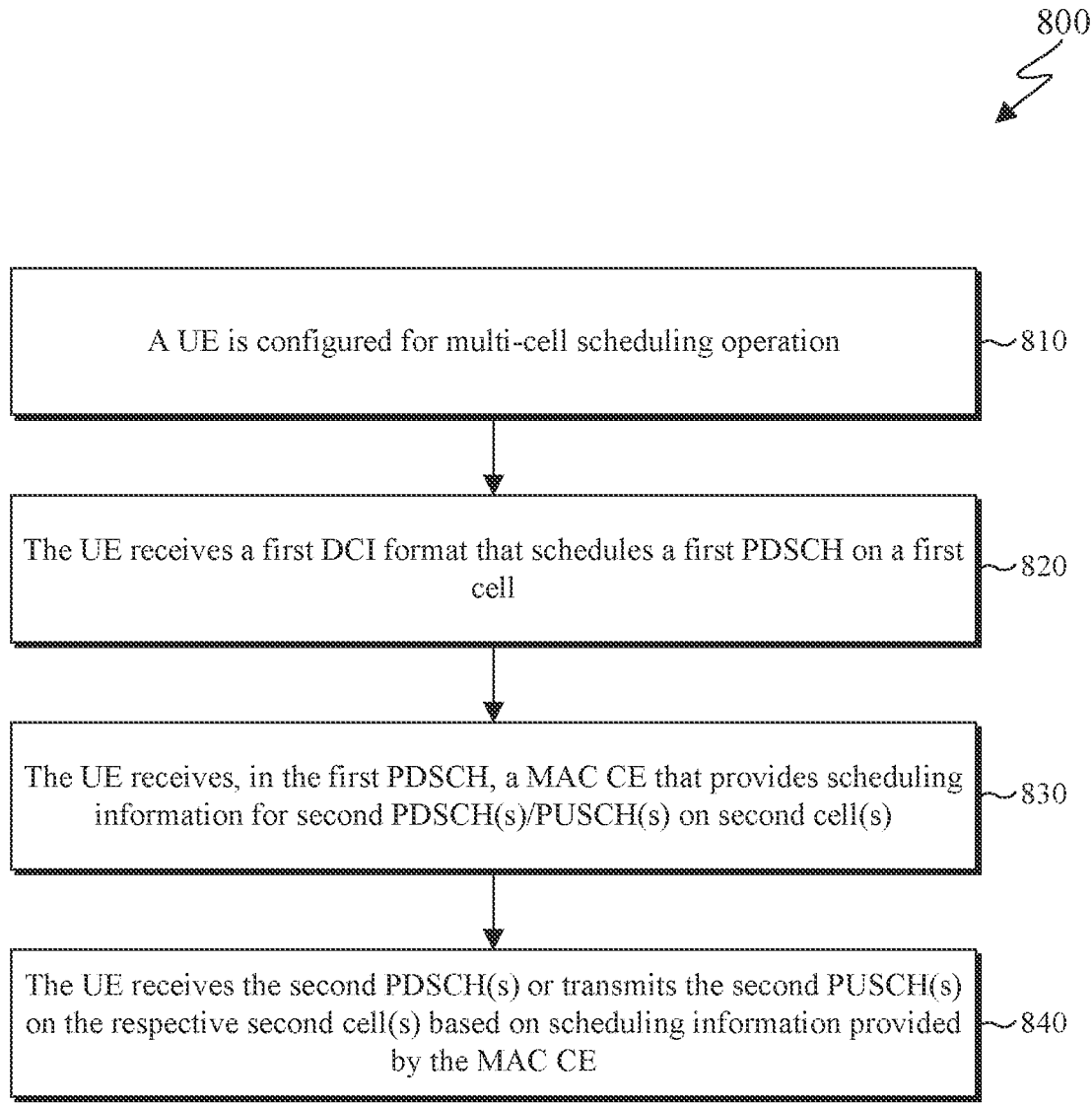
FIG. 8 illustrates a method for multi-cell scheduling based on a single-cell downlink control information (DCI) format pointing to a physical downlink shared channel (PDSCH) that includes a MAC CE for multi-cell scheduling according to embodiments of the present disclosure.

FIG. 7 illustrates a diagram 700 of a structure for a medium access control (MAC) control element (CE) for multi-cell scheduling according to embodiments of the present disclosure. FIG. 8 illustrates a method 800 for multi-cell scheduling based on a single-cell downlink control information (DCI) format pointing to a physical downlink shared channel (PDSCH) that includes a MAC CE for multi-cell scheduling according to embodiments of the present disclosure. The steps of the method 800 of FIG. 8 can be performed by any of the UEs 111-119 of FIG. 1, such as the UE 116 of FIG. 3. The diagram 700 and the method 800 are for illustration only and other embodiments can be used without departing from the scope of the present disclosure.

In a first option, a first PDSCH includes a MAC CE that provides scheduling information for a number of PDSCH(s) or PUSCH(s). Accordingly, the MAC CE can include a number of modified DCIs (M-DCIs), as previously described, wherein each M-DCI includes full or partial scheduling information for a PDSCH/PUSCH from the number of PDSCH(s)/PUSCH(s).

In one example, each M-DCI in a MAC CE includes at least fields of a single-cell DCI format associated with PDSCH reception or PUSCH transmission. In another example, each M-DCI in a MAC CE includes only fields corresponding to cell-specific scheduling parameters for multi-cell scheduling, while values for cell-common scheduling parameters are provided separately, such as by separate octets, within the MAC CE.

In one example, each M-DCI in the MAC CE can include a cell index, similar to a CIF, so that the UE can determine a cell for a corresponding PDSCH reception or PUSCH transmission. In another example, the MAC CE includes a bitmap identifying the scheduled cells from the set of co-scheduled cells. In one example, when multi-cell scheduling is always applicable to all cells (rather than a subset) in a set of co-scheduled cells, neither the DCI format that schedules the first PDSCH nor the MAC CE provided by the first PDSCH include any CIF(s) or bitmap as the M-DCIs provided by the MAC CE correspond to cells in the set of co-scheduled cells.

In one example, when a UE is configured multiple sets of co-scheduled cells, the MAC CE includes an indication for a set index from the multiple configured sets of co-scheduled cells.

The diagram 700 as illustrated in FIG. 7 describes an example structure for a MAC CE for multi-cell scheduling.

As illustrated in FIG. 7, 'R' denotes reserved bits that are set to 0. 'Scheduling cell index' provides a cell index for a scheduling cell that corresponds to the set of co-scheduled cells, so that UE can correctly interpret following CIF values. In one example, the UE expects that the scheduling cell for a set of co-scheduled cells is same as a cell on which the UE receives the first PDSCH which includes the MAC CE. In another example, the UE expects that the scheduling cell for a set of co-scheduled cells is same as a cell on which the UE monitors the PDCCH/DCI that schedules the first PDSCH which includes the MAC-CE. In such cases, there may be need to include 'Scheduling cell index' inside the MAC CE. Values C0, C1, . . . , C7 indicate a bitmap for the co-scheduled cells corresponding to the indicated scheduling cell. The bitmap is in ascending order of CIF values (or cell indexes) corresponding to the scheduling cell. A value '1' for each of C0, C1, ..., C7 indicates that a corresponding cell is among the co-scheduled cells, and a value '0' indicates that the corresponding cell is not among the co-scheduled cells. 'Cell-common scheduling parameters can include, for instance, one or more of: a PUCCH resource indicator (PRI), a TPC command for the PUCCH, or a PDSCH-to-HARQ_feedback timing (K1) value, that are commonly applied to all co-scheduled cells. Next, an M-DCI is provided for each co-scheduled cell. Herein, N refers to a number of co-scheduled cells, based on a number of cells for which a value '1' is provided in a corresponding parameter from C0, C1, ..., C7. In the example of FIG. 4, two octets are assigned to the cell-common scheduling parameters and one octet is assigned to each M-DCI. In general, it is possible to assign M≥0 octets to cell-common scheduling parameters, and B≥1 octets to each M-DCI, wherein M and B are provided in the specifications of the system operation, or by higher layer signaling, or as additional fields in the MAC CE, such as by using one or more bits from the reserved bits or by including corresponding indication in the first DCI that schedules the first PDSCH which includes the MAC CE.

In certain embodiments, when the UE receives the first PDSCH and correctly decodes a TB in the first PDSCH that includes a MAC CE providing scheduling information for additional PDSCH receptions or for PUSCH transmissions, the MAC layer provides the multi-cell scheduling information to the physical layer so that the UE can receive the PDSCH(s) or transmit the PUSCH(S) on the respective co-scheduled cell(s). To account for a MAC CE processing delay, the UE can apply the multi-cell scheduling MAC CE in a first slot that is after slot $k+3N_{slot}^{subframe,\mu}$ where k is a slot where the UE would transmit a PUCCH with HARQ-ACK information for the PDSCH providing the MAC CE and μ is the SCS configuration for the PUCCH. Herein, the active BWP is defined as the active BWP in the slot when the MAC CE is applied. In another example, the UE can be specified to apply the MAC CE prior to transmitting HARQ-ACK information for an associated TB, such as in a first slot that is 3 msec after the PDSCH reception, or in a first slot after n msec or m slots, wherein n and m can be based on a PDSCH processing time. For example, once the MAC layer disassembles the TB in the first PDSCH and detects the multi-cell scheduling MAC CE, the information is passed to the physical layer to operate accordingly.

The method 800, as illustrated in FIG. 8 describes an example procedure for multi-cell scheduling based on a single-cell DCI format pointing to a PDSCH that includes a MAC CE for multi-cell scheduling.

In step 810, a UE (such as the UE 116) is configured for multi-cell scheduling operation. In step 820, the UE receives a first DCI format that schedules a first PDSCH on a first cell. In step 830, the UE detects, in the first PDSCH, a MAC CE that provides scheduling information for second PDSCH(s)/PUSCH(s) on second cell(s). In step 840, the UE receives the second PDSCH(s) or transmits the second PUSCH(s) on the respective second cell(s) based on scheduling information provided by the MAC CE.

Although FIG. 7 illustrates the diagram 700 and the FIG. 8 illustrates the method 800 various changes may be made to FIGS. 7 and 8. For example, while the method 800 is shown as a series of steps, various steps could overlap, occur in parallel, occur in a different order, or occur multiple times.

In another example, steps may be omitted or replaced by other steps. For example, steps of the method 800 can be executed in a different order.

Various following embodiments of the present disclosure describe a second option for multi-cell scheduling information multiplexed in a PDSCH. This is described in the following examples and embodiments, such as those of FIGS. 9 and 10.

Figure 9:
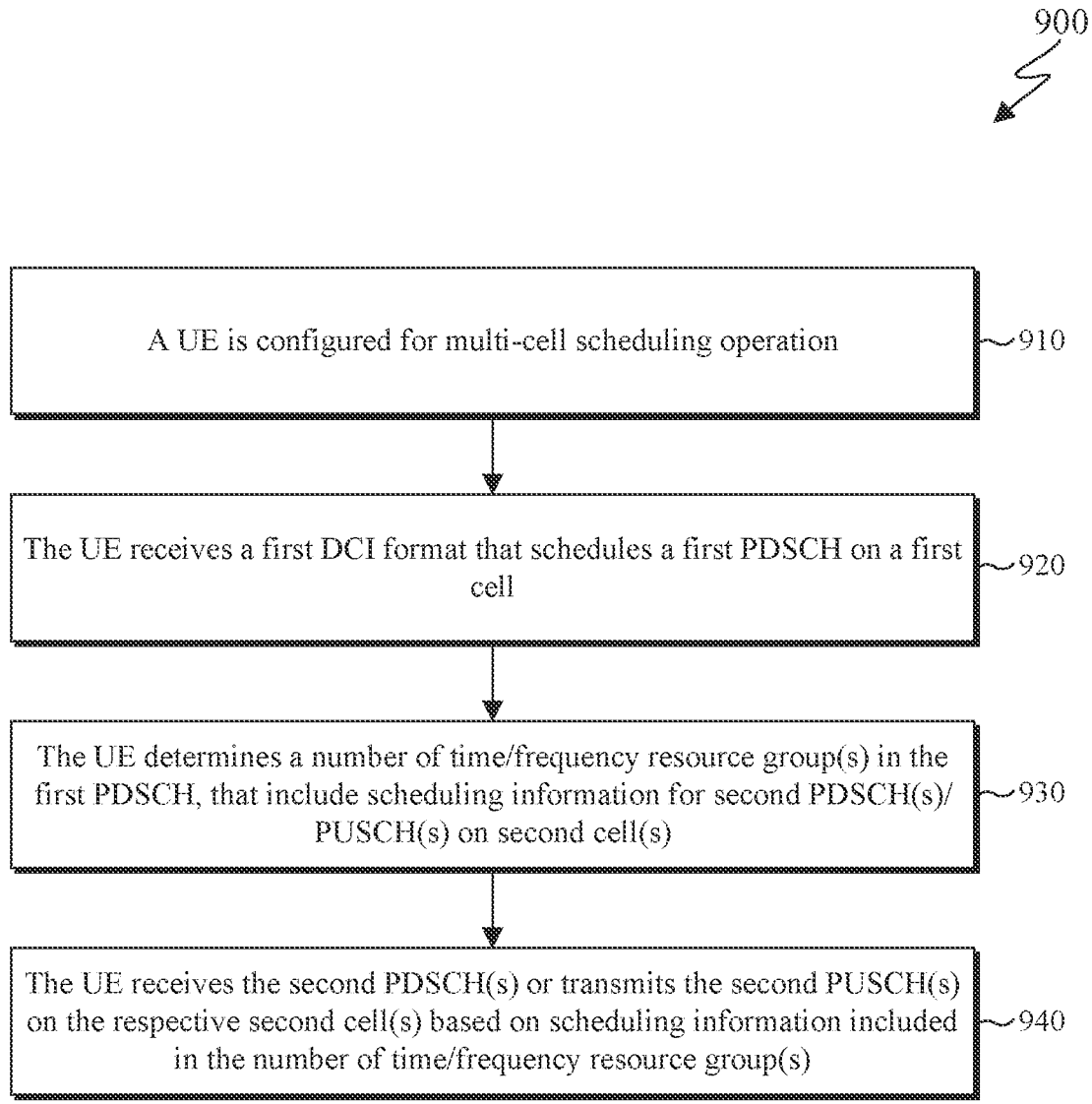
FIG. 9 illustrates a method for multi-cell scheduling based on a single-cell DCI format pointing to a PDSCH, in which multi-cell scheduling information is multiplexed according to embodiments of the present disclosure.
Figure 10:
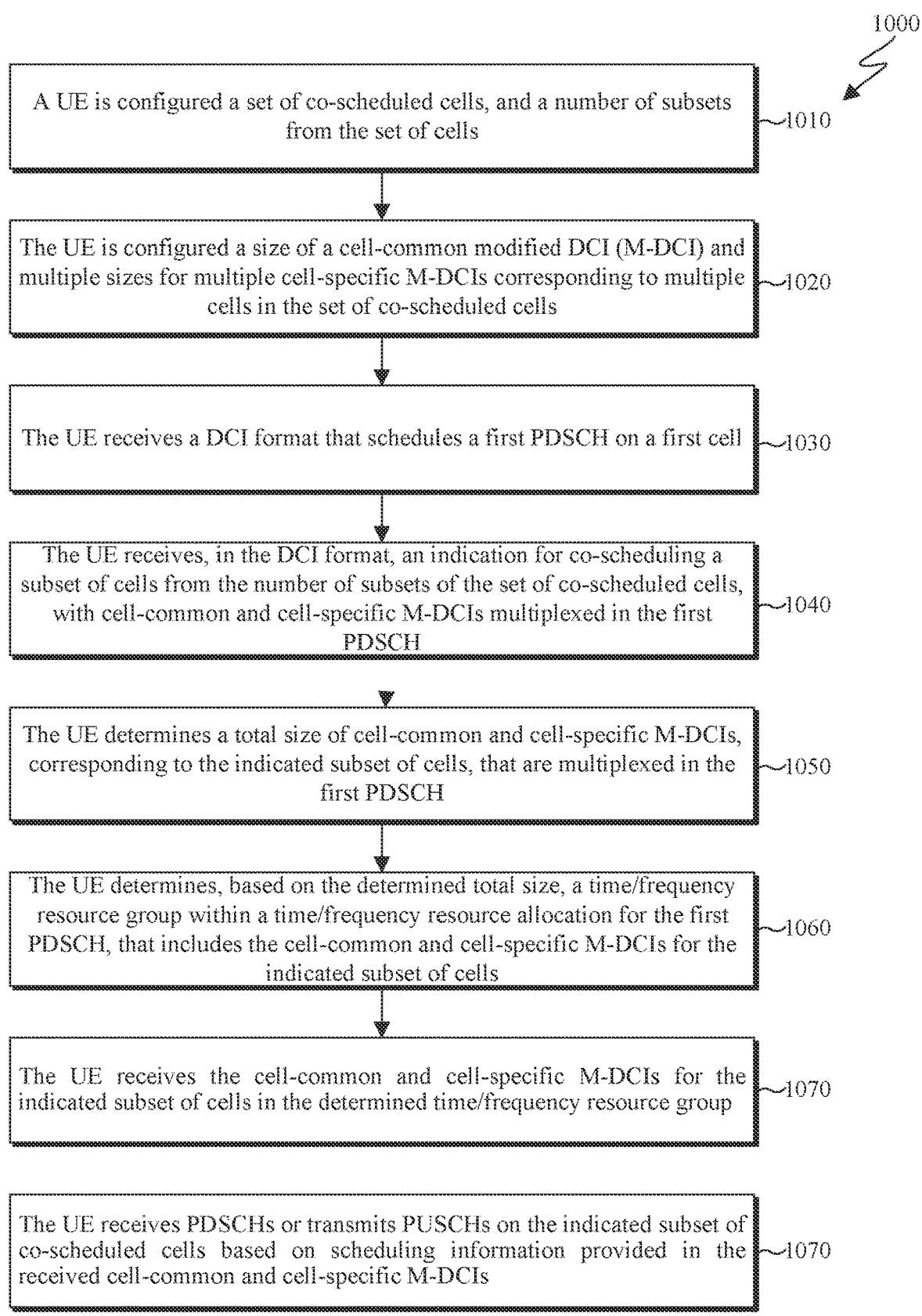
FIG. 10 illustrates a method for multi-cell scheduling based on a single-cell-scheduling DCI format pointing to a PDSCH, on which multi-cell scheduling information is multiplexed according to embodiments of the present disclosure.

FIG. 9 illustrates a method 900 for multi-cell scheduling based on a single-cell DCI format pointing to a PDSCH, in which multi-cell scheduling information is multiplexed according to embodiments of the present disclosure. FIG. 10 illustrates a method 1000 for multi-cell scheduling based on a single-cell-scheduling DCI format pointing to a PDSCH, on which multi-cell scheduling information is multiplexed according to embodiments of the present disclosure. The steps of the method 900 of FIG. 9 and the method 1000 of FIG. 10 can be performed by any of the UEs 111-119 of FIG. 1, such as the UE 116 of FIG. 3. The methods 900 and 1000 are for illustration only and other embodiments can be used without departing from the scope of the present disclosure.

In a second option, the UE receives a first PDSCH that is scheduled by a single-cell scheduling DCI format, and the UE receives additional scheduling information for one or more PDSCH(s)/PUSCH(s) on one or more respective co-scheduled cell(s). For example, the additional scheduling information can be multiplexed in one or more respective time/frequency resource group(s) from the time/frequency resources allocated to the first PDSCH.

In the second option, the UE can determine the scheduling information for the co-scheduled cell(s) by decoding the scheduling information in the time/frequency resource group(s) in the first PDSCH, similar to detecting a DCI format upon receiving and decoding a PDCCH in the physical layer. Therefore, there is no additional processing time delay for multi-cell scheduling beyond the one required for reception of the corresponding time-frequency resources. However, unlike PDCCH decoding, the UE does not expect to perform blind decoding to identify the time/frequency resource group(s) within the first PDSCH, in order to decode the additional scheduling for the one or more PDSCH(s)/PUSCH(s). Instead, the UE expects to receive information of such time/frequency resource group(s), as predetermined information in the specifications of the system operation, or via higher layer signaling, or in the single-cell DCI format that schedules the first PDSCH.

The method 900, as illustrated in FIG. 9, describes an example procedure for multi-cell scheduling based on a single-cell DCI format pointing to a PDSCH, in which multi-cell scheduling information is multiplexed.

In step 910, a UE (such as the UE 116) is configured for multi-cell scheduling operation. In step 920, the UE receives a PDCCH providing a first DCI format that schedules a first PDSCH on a first cell. In step 930, the UE determines a number of time/frequency resource group(s) in the first PDSCH, that include scheduling information for second PDSCH(s)/PUSCH(s) on second cell(s). In step 940, the UE receives the second PDSCH(s) or transmits the second PUSCH(s) on the respective second cell(s) based on scheduling information included in the number of time/frequency resource group(s).

In certain embodiments, the scheduling information for each PDSCH/PUSCH from the one or more PDSCH(s)/PUSCH(s) on a cell from the one or more respective co-scheduled cells is referred to as a M-DCI as it may not include all fields that are present in a DCI format for single-cell scheduling. In one example, each M-DCI includes full scheduling information for each corresponding co-scheduled cell. In another example, each M-DCI includes only cell-specific scheduling parameters for a respective co-scheduled cell, while cell-common scheduling parameters can be specified in the system operation, or provided via higher layer signaling, or as a MAC CE in the first PDSCH or in a different PDSCH. In yet another example, the UE can receive, in addition to cell-specific M-DCIs, a cell-common M-DCI in the first PDSCH, that includes only cell-common scheduling parameters that apply to all co-scheduled cells. In one example, a single-cell scheduling DCI format scheduling a first PDSCH that includes multi-cell scheduling information, can additionally provide a set of cell-common scheduling parameters for the set of co-scheduled cell(s) having scheduling information provided in the first PDSCH. For example, the cell-common scheduling parameters can include one or more of: a PRI, a TPC command for PUCCH, or a PDSCH-to-HARQ_feedback timing, that the UE commonly applies to all PDSCHs that are co-scheduled by the first PDSCH. Accordingly, such cell-common scheduling parameters are excluded from the M-DCIs provides in the first PDSCH. The cell-common scheduling parameters can apply to both the first PDSCH and the PDSCH(s)/PUSCH(s) on the co-scheduled cells having scheduling information included in the first PDSCH.

In one example, a single-cell scheduling DCI format that schedules a first PDSCH with multi-cell scheduling information can include only cell-common scheduling parameters that apply to the first PDSCH as well as other PDSCH (s)/PUSCH(s) on a respective set of co-scheduled cells. According to this example, the UE receives cell-specific scheduling parameters for the first PDSCH and the other co-scheduled PDSCH(s)/PUSCH(s) in corresponding M-DCIs that are multiplexed on the first PDSCH. Additional cell-common parameters can include a frequency-domain resource allocation (FDRA), time-domain resource allocation (TDRA), or a MCS. Such operation can be beneficial, for example, when the co-schedules cells are FR2 cells with intra-band CA operation and with same SCS configuration. In general, cell-common scheduling parameters can include a first set of scheduling parameters, such as a PRI, a TPC command, or a PDSCH-to-HARQ_feedback timing that are specified in the system operation, and a second set of cell-common scheduling parameters that are indicated to the UE by higher layer signaling.

In one example, a single-cell scheduling DCI format that schedules a first PDSCH with multi-cell scheduling information provides only some scheduling parameters for the first PDSCH, such as ones required to receive the PDSCH including a FDRA, TDRA, or MCS, while remaining scheduling parameters for the first PDSCH, such as HARQ related parameters, optionally configured parameters, or PUCCH related parameters for the first PDSCH, are provided in an additional M-DCI within the first PDSCH. The single-cell scheduling DCI format that schedules the first PDSCH can include other fields that indicate, for example, a number of co-scheduled cells, or time/frequency resource group(s) within the first PDSCH that are used for M-DCI multiplexing, as discussed in more detail subsequently. The indication of time/frequency resource group(s) can also include an indication of corresponding size(s), for example by providing a scaling factor to a number of REs computed by the UE. Such operation can be beneficial, for example, when a DCI format size for the single-cell DCI format that schedules the first PDSCH, after such modifications, can be same as a single-cell DCI format that schedules a single PDSCH without multi-cell scheduling information. The UE can distinguish a single-cell DCI format scheduling a PDSCH that does not include M-DCI(s) from a single-cell DCI format scheduling a PDSCH that includes M-DCI(s) based on, for example, a new RNTI that is used for scrambling a CRC of the DCI format corresponding to multi-cell scheduling, or by an explicit indication by a corresponding field in the DCI format.

In another example, a single-cell scheduling DCI format for a first PDSCH with multi-cell scheduling information can include full scheduling information for the first PDSCH and additionally include other fields that provide information about co-scheduled cells and for multiplexing of M-DCI(s) in the first PDSCH, such as the fields/parameters described above. In one example, such an extended single-cell DCI format can have a different size compared to a size of a single-cell DCI format that schedules a single PDSCH that does not include multi-cell scheduling information.

In order for the UE to de-multiplex the multi-cell scheduling information that is included in the first PDSCH, the UE expects to have information about a number of bits corresponding to the multi-cell scheduling information or for the M-DCIs. Such information can include indication(s), for example, for one or more of the following parameters. An example parameter can be a subset of co-scheduled cells, wherein the scheduling information can include a cell-common M-DCI and cell-specific M-DCIs and wherein the UE can be provided by higher layer signaling the fields and corresponding sizes for each cell-specific M-DCI for each corresponding cell. An example parameter can be a number of co-scheduled cells, or a number of cell-specific M-DCIs, or a total size of cell-specific M-DCIs, such as when all M-DCIs have same size and each M-DCI includes an indication, such as a cell index or a CIF, for a corresponding scheduled cell, or a cell-group index or CIF or bitmap for the number/subset/set of co-scheduled cells. An example parameter can be a number, and a corresponding size, of cell-common M-DCIs when the number is not by default equal to zero such as when cell-common fields are provided by the DCI scheduling the first PDSCH, or one and the size is not predetermined by specification of the system operation or by higher layer signaling An example parameter can be a number of CRC fields, with predetermined size such as 24 bits or configurable size such as 16 bits or 24 bits, for the M-DCIs, such as no CRC field, a single CRC field when all M-DCIs are jointly coded, or a separate CRC field for each M-DCI when each M-DCI is separately coded.

When multi-cell scheduling is always applicable to all cells in a set of co-scheduled cells (and not a subset thereof), the UE associates the M-DCIs to co-scheduled cells in ascending order of CIF values for the set of co-scheduled cells, without any additional indication.

In an example realization, a first DCI format scheduling a first PDSCH reception by a UE includes a field that indicates a subset of co-scheduled cells from a configured set of co-scheduled cells. For example, the subsets of cells can be configured by higher layers, corresponding indexes can be allocated in an ascending order of the configuration of the subsets of cells or can be separately configured, and the field in the first DCI format indicates an index of a subset. For example, the first field in the first DCI format can be a bitmap with a one-to-one association with cells from a configured set of co-scheduled cells.

Based on the indicated subset of co-scheduled cells, the UE determines a size for each M-DCI corresponding to each cell from the sub-set of cells. The determination of an M-DCI size is by adding the sizes of fields included in the M-DCI, wherein the fields and their sizes in the M-DCI are determined based on higher layer signaling for the corresponding cell or based on the specifications of the system operation. For example, higher layer signaling can indicate a size of a HARQ process number (HPN) field of 3 bits and an absence of a BWP indicator field (0 bits) for a first scheduled cell, a size of a HPN field of 4 bits and a presence of a BWP indicator field of 2 bits for a second scheduled cell, while an MCS field always exists with size of 5 bits as determined by the specifications of the system operation.

The cell-specific M-DCIs can be concatenated in an ascending order of CIF values or indexes of cells from the subset of co-scheduled cells, a 24-bit CRC can be appended, and the concatenated M-DCIs and the CRC can be jointly coded. The first DCI format can include all information of a single-cell scheduling DCI format, and then a cell-common M-DCI is not provided together with the cell-specific M-DCIs in the PDSCH, or the first DCI format does not include all cell-common fields and then a remaining cell-common M-DCI can be prepended to the cell-specific M-DCIs. It is also possible that the first DCI format provides partial information, such as FDRA, TDRA, and MCS fields, for the PDSCH and remaining information, such as an HPN, RV, or new data indicator (NDI), for the PDSCH is provided as an M-DCI in the PDSCH that is prepended to the other cell-specific M-DCIs.

The method 1000, as illustrated in FIG. 10 described an example procedure for multi-cell scheduling based on a single-cell-scheduling DCI format pointing to a PDSCH, on which multi-cell scheduling information is multiplexed.

In step 1010, a UE (such as the UE 116) is configured a set of co-scheduled cells, and a number of subsets from the set of cells. In step 1020, the UE is configured a size of a cell-common M-DCI and multiple sizes for multiple cell-specific M-DCIs corresponding to multiple cells in the set of co-scheduled cells. In step 1030, the UE receives a DCI format that schedules a first PDSCH on a first cell. In step 1040 the UE receives, in the DCI format, an indication for co-scheduling a subset of cells from the number of subsets of the set of co-scheduled cells, with cell-common and cell-specific M-DCIs multiplexed in the first PDSCH. In step 1050, the UE determines a total size of cell-common and cell-specific M-DCIs, corresponding to the indicated subset of cells, that are multiplexed in the first PDSCH. In step 1060, the UE determines, based on the determined total size, a time/frequency resource group within a time/frequency resource allocation for the first PDSCH, that includes the cell-common and cell-specific M-DCIs for the indicated subset of cells. In step 1070, the UE receives the cell-common and cell-specific M-DCIs for the indicated subset of cells in the determined time/frequency resource group. In step 1080, the UE receives PDSCHs or transmits PUSCHs on the indicated subset of co-scheduled cells based on scheduling information provided in the received cell-common and cell-specific M-DCIs.

Although FIG. 9 illustrates the method 900 and the FIG. 10 illustrates the method 1000 various changes may be made to FIGS. 9 and 10. For example, while the method 900 and the method 1000 are shown as a series of steps, various steps could overlap, occur in parallel, occur in a different order, or occur multiple times. In another example, steps may be omitted or replaced by other steps. For example, steps of the method 900 and the method 1000 can be executed in a different order.

Various embodiments of the present disclosure describe a physical layer processing for multi-cell scheduling information multiplexed in a PDSCH. This is described in the following examples and embodiments, such as those of FIG. 11.

Figure 11:
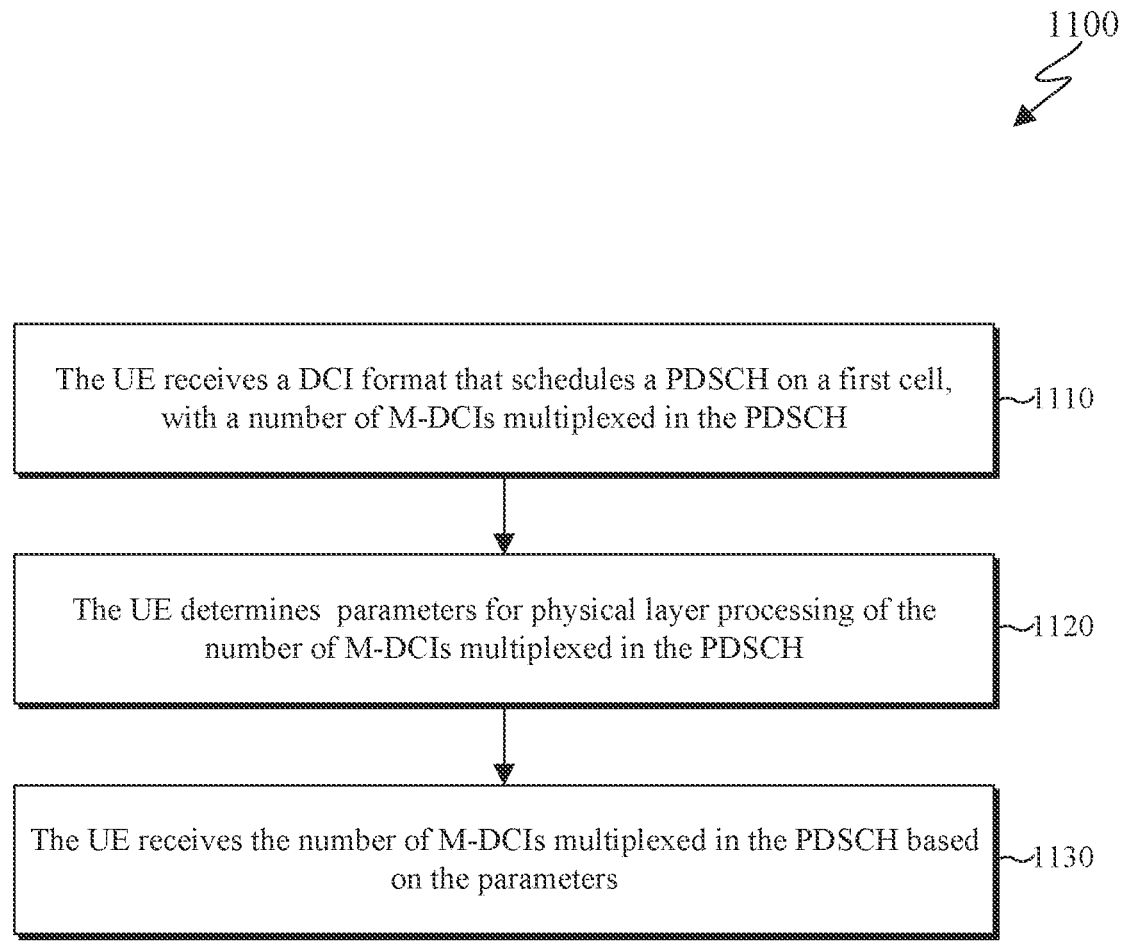
FIG. 11 illustrates a method for physical layer processing of modified-DCIs (M-DCIs) multiplexed in a PDSCH according to embodiments of the present disclosure.

FIG. 11 illustrates a method 1100 for physical layer processing of modified-DCIs (M-DCIs) multiplexed in a PDSCH according to embodiments of the present disclosure. The steps of the method 1100 of FIG. 11 can be performed by any of the UEs 111-119 of FIG. 1, such as the UE 116 of FIG. 3. The method 1100 is for illustration only and other embodiments can be used without departing from the scope of the present disclosure.

In certain embodiments, physical layer processing of M-DCI(s) that are included in a PDSCH can be same as that for a DCI in a PDCCH, such as for the DCI scheduling the PDSCH, or can be same as that for data information/transport block in the PDSCH. Herein, physical layer processing refers to, for example, modulation, coding, scrambling, and so on.

For a modulation scheme for coded symbols of M-DCI(s) multiplexed in a PDSCH, in one example, coded M-DCI(s) symbols in the PDSCH can be modulated with a same modulation scheme as DCI symbols scheduling the PDSCH, such as QPSK. In another example, coded M-DCI(s) symbols in a PDSCH can be modulated with a same modulation scheme as for data information/transport block in the PDSCH, wherein the modulation scheme is indicated by an MCS field in the DCI format that schedules the PDSCH.

In one example, when the PDSCH has transmission rank larger than one, namely when there are more than one spatial transmission layers for the data information, in one option, the M-DCIs are mapped to all spatial transmission layers (repetition across layers). In another option, the M-DCIs are spatially multiplexed on all layers. In one example, different modulation symbols of a M-DCI are mapped to different layers. For example, odd modulation symbols of a M-DCI are mapped to a first spatial layer, and even modulation symbols of the M-DCI are mapped to a second spatial layer. In another example, different M-DCIs are mapped to different spatial layers. For example, all modulation symbols of a first M-DCI are mapped to a first spatial layer and all modulation symbols of a second M-DCI are mapped to a second spatial layer. In yet another example, all M-DCIs are mapped to a single spatial layer, such as a first spatial layer, without mapping to other spatial layers.

For a coding scheme of M-DCIs multiplexed in a PDSCH, in one example, M-DCI(s) can be coded using a same coding scheme as for a DCI format scheduling the PDSCH, such as Polar coding. In another example, the coding scheme can be same as for data information/transport block in the PDSCH, such as LDPC coding. The coding scheme may also depend on the total payload of the M-DCI(s), wherein polar coding can be used when the total payload is smaller than or equal to a predetermined threshold and LDPC can be used otherwise. The total payload threshold can be specified in the system operation or be provided by higher layer signaling.

Cell-specific M-DCIs for corresponding co-scheduled cells, and a cell-common M-DCI, if any, can be separately or jointly coded in a PDSCH. Separate coding allows for controlling a reception reliability or a reception latency. For example, a first M-DCI having a first target block error ratio (BLER) can be separately coded using a different code rate than a second M-DCI having a second target BLER that is different than the first target BLER, and can be jointly coded with a third M-DCI having a third target BLER that is same as the first target BLER. For example, first M-DCIs scheduling PDSCH receptions or PUSCH transmissions requiring smaller latency can be located prior to M-DCIs scheduling PDSCH receptions or PUSCH transmissions that are latency tolerant. For example, M-DCIs scheduling cross-slot PDSCH receptions can be located after other M-DCIs in a PDSCH. Joint coding provides larger coding gains and lower overhead, as a single CRC is needed for the jointly coded M-DCIs.

A coding rate for M-DCIs in a PDSCH can be determined based on an offset relative to a coding rate that is indicated by an MCS field for the PDSCH, regardless of whether or not the PDSCH includes a TB. The offset can be configured by higher layer signaling, or can be indicated from a set of offsets configured by higher layer signaling by a field in a DCI format scheduling the PDSCH, or by a cell-common M-DCI in the PDSCH, or by an M-DCI in the PDSCH when the DCI format does not provide all scheduling information for the PDSCH. When the M-DCIs for respective scheduled cells can have different target BLERs, multiple corresponding offsets can be configured by higher layers or multiple sets of offsets can be configured by higher layers. When a different modulation scheme is used for the M-DCIs than the modulation scheme indicated for the PDSCH, the offset can be additionally scaled by the ratio $Q_m^{PDSCH}/Q_m^{M-DCI}$, wherein $Q_m=1$ for BPSK, $Q_m=2$ for QPSK, $Q_m=4$ for 16 QAM, $Q_m=6$ for 64 QAM, $Q_m=8$ for 256 QAM, and $Q_m=10$ for 1024 QAM. Therefore, the coding rates for an M-DCI can be determined as $r_{M-DCI}=(Q_m^{PDSCH}/Q_m^{M-DCI}) \cdot r_{PDSCH} \cdot r_{offset}$. Alternatively, a determination of coded modulation symbols for multiplexing M-DCIs in a PDSCH is described in herein.

It is also possible that the DCI format does not schedule reception of TBs in the PDSCH and only M-DCIs are multiplexed in the PDSCH. In that case, the M-DCIs can be multiplexed in the PDSCH in a same manner as for TB s and a determination of coded modulation symbols is based on the resource allocation indicated by the DCI format. Therefore, instead of scheduling a PDSCH transmission with TBs, the DCI format schedules a PDSCH transmission with M-DCIs wherein the M-DCIs are viewed as a TB. For example, a gNB (such as the BS 102) may have an empty data buffer for a UE on the scheduling cell.

Coded modulated symbols for M-DCI(s) can be scrambled using a same scrambling sequence as coded modulated data information symbols of a transport block in the PDSCH or using a separate scrambling sequence, for example, by using a same or different scrambling identity/sequence, such as a scrambling identity/sequence used for the DCI format scheduling the PDSCH.

The method 1100, as illustrated in FIG. 11, describes an example procedure for physical layer processing of M-DCIs multiplexed in a PDSCH according to the disclosure.

In step 1110, a UE (such as the UE 116) receives a DCI format that schedules a PDSCH on a first cell with a number of M-DCIs multiplexed in the PDSCH. In step 1120, the UE determines based on the DCI format or other configurations by higher layers, parameters for physical layer processing for M-DCIs multiplexed in the PDSCH. In step 1130, the UE receives the number of M-DCIs multiplexed in the PDSCH based on the parameters.

The timeline for a PDSCH reception or a PUSCH transmission on a second cell that is scheduled by a M-DCI received in a first PDSCH on a first cell can be defined relative to a last symbol of a slot on the second cell that overlaps with a last symbol where the M-DCI is received in a slot on the first cell.

In one example, the UE receives the second PDSCH in a slot $K_s$ when (i) the UE receives a single-cell scheduling DCI format that schedules a first PDSCH on a first cell with a subcarrier spacing configuration $\mu_{PDSCH,1}$, and (ii) the UE receives the first PDSCH in a slot n, and (iii) the first PDSCH includes an M-DCI that schedules a second PDSCH on a second cell, with a subcarrier spacing configuration $\mu_{PDSCH,2}$, and (iv) the M-DCI includes a TDRA field that indicates a value m pointing to a row index m+1 of a TDRA table, and (v) the row index m+1 of the TDRA table defines a slot offset $K_0$, based on a numerology of the second PDSCH on the second cell. $K_s$ is described in Equation (4), below.

$$K_s = \left\lfloor n \cdot \frac{2^{\mu_{PDSCH,2}}}{2^{\mu_{PDSCH,1}}} \right\rfloor + K_0 \qquad (4)$$

However, when the UE is not configured ca-SlotOffset for at least one of the first and second cell, and the UE receives the second PDSCH in a slot $K_s$, as described in Equation (5), below.

$$K_s = \left\lfloor n \cdot \frac{2^{\mu_{PDSCH,2}}}{2^{\mu_{PDSCH,1}}} \right\rfloor + K_0 + \left\lfloor \left( \frac{N_{slot,offset,PDSCH,1}^{CA}}{2^{\mu_{offset,PDSCH,1}}} - \frac{N_{slot,offset,PDSCH,2}^{CA}}{2^{\mu_{offset,PDSCH,2}}} \right) \cdot 2^{\mu_{PDSCH,2}} \right\rfloor \qquad (5)$$

However, when the UE is configured ca-SlotOffset for at least one of the first and second cell, (for example, when the first or second cell operate with unaligned frame boundary with slot alignment and partial SFN alignment inter-band CA), wherein $N_{slot,offset,PDSCH,1}^{CA}$ and $\mu_{offset,PDSCH,1}$ are the $N_{slot,offset}^{CA}$ and the $\mu_{offset}$, respectively, which are determined by higher-layer configured ca-SlotOffset for the first cell, and $N_{slot,offset,PDSCH,2}^{CA}$ and $\mu_{offset,PDSCH,2}$ are the $N_{slot,offset}^{CA}$ and the $\mu_{offset}$, respectively, which are determined by higher-layer configured ca-SlotOffset for the second cell.

A same timeline applies when a TDRA field is not provided in the M-DCI that schedules the second PDSCH, but is provided in another M-DCI in the first PDSCH, such as an M-DCI that includes cell-common scheduling parameters for multi-cell scheduling.

Similarly, in another example, the UE transmits the second PUSCH in a slot $K_s$, when (i) the UE receives a single-cell scheduling DCI format that schedules a first PDSCH on a first cell with a subcarrier spacing configuration $\mu_{PDSCH,1}$, and (ii) the UE receives the first PDSCH in a slot n, and (iii) the first PDSCH includes an M-DCI that schedules a second PUSCH on a second cell, with a subcarrier spacing configuration $\mu_{PUSCH,2}$, and (iv) the M-DCI includes a TDRA field that indicates a value m pointing to a row index m+1 of a TDRA table, and (v) the row index m+1 of the TDRA table defines a slot offset $K_2$, based on a numerology of the second PUSCH on the second cell. In this Example, $K_s$ is described In Equation (6), below.

$$K_s = \left\lfloor n \cdot \frac{2^{\mu_{PUSCH,2}}}{2^{\mu_{PDSCH,1}}} \right\rfloor + K_2 \qquad (6)$$

However, when the UE is not configured ca-SlotOffset for at least one of the first and second cell, and the UE transmits the second PUSCH in a slot $K_s$. In this example $K_s$ is described in Equation (7), below.

$$K_s = \left\lfloor n \cdot \frac{2^{\mu_{PUSCH,2}}}{2^{\mu_{PDSCH,1}}} \right\rfloor + K_2 + \left\lfloor \left( \frac{N_{slot,offset,PDSCH,1}^{CA}}{2^{\mu_{offset,PDSCH,1}}} - \frac{N_{slot,offset,PUSCH,2}^{CA}}{2^{\mu_{offset,PUSCH,2}}} \right) \cdot 2^{\mu_{PUSCH,2}} \right\rfloor \quad (7)$$

However, when the UE is configured ca-SlotOffset for at least one of the first and second cell, (for example, when the first or second cell operate with unaligned frame boundary with slot alignment and partial SFN alignment inter-band CA), wherein $N_{slot,\ offset,\ PDSCH,1}^{CA}$ and $\mu_{offset,PDSCH,1}$ are the $N_{slot,\ offset}^{CA}$ and the $\mu_{offset}$, respectively, which are determined by higher-layer configured ca-SlotOffset for the first cell, and $N_{slot,\ offset,\ PUSCH,2}^{CA}$ and $\mu_{offset,PUSCH,2}$ are the $N_{slot,\ offset}^{CA}$ and the $\mu_{offset}$, respectively, which are determined by higher-layer configured ca-SlotOffset for the second cell.

A same timeline applies when a TDRA field is not provided in the M-DCI that schedules the second PUSCH, but is provided in another M-DCI in the first PDSCH, such as an M-DCI that includes cell-common scheduling parameters for multi-cell scheduling.

In one example, when the UE transmits the second PUSCH without a transport block and with only CSI report(s) by indicated by a 'CSI request' field in the M-DCI that schedules the second PUSCH, the UE determines a $K_2$ value as $$K_2 = \max_j Y_j(m+1),$$

wherein $Y_j(m+1)$ is the $(m+1)$th entry of $Y_j$ and $Y_j$, j=0, ..., $N_{Rep}$–1 are the corresponding list entries of the higher layer parameter (i) reportSlotOffsetListDCI-0-2, if the second PUSCH is scheduled by an M-DCI with same fields as a DCI format 0_2 and reportSlotOffsetListDCI-0-2 is configured; (ii) reportSlotOffsetListDCI-0-1, if the second PUSCH is scheduled by an M-DCI with same fields as a DCI format 0_1 and reportSlotOffsetListDCI-0-1 is configured; (iii) reportSlotOffsetList, otherwise; in CSI-ReportConfig for the $N_{Rep}$ triggered CSI Reporting Settings. In another example, the UE can be configured a new higher layer parameter reportSlotOffsetListMDCI for a PUSCH that is scheduled by an M-DCI in a PDSCH.

In one example, the UE receives the second PDSCH or transmits the second PUSCH in a slot $K_s$, when (i) the UE receives a single-cell scheduling DCI format in a PDCCH in a slot m, with a subcarrier spacing configuration $\mu_{PDCCH}$, and (ii) the DCI format schedules a first PDSCH in a slot n on a first cell with a subcarrier spacing configuration $\mu_{PDSCH,1}$, and (iii) the first PDSCH includes an M-DCI that schedules a second PDSCH or PUSCH on a second cell, with a subcarrier spacing configuration $\mu_{PDSCH,2}$ or $\mu_{PUSCH,2}$ respectively, and (iv) a TDRA field for the second PDSCH or PUSCH is provided in the single-cell scheduling DCI format that schedules the first PDSCH, for example, as a cell-common scheduling parameter, (not by a M-DCI in the first PDSCH). In this example, the slot $K_s$, is relative to the slot m and offset by a parameter $K_0$ or $K_2$, respectively, as determined from the TDRA field provided in the single-cell scheduling DCI format, and wherein slot counting takes the subcarrier spacing configuration $\mu_{PDCCH}$ and subcarrier spacing configuration $\mu_{PDSCH,2}$ or $\mu_{PUSCH,2}$ into account (and does not apply the subcarrier spacing configuration $\mu_{PDSCH,1}$). For example, for the case of SFN-aligned CA, the UE receives the second PDSCH in a slot $K_s$, as described in Equation (8), below.

$$K_s = \left\lfloor m \cdot \frac{2^{\mu_{PDSCH,2}}}{2^{\mu_{PDCCH}}} \right\rfloor + K_0 \quad (8)$$

In another example, for the above case, the UE operates with a same timeline as described earlier for a case where the TDRA field is provided by an M-DCI multiplexed in the first PDSCH.

As the UE can receive the PDCCH on a cell that is different from the first cell on which the UE receives the first PDSCH, the subcarrier spacing configuration $\mu_{PDCCH}$ can be different from the subcarrier spacing configuration $\mu_{PDSCH,1}$. In addition, slot m for reception of the PDCCH can be different from, and may not overlap with, slot n for reception of the first PDSCH.

Although FIG. 11 illustrates the method 1100 various changes may be made to FIG. 11. For example, while the method 1100 is shown as a series of steps, various steps could overlap, occur in parallel, occur in a different order, or occur multiple times. In another example, steps may be omitted or replaced by other steps. For example, steps of the method 1100 can be executed in a different order.

Various embodiments of the present disclosure describe a resource allocation and rate matching for multi-cell scheduling information multiplexed on a PDSCH. This is described in the following examples and embodiments, such as those of FIG. 12.

Figure 12:
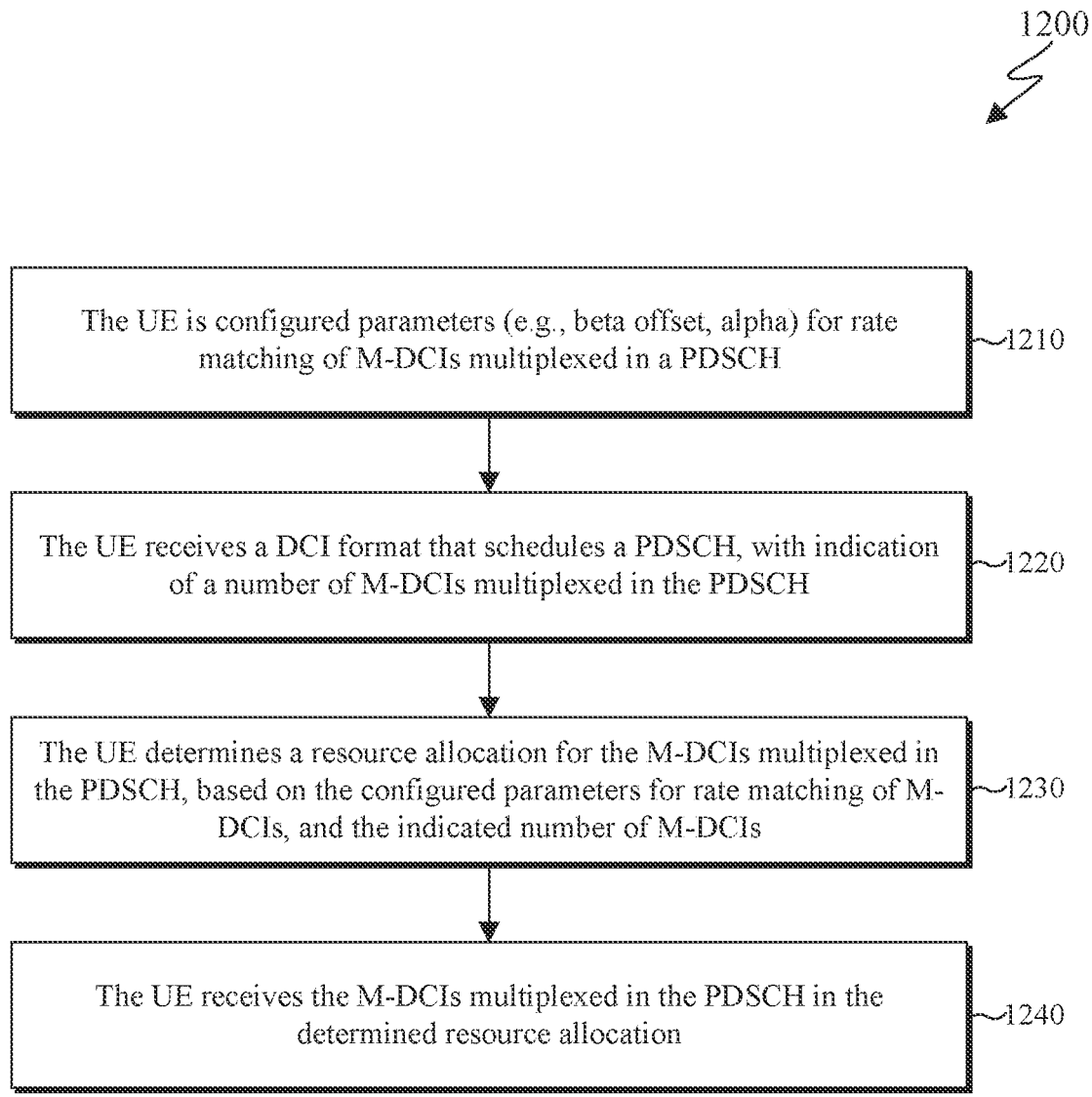
FIG. 12 illustrates a method for a determination of resource allocation for multi-cell scheduling information that is multiplexed in a PDSCH according to embodiments of the present disclosure.

FIG. 12 illustrates a method 1200 for a determination of resource allocation for multi-cell scheduling information that is multiplexed in a PDSCH according to embodiments of the present disclosure. The steps of the method 1200 of FIG. 12 can be performed by any of the UEs 111-119 of FIG. 1, such as the UE 116 of FIG. 3. The method 1200 is for illustration only and other embodiments can be used without departing from the scope of the present disclosure.

In certain embodiments, a UE (such as the UE 116) can determine a number of coded modulation symbols corresponding to multi-scheduling information, such as M-DCIs, that are multiplexed in a first PDSCH scheduled by a single-cell scheduling DCI format, based on a scaling factor $\beta_{offset}^{PDSCH} = \beta_{offset}^{M-DCI}$ applied to a total (coded) payload size for the M-DCIs. Such scaling factor determines an effective channel coding rate of M-DCIs multiplexed on the first PDSCH, for flexible link adaptation and improved reliability of the M-DCIs according to physical channel conditions. The UE allocates the coded modulation symbols for M-DCIs to time/frequency resources within the first PDSCH, in a frequency-first, time-second manner, except for reserved resources corresponding to reference signals or other cell broadcast transmissions. The UE can start receiving the M-DCIs in a first symbol of the first PDSCH, or in a first symbol after first symbols with DM-RS REs in the first PDSCH.

In one example, the UE can be provided a single $I_{offset}^{M-DCI}$ index by higher layer signaling. In another example, the UE can be configured multiple $I_{offset}^{M-DCI}$ indexes, such as four indexes, and the UE can be indicated one index from the multiple/four indexes for a first PDSCH by a N bit field, such as N=2, in the single-cell scheduling DCI format that schedules the first PDSCH. Each $I_{offset}^{M-DCI}$ index can point to a row in a predetermined table of $\beta_{offset}^{M-DCI}$ values so that the UE can determine a $\beta_{offset}^{M-DCI}$ value corresponding to the configured/indicated $I_{offset}^{M-DCI}$ index. In one example, a table of $\beta_{offset}^{M-DCI}$ values can be same as or a subset of a table for CSI multiplexing on PUSCH, such as $\beta_{offset}^{CSI,1}$ or $\beta_{offset}^{CSI,2}$ values, or a table for HARQ-ACK information or CG-UCI multiplexing on PUSCH, such as $\beta_{offset}^{HARQ-ACK}$ or $\beta_{offset}^{CG-UCI}$ values, as provided in the specifications for the system operation. In another example, the UE can be provided a separate, new table for $\beta_{offset}^{M-DCI}$ values.

In one example, the UE can be configured a parameter a that controls a maximum number of coded modulation symbols for M-DCIs in a PDSCH, in order to control a maximum number of time/frequency resources allocated to M-DCIs that are multiplexed on the PDSCH. Such maximum resource allocation depends only on the FDRA and TDRA for the PDSCH, and is independent of a payload size of the M-DCIs, or a modulation scheme or a coding rate that is used for the PDSCH or the M-DCIs.

In one example, a time/frequency (T/F) resource allocation for M-DCIs multiplexed on a PDSCH can have a granularity of REs or RBs. When a granularity of T/F resource allocation for the M-DCIs is an RB, the UE counts a number of vacant/remaining REs, if any, in an RB such as a last RB for M-DCI multiplexing, towards a number of coded modulation symbols generated for M-DCIs.

Coded bits of the M-DCIs are allocated to T/F resources in an order of frequency first, time second. For example, the UE can receive coded bits corresponding to the M-DCIs in REs/RBs of a first OFDM symbol first, before receiving them in a next/second symbol. In one example, the UE expects to receive M-DCIs in consecutive REs/RBs within a same symbol.

A UE (such as the UE 116) can receive M-DCIs distributed/interleaved across non-consecutive REs of a same symbol. For example, the UE can receive M-DCIs in consecutive REs/RBs of a symbol, when a number of required REs/RBs to receive an M-DCI/the M-DCIs are larger than a threshold, such as half of, remaining REs in the symbol. Conversely, the UE can receive M-DCIs in equally spaced REs/RBs of a same symbol, optionally with an offset, when a number of required REs to receive M-DCI(s) does not exceed the threshold, such as half of, the remaining REs/RBs in the symbol. Herein, the threshold and the offset can be predetermined in the specifications for the system operation or can be configured by higher layer signaling.

In one example, the UE can receive M-DCIs in same symbol(s) with a DM-RS associated with the PDSCH, namely, M-DCI(s) can be frequency multiplexed in a same symbol with DM-RS. In another example, such frequency multiplexing can include predetermined/configured gaps, such as at least K=2 REs of frequency gap between an RE allocated to M-DCI compared to an RE allocated to DM-RS in the same symbol. The UE can receive the first PDSCH in such frequency gaps. In yet another example, the UE does not expect that M-DCI(s) are frequency multiplexed, in a same symbol, with DM-RS corresponding to the PDSCH. In one example, M-DCI(s) can have respective dedicated DM-RS(s) for demodulation, such as when a transmission for M-DCIs and for TB in the PDSCH are not from same TRPs, or can use a DM-RS corresponding to the PDSCH.

In one example, the UE does not expect to receive M-DCI in T/F resources that are not available in the PDSCH, such as (i) aperiodic zero padding (ZP) CSI-RS resource sets indicated by a ZP CSI-RS trigger field in the single-cell scheduling DCI format, or (ii) reserved resource patterns indicated by a rate matching indicator field in the single-cell scheduling DCI format, or (iii) T/F resources used for PDCCH reception, such as a PDCCH that includes the single-cell scheduling DCI format that schedules the PDSCH, and corresponding DM-RS(s), or (iv) T/F resources corresponding to SS/PBCH blocks, or (v) T/F resources corresponding to LTE Cyclic Redundancy Check (CRS), or (vi) T/F resources corresponding to any other reference signal, such as CSI-RS or SRS or phase tracking reference signal (PT-RS) or positioning reference signal (PRS), and so on.

Equivalently, the UE expects that M-DCIs are rate-matched around such unavailable resources, as is done for the PDSCH. Unlike the rate matching of M-DCIs multiplexed in a PDSCH, the UE drops a DCI reception in a PDCCH when there are any corresponding REs that are also indicated for transmission of CRS or for transmission of SS/PBCH blocks.

In one example, the UE can receive M-DCIs in same symbol(s) of the PDSCH that include unavailable resources, such as those described above. That is, M-DCIs can be frequency multiplexed with the above-mentioned unavailable resources. In another example, the UE does not expect M-DCIs to be frequency multiplexed in a same symbol with a DL/UL transmission around which the first PDSCH needs to be rate matched, such as those described above.

A UE can determine a number $Q'_{M-DCI}$ of coded modulation symbols for multiplexing M-DCIs in a PDSCH, prior to any duplication/allocation across spatial layers, if present, as described in Equation (9), below $$Q'_{M-DCI} = \min\left\{\left\lceil\frac{(O_{M-DCI} + L_{M-DCI}) \cdot \beta_{offset}^{M-DCI}}{Q_m^{M-DCI} \cdot R}\right\rceil, \left\lceil\alpha \sum_{l=l_0}^{N_{symbol}^{PDSCH,1}-1} M_{sc}^{M-DCI}(l)\right\rceil\right\} + \gamma \qquad (9)$$

In Equation (9), the expression $O_{M-DCI}$ is a number of bits for the M-DCIs. In Equation (9), the expression $L_{M-DCI}$ is a number of CRC bits for the M-DCIs, such as 24 bits. In Equation (9), the expression $\beta_{offset}^{M-DCI}$ is configured by higher layers or indicated in the single-cell scheduling DCI format. In Equation (9), the expression $Q_m^{M-DCI}$ is a modulation order of M-DCIs, such as predetermined to have a value 2 corresponding to QPSK, or same as a modulation order for the first PDSCH as indicated by an MCS field in the single-cell scheduling DCI format. In Equation (9), the expression R is a coding rate of the PDSCH as indicated by the MCS field in in the single-cell scheduling DCI format, or a coding rate for the M-DCIs that can be a configured/indicated offset relative the coding rate of the first PDSCH. In Equation (9), the expression $\alpha$ is configured by a higher layer parameter dl-Scaling. In Equation (9), the expression $l_0$ is a first symbol of the first PDSCH in which the UE multiplexes the M-DCIs, such as $l_0=0$ when the UE starts M-DCI multiplexing from the first symbol of the PDSCH, or $l_0$ is a symbol index of a first OFDM symbol of the PDSCH that does not include DM-RS REs when the UE starts M-DCI multiplexing after the first OFDM symbol with DM-RS REs. In Equation (9), the expression $N_{symbol}^{PDSCH,1}$ is a total number of OFDM symbols allocated to the PDSCH. In Equation (9), the expression $M_{sc}^{M-DCI}(l)$ is a number of resource elements that can be used for transmission of the M-DCIs in an OFDM symbol l of the PDSCH, for $l=0, 1, 2, \ldots, N_{symbol}^{PDSCH,1}-1$, and can be determined as $M_{sc}^{M-DCI}(l)=M_{sc}^{PDSCH,1}(l)-M_{sc}^{unavailable}(l)$, wherein (i) $M_{sc}^{PDSCH,1}(l)$ is a scheduled bandwidth of the PDSCH transmission, expressed as a number of subcarriers, in the OFDM symbol l of the PDSCH; and (ii) $M_{sc}^{unavailable}(l)$ is a number of subcarriers, within the frequency domain resources such as RBs scheduled for the PDSCH, in OFDM symbol l that are not available to the PDSCH transmission, such as aperiodic ZP CSI-RS resource sets indicated by a ZP CSI-RS trigger field or reserved resource patterns indicated by a rate matching indicator field in the single-cell scheduling DCI format, or any other unavailable resources, such as resources used for PDCCH, or SS/PBCH block, or LTE CRS, and so on. Additionally, in Equation (9), the expression γ is a number of vacant resource elements in a resource block in which a last coded modulation symbol of M-DCIs belongs/is multiplexed, when an RB-level granularity is used for M-DCI multiplexing in the PDSCH, and γ=0 when an RE-level granularity is used.

In one example, in the above formula for $Q'_{M-DCI}$, the parameter $Q_m^{M-DCI}$ can be replaced with the parameter $Q_m^{PDSCH,1}$ corresponding to a modulation order of the first PDSCH.

In another example, the UE determines a number of coded modulation symbols generated for M-DCIs to be multiplexed on a PDSCH, prior to any duplication/allocation across spatial layers if present, denoted as $Q'_{M-DCI}$, as described in Equation (10), below.

$$Q'_{M-DCI} = \min\left\{\left\lceil\frac{(O_{M-DCI} + L_{M-DCI}) \cdot \beta_{offset}^{M-DCI} \cdot \sum_{l=l_0}^{N_{symbol}^{PDSCH,1}-1} M_{sc}^{M-DCI}(l)}{\sum_{r=0}^{C_{DL-SCH}-1} K_r}\right\rceil, \left\lceil\alpha \sum_{l=l_0}^{N_{symbol}^{PDSCH,1}-1} M_{sc}^{M-DCI}(l)\right\rceil\right\} + \gamma \quad (10)$$

In Equation (10), the expression $C_{DL-SCH}$ is a number of code blocks for DL-SCH of the first PDSCH transmission. In Equation (10), the expression $K_r$ is a size of r-th code block of DL-SCH of the first PDSCH transmission, for $r=0, \ldots, C_{DL-SCH}-1$; if code-block group (CBG) operation is configured for the first PDSCH in which the M-DCIs are multiplexed, and if the single-cell scheduling DCI format scheduling the first PDSCH transmission includes a CBG transmission indication (CBGTI) field indicating that the UE shall not transmit the r-th code block, $K_r=0$. In Equation (10), all other parameters are defined as in the previous example.

Herein, the single-cell scheduling DCI format refers to the DCI format that schedules the PDSCH on the first cell, on which the M-DCIs are multiplexed.

The input bit sequence to rate matching for the M-DCIs is $d_0, d_1, d_2, d_3, \ldots, d_{N-1}$, where N is the number of channel coded bits for the M-DCIs. Rate matching is performed according to legacy procedure, such as one or more of sub-block interleaving, bit selection, or bit interleaving. The output bit sequence after rate matching is denoted as $g_0^{M-DCI}, g_1^{M-DCI}, g_2^{M-DCI}, g_3^{M-DCI}, \ldots, g_{G^{M-DCI}-1}^{M-DCI}$, where $G^{M-DCI}=Q'_{M-DCI} \cdot Q_m^{M-DCI}$ and $Q_m^{M-DCI}$ is modulation order of M-DCIs. In one example, a threshold is provided by the specifications for system operation or via higher signaling, that limits a maximum number of bits corresponding to the M-DCIs after the rate matching procedure. For example, a UE is not expected to have $G^{M-DCI}>4096$.

In one example, the UE can receive some M-DCIs, such as a last M-DCI or a lowest priority M-DCI to be punctured onto the coded bits corresponding to the PDSCH transport block (DL-SCH). For instance, the UE expects such puncturing when a number of coded bits such M-DCIs are smaller than a predetermined/configured threshold.

In the above example, it is assumed that all M-DCIs for the co-scheduled cells are jointly coded. In another example, when each M-DCI is separately coded, or when each group of M-DCIs are separately coded, such as when M-DCIs scheduling UL transmissions are coded separately from M-DCIs scheduling DL receptions, then, the same formula(s) can apply to a first M-DCI or a first group of M-DCIs, and the UE can apply a modified formula for a second M-DCI or a second group of M-DCIs. For example, if the UE determines a number $Q'_{M-DCI,1}$ of coded modulation symbols for a first M-DCI or for a first group of M-DCIs using the above formula(s), the UE can determine a number $Q'_{M-DCI,2}$ of coded modulation symbols for a second M-DCI or for a second group of M-DCIs as described in Equation (11) or Equation (12), below.

$$Q'_{M-DCI,2} = \min\left\{\left\lceil\frac{(O_{M-DCI,2} + L_{M-DCI,2}) \cdot \beta_{offset}^{M-DCI,2}}{Q_m^{M-DCI,2} \cdot R_2}\right\rceil, \left\lceil\alpha \sum_{l=l_0}^{N_{symbol}^{PDSCH,1}-1} M_{sc}^{M-DCI}(l) - Q'_{M-DCI,1}\right\rceil\right\} + \gamma_2 \quad (11)$$

$$Q'_{M-DCI,2} = \min\left\{\left\lceil\frac{(O_{M-DCI,2} + L_{M-DCI,2}) \beta_{offset}^{M-DCI,2} \cdot \sum_{l=0}^{N_{symbol}^{PDSCH,1}-1} M_{sc}^{M-DCI}(l)}{\sum_{r=0}^{C_{DL-SCH}-1} K_r}\right\rceil, \left\lceil\alpha \sum_{l=l_0}^{N_{symbol}^{PDSCH,1}-1} M_{sc}^{M-DCI}(l) - Q'_{M-DCI,1}\right\rceil\right\} + \gamma_2 \quad (12)$$

In Equations (11) and (12), any parameters with a subscript '2' are defined similar to definitions in the previous example, but for the second M-DCI or the second group of M-DCIs.

Herein, an ordering/indexing of M-DCIs or groups of M-DCIs that are separately coded and multiplexed in a PDSCH can be predetermined in the specifications for system operation or provided by higher layers or indicated in the single-cell scheduling DCI format that schedules the PDSCH. For example, an ordering of M-DCIs can be in ascending order of CIF values for the cells that are co-scheduled by the M-DCIs. In another example, an ordering can be first with respect to a link direction, such as uplink first and downlink second, namely, in ascending order of CIF values for co-scheduled cells with a PUSCH transmission, and then in ascending order of CIF values for co-scheduled cells with a PDSCH reception. In another example, the UE can be provided with an explicit priority level for an M-DCI corresponding to each co-scheduled cell, or the UE can be indicated an explicit ordering of M-DCIs, for example, by the single-cell scheduling DCI format indicating an index of a priority pattern from a number of configured priority patterns.

In the above method and examples for multiplexing M-DCIs on a first PDSCH, when the first PDSCH is configured or indicated to be received with repetitions, the rate matching formula(s) considered above can be further scaled by a number of PDSCH repetitions.

The method 1200 as illustrated in FIG. 12 describes an example procedure for determination of resource allocation for multi-cell scheduling information that is multiplexed in a PDSCH according to the disclosure.

A UE (such as the UE 116) is provided, such as by specifications for system operation, resource mapping rules for multiplexing of modified DCIs (M-DCIs) in a PDSCH. In step 1210, the UE is configured parameters, such as beta offset, alpha, for rate matching of M-DCIs multiplexed in a PDSCH. In step 1220, the UE receives a DCI format that schedules a PDSCH, with indication of a number of M-DCIs multiplexed in the PDSCH. In step 1230, the UE determines a resource allocation for the M-DCIs multiplexed in the PDSCH, based on the provided resource mapping rules, the configured parameters for rate matching of M-DCIs, and the indicated number of M-DCIs. In step 1240, the UE receives the M-DCIs multiplexed in the first PDSCH in the determined resource allocation.

In one example, in case of separate coding of M-DCIs in a PDSCH, a time/frequency (T/F) resource group within a PDSCH that includes a M-DCI for a PDSCH/PUSCH from the co-scheduled PDSCH(s)/PUSCH(s), can include: (i) a set of REs or RBs; or (ii) a set of resource element groups (REGs), wherein each REG can be composed of L OFDM symbols and K consecutive REs in one RB; or (iii) a set of scheduling information elements (SIEs), wherein each SIE includes M RBs or REs or REGs, that are allocated either consecutively in time/frequency or according to a predetermined/configured mapping.

Herein, consecutive refers to consecutive resource allocation in time or frequency. One or more of the values of L, K, and M can be predetermined in the specification of the system operation or can be provided by higher layer signaling.

The set of REs or RBs or REGs or SIEs corresponding to each scheduling information block can be consecutive or non-consecutive and may or may not be interleaved, for example according to virtual resource block (VRB)-to-PRB interleaving, when any, applied to the first PDSCH.

In one example, the multiple T/F resource groups within the first PDSCH that correspond to the multiple M-DCIs, are provided in a same order as an order of indexes of the co-scheduled cells, or as in the order of cells when indicated in the single-cell DCI format that schedules the first PDSCH.

The multiple T/F resource groups can be in adjacent/consecutive resources within the first PDSCH, or can be separated by T/F resource gaps where data is included.

In one example, the T/F resource group(s) within the first PDSCH that include the multi-cell scheduling information can be of same size or different sizes. For example, a first T/F resource group can include a first number of REs or RBs or REGs or SIEs, and a second T/F resource group can include a second number of REs or RBs or REGs or SIEs, wherein the first number and the second number can be same or different. For example, a number of REs or RBs or REGs or SIEs of a T/F resource group can depend on a bandwidth of an active DL/UL BWP of a respective co-scheduled cell. In one example, the multiple scheduling information blocks corresponding to multiple PDSCHs/PUSCHs on respective multiple co-scheduled cells are size-aligned and allocated a same number of REs/RBs/REGs/SIEs within the first PDSCH, for example, to achieve a same reliability.

Accordingly, the UE can determine a T/F resource group within the first PDSCH that includes a M-DCI, based on information of a set of indexes of the REs or RBs or REGs or SIEs, and so on, of the T/F resource group. An indexing can be a predetermine order for resources, such as frequency first, then time. For example, M-DCI(s) are mapped to T/F resources in frequency resources/REs/RBs within a same OFDM symbol first, before mapping to frequency resources/REs/RBs within the next symbol. In one example, M-DCI(s) are mapped not to all, but only to a subset of frequency resources/REs/RBs within a symbol, as provided by specifications for system operation or by higher layer configuration.

In another example, when the REs/RBs/REGs/SIEs of a T/F resource group are non-consecutive, information for the set of indexes of the REs/RBs/REGs/SIEs can include a first absolute index of a first RE/RB/REG/SIE followed by a number of differential indexes. Herein, a differential index of a second RE/RB/REG/SIE refers to a difference of a second absolute index for the second RE/RB/REG/SIE from the first absolute index of the first RE/RB/REG/SIE. When REs/RBs/REGs/SIEs are equally spaces, such information can include a first absolute index of a first RE/RB/REG/SIE and a size of a gap between two REs/RBs/REGs/SIEs, for example, in terms of a number of REs/RBs/REGs/SIEs.

In yet another example, when the REs/RBs/REGs/SIEs of a T/F resource group are consecutive, information for the set of indexes of the REs/RBs/REGs/SIEs can include a first absolute index of a first RE/RB/REG/SIE followed by an information of a number of (remaining/subsequent) REs/RBs/REGs/SIEs.

In one example, when: (i) different T/F resource groups within the first PDSCH that include the multi-cell scheduling information, are of a same size, and (ii) each T/F resource group corresponding to a M-DCI includes consecutive REs/RBs/REGs/SIEs, then, information for respective sets of indexes of REs/RBs/REGs/SIEs for respective T/F resource groups can include: (i) a common value for a number of REs/RBs/REGs/SIEs within each T/F resource group, and (ii) values for respective first absolute index of respective first RE/RB/REG/SIE of each T/F resource group.

In one example, when (i) different T/F resource groups within the first PDSCH that include the multi-cell scheduling information, are of a same size, and (ii) each T/F resource group corresponding to a M-DCI includes consecutive REs/RBs/REGs/SIEs, and (iii) the multiple T/F resource groups corresponding to the multiple M-DCIs are consecutive, without any time/frequency gap, then, information for respective sets of indexes of REs/RBs/REGs/SIEs for respective T/F resource groups can include: (i) a common value for a number of REs/RBs/REGs/SIEs within each T/F resource group, and (ii) a value for a first absolute index of a first RE/RB/REG/SIE of a first T/F resource group. Accordingly, the UE can determine index for a first RE/RB/REG/SIE of any other T/F resource group.

In one example, when (i) different T/F resource groups within the first PDSCH that include the multi-cell scheduling information, are of a same size, and (ii) each T/F resource group corresponding to a M-DCI includes consecutive REs/RBs/REGs/SIEs, and (iii) the multiple T/F resource groups corresponding to the multiple M-DCIs are separated with a same fixed time/frequency gap, then, information for respective sets of indexes of REs/RBs/REGs/SIEs for respective T/F resource groups can include: (i) a common value for a number of REs/RBs/REGs/SIEs within each T/F resource group, and (ii) a value for a first absolute index of a first RE/RB/REG/SIE of a first T/F resource group, and (iii) a value of the same fixed time/frequency gap among adjacent T/F resource groups. Accordingly, the UE can determine index for a first RE/RB/REG/SIE of any other T/F resource group.

In one example, information for the respective set(s) of indexes of the REs/RBs/REGs/SIEs within respective T/F resource groups that provide multi-cell scheduling information, can be: (i) predetermined in the specifications for system operation; or (ii) provided by higher layer configuration; or (iii) indicated by the single-cell scheduling DCI format; or (iv) implicitly determined by the UE based on a PDCCH that includes the single-cell scheduling DCI format.

For example, specifications for system operation or higher layer configuration can provide a mapping between a number of co-scheduled cells, and information for the respective location(s) of the T/F resource groups. Then, the UE can determine location(s) of the T/F resource groups based on a number of co-scheduled cells as provided by the single-cell scheduling DCI format, and the provided mapping. Herein, location(s) of the T/F resource groups refer to the set(s) of indexes of the REs/RBs/REGs/SIEs within respective T/F resource groups.

In another example, the single-cell scheduling DCI format that schedules the first PDSCH can provide an indication for the number/indexes of co-scheduled cells and/or information for the respective location(s) of the T/F resource groups that include the M-DCIs.

For the implicit determination approach, for example, the UE can be provided with a predetermined or configured mapping between information for the respective set(s) of indexes of the REs/RBs/REGs/SIEs within respective T/F resource groups, and a PDCCH monitoring parameter. For example, the PDCCH monitoring parameter can be: a CORESET ID; or a search space ID; or a carrier indicator parameter n_CI; or index of a first CCE index; or indexes of a set of CCEs; on which the UE detects the single-cell scheduling DCI format that schedules the first PDSCH. The UE can determine values of the set(s) of resource indexes, based on a value of the PDCCH monitoring parameter, similar to the methods described in the third option for the second approach for determination of indexes for the co-scheduled cells.

In one example, M-DCI(s) can be interlaced/frequency multiplexed (with or without gaps in the frequency domain), in a same symbol, with REs/RBs corresponding to data that is included in the PDSCH. In another example, a UE does not expect that M-DCI(s) are interlaced/frequency multiplexed (with or without gaps in the frequency domain), in a same symbol, with REs/RBs corresponding to data that is included in the PDSCH. Alternatively, the UE does not expect to receive a transport block/data PDSCH in REs/RBs that are in a same symbol as REs/RBs in which the UE received the M-DCI(s).

Although FIG. 12 illustrates the method 1200 various changes may be made to FIG. 12. For example, while the method 1200 is shown as a series of steps, various steps could overlap, occur in parallel, occur in a different order, or occur multiple times. In another example, steps may be omitted or replaced by other steps. For example, steps of the method 1200 can be executed in a different order.

Various embodiments of the present disclosure describe cell-common vs. cell-specific scheduling parameters, including differential indication. This is described in the following examples and embodiments, such as those of FIG. 13.

Figure 13:
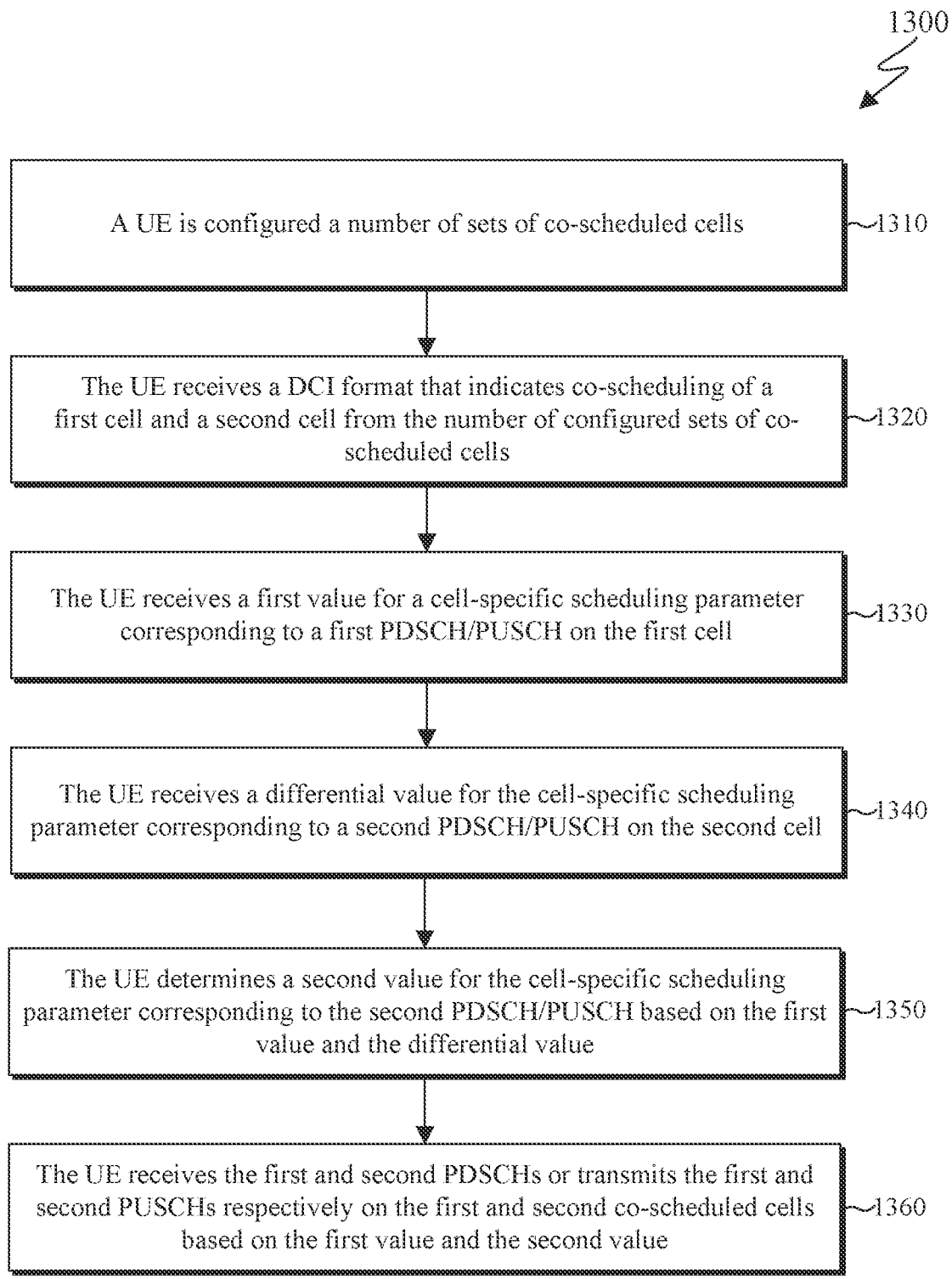
FIG. 13 illustrates a method for multi-cell scheduling based on reference and differential values for a cell-specific scheduling parameter according to embodiments of the present disclosure.

FIG. 13 illustrates a method 1300 for multi-cell scheduling based on reference and differential values for a cell-specific scheduling parameter according to embodiments of the present disclosure. The steps of the method 1300 of FIG. 13 can be performed by any of the UEs 111-119 of FIG. 1, such as the UE 116 of FIG. 3. The method 1300 is for illustration only and other embodiments can be used without departing from the scope of the present disclosure.

In certain embodiments, a UE (such as the UE 116) that is configured for multi-cell scheduling can be provided a first set of cell-common scheduling information parameters, whose values apply to all co-scheduled cells, and a second set of cell-specific scheduling information parameters, whose values apply for each corresponding co-scheduled cell. The UE can determine cell-common and cell-specific scheduling information parameters based on the specifications of the system operation, or based on higher layer configuration. For some cell-specific scheduling information parameters, the UE can be provided differential values compared to a reference value wherein the reference value can correspond, for example, to a first scheduled cell from a set of scheduled cells.

For example, a categorization for cell-common vs. cell-specific scheduling information parameters can be based on whether or not channel/MIMO characteristics are relatively similar among the co-scheduled cells.

In one realization, a UE (such as the UE 116) is configured a number of sets of co-scheduled cells. The UE is configured a first set of cell-common scheduling parameters, and a second set of cell-specific scheduling parameters. The UE receives an indication for multiple co-scheduled cells from the number of configured sets of co-scheduled cells. The UE receives, for each parameter from the first set of cell-common scheduling parameters, a single value that is applicable for multiple PDSCHs/PUSCHs on the indicated multiple co-scheduled cells. The UE receives, for each parameter from the second set of cell-specific scheduling parameters, multiple values that are respectively applicable for multiple PDSCHs/PUSCHs on the indicated multiple co-scheduled cells. The UE receives the multiple PDSCHs or transmits the multiple PUSCHs on the indicated multiple co-scheduled cells based on the received values for the cell-common and cell-specific scheduling parameters.

In one example, for a cell-specific scheduling parameter, the UE can be provided a first value, and one or more differential values relative to the first value. Such operation can be beneficial to reduce signaling overhead. For example, the first value can be provided for a first cell among the co-scheduled cells. For example, a UE (such as the UE 116) can be provided the first value via higher layer signaling or in a DCI format for multi-cell scheduling and can be provided the differential values in the same DCI format or by using various other methods such as those described herein.

The method 1300, as illustrated in FIG. 13 describes an example procedure for multi-cell scheduling based on reference and differential values for a cell-specific scheduling parameter.

In step 1310, a UE (such as the UE 116) is configured a number of sets of co-scheduled cells. In step 1320, the UE receives an indication for co-scheduling a first cell and a second cell from the number of configured sets of co-scheduled cells. In step 1330, the UE receives a multi-cell scheduling DCI format that provides a first value for the cell-specific scheduling parameter corresponding to a first PDSCH/PUSCH on the first cell. In step 1340, the UE receives a differential value for the cell-specific scheduling parameter corresponding to a second PDSCH/PUSCH on the second cell from the DCI format or by higher layer signaling. In step 1350, the UE determines a second value for the cell-specific scheduling parameter corresponding to the second PDSCH/PUSCH on the second cell, based on the first value and the differential value. In step 1360, the UE receives the first and second PDSCHs or transmits the first and second PUSCHs respectively on the first and second co-scheduled cells based on the first value and the second value.

The following consider various scheduling information parameters corresponding to DCI formats described in REF 2.

In a first example, a link direction parameter (uplink or downlink) can be a cell-common scheduling parameter. For example, a UE (such as the UE 116) can be scheduled for reception of multiple PDSCHs on a set of co-scheduled cells, or the UE can be scheduled for transmissions of multiple PUSCHs on the set of co-scheduled cells. Accordingly, the UE can be provided a cell-common value by a flag in the DCI format, such as a 0 for UL and a 1 for DL, for all co-scheduled cells.

In one example, multi-cell scheduling can include a mixture of PDSCH receptions and PUSCH transmissions. Then, link direction can be a cell-specific scheduling parameter that is separately provided for each of the co-scheduled cells. In one example, the co-scheduled cells can be grouped based on a link direction, so that the UE receives first PDSCHs on a first group of co-scheduled cells and transmits second PUSCHs on a second group of co-scheduled cells. In such case, the UE can be provided an indication that the DCI format schedules both PDSCH receptions and PUSCH transmissions, for example by a corresponding field in the DCI format, or by a corresponding C-RNTI. The number of cells with scheduled PDSCH receptions or scheduled PUSCH transmissions can be predetermined/configured or can be indicated by a corresponding field in the DCI format so that a UE can interpret other fields in the DCI format accordingly.

In a second example, a CIF can indicate a subset of co-scheduled cells from a set of co-scheduled cells, wherein a mapping between values of the CIF and subsets of co-scheduled cells is configured by UE-specific RRC signaling. One value of the CIF can correspond to all cells from the set of co-scheduled cells. The indication can be by an index of the sub-set of co-scheduled cells or by a bitmap mapping to the sub-sets of co-scheduled cells. In another example, separate CIF values are indicated per co-scheduled cell, wherein an indication can be a cell index or a single-cell CIF index, or by a bitmap mapping to each of the co-scheduled cells. When the DCI format is always applicable to all cells in the set of co-scheduled cells, the DCI format does not include a CIF.

In a third example, a BWP indicator field can be absent in a DCI format for multi-cell scheduling. For example, BWP switching can be performed only by a DCI format scheduling a PDSCH reception or a PUSCH transmission on a single cell, or by higher layer (re-)configuration, or based on timers, and so on. In another example, BWP indicator can be a cell-common scheduling parameter.

In a fourth example, a FDRA field or a TDRA can be cell-common scheduling parameters. This can be applicable, for example, for intra-band CA with co-scheduled cells that have a same SCS configuration.

In one example, the UE can be provided a first FDRA/TDRA value for a first cell from the set/subset of co-scheduled cells and a differential FRDA/TDRA value for a second cell from the set/subset of co-scheduled cells. The differential FDRA/TDRA value is an offset value relative to the first FDRA/TDRA value. The UE can determine a second FDRA/TDRA for the second cell based on the first FDRA/TDRA value and the offset value. A number of bits that provide the first FDRA/TDRA value or the differential FDRA/TDRA value can be predetermined for the DCI format or can be provided by higher layer signaling for the DCI format.

In one example, the UE expects that a same resource allocation type, such as FDRA Type-1 (consecutive RBs) or FRDA Type-0 (RBG based allocation) applies to all co-scheduled cells. Similar, the UE expects that a TDRA PDSCH/PUSCH mapping type, such as Type-A or Type-B, applies to all co-scheduled cells. In another example, the UE can be configured by higher layers a FDRA or TDRA type separately for each cell from the set of co-scheduled cells.

In one example, multi-cell scheduling is supported only for a set of co-scheduled cells that has a same SCS on the respective active DL/UL BWPs.

In one example, multi-cell scheduling is restricted to a set of co-scheduled cells that operates with a same TDD configuration.

In a fifth example, other scheduling parameters related to resource allocation, such as VRB-to-PRB mapping, PRB bundling, rate matching, and ZP CSI-RS trigger, can follow higher layer configuration, or can be provided as a cell-common scheduling parameter for all co-scheduled cells. In one example, some or all of those scheduling parameters can be absent in a DCI format for multi-cell scheduling and be provided to the UE by higher layer signaling, commonly or separately for each cell from the set of co-scheduled cells. In another example, per specifications for system operation, some parameters can be disabled (are not applicable) for multi-cell scheduling operation, such as an absence of VRB-to-PRB mapping, or of PRB bundling, or of ZP CSI-RS trigger.

In a sixth example, a modulation and coding scheme (MCS) parameter can be cell-common for a set of co-scheduled cells or can be provided by differential indication. In one example, the DCI format can provide a single MCS value that is applied to the set of co-scheduled cells, for example, for the case of intra-band CA operation. In another example, the DCI format can provide a first MCS for a first cell from the co-scheduled cells and a differential MCS value for remaining cells of the co-scheduled cells. The UE can determine a second MCS value for a second cell from the co-scheduled cells by adding the differential value to the first value.

In a seventh example, the DCI format provides a new data indicator (NDI) parameter and a redundancy version (RV) parameter separately for each co-scheduled cell. In another example, per specifications for system operation, the UE expects that only new/initial transmissions of a TB are supported for multi-cell scheduling. In such a case, the UE does not expect an indication for NDI or for RV since all PDSCHs/PUSCHs on co-scheduled cells will correspond to toggled NDI values or to an RV value of zero. The restriction can be applicable to all HARQ processes or to a subset of the HARQ processes. The subset of HARQ processes can be configured by higher layers.

In one example, the UE can receive a cell-common NDI value, such as an indication for all toggled, that is applied to co-scheduled cells.

In an eighth example, some HARQ-related parameters can be absent in a DCI format for multi-cell scheduling. For example, CBG operation is not supported for multi-cell scheduling and a UE (such as the UE 116) does not expect to receive indication for CBGTI or CBG flush indicator (CBGFI) parameters for the co-scheduled cells.

In one example, when a UE (such as the UE 116) is configured different TDD configurations or different SCSs on respective DL BWPs of respective co-scheduled cells, and the UE is provided a cell-common PDSCH-to-HARQ_feedback timing value (K1) for multiple PDSCHs on the respective co-scheduled cells, the UE interprets the K1 value relative to a slot for PUCCH transmissions that overlaps with a slot of a latest PDSCH reception on a cell from the co-scheduled cells. For example, if the DCI format schedules two PDSCH receptions on two respective cells wherein, with reference to slots of PUCCH transmissions, the PDSCH reception on the first cell ends in slot n and the PDSCH reception on the second cell ends in slot n+1 for PUCCH transmissions, the UE interprets the K1 value relative to slot n+1. In one example, the UE can receive indication of PDSCH-to-HARQ_feedback timing value (K1) in the multi-cell scheduling DCI format. In another example, a bit-width for the corresponding field can be configurable, such as {0, 3} bits. For example, when the bit-width for the HARQ_feedback timing value (K1) in the multi-cell scheduling DCI format is zero bits, the UE can determine the K1 timing from higher layers. For example, RRC configures a value for HARQ_feedback timing value (K1). The value can be common for all sets of co-scheduled cells, or can be different for different sets of co-scheduled cells. In another example, the UE can receive a first RRC configured value for HARQ_feedback timing value (K1) for a first scheduling cell and all corresponding sets of co-scheduled cells, and a second RRC configured value for HARQ_feedback timing value (K1) for a second scheduling cell and all corresponding sets of co-scheduled cells.

In one example, some MIMO-related parameters, such as a DM-RS sequence initialization, can be absent in a DCI format for multi-cell scheduling, and are instead provided by higher layer configuration.

In one example, some parameters can be same for single-cell and for multi-cell scheduling. For example, an SRS request field in a DCI format can be used to provide a same indication for multi-cell scheduling as for single cell scheduling on a primary cell.

In one example, a configuration of some fields that are supported in a DCI format for single-cell scheduling may not be supported in a DCI format for multi-cell scheduling. For example, an indication for SCell dormancy may not be supported in a DCI format for multi-cell scheduling.

Although FIG. 13 illustrates the method 1300 various changes may be made to FIG. 13. For example, while the method 1300 is shown as a series of steps, various steps could overlap, occur in parallel, occur in a different order, or occur multiple times. In another example, steps may be omitted or replaced by other steps. For example, steps of the method 1300 can be executed in a different order.

Various following embodiments of the present disclosure describe methods for providing scheduling information for multi-cell scheduling.

In certain embodiments, for a UE (such as the UE 116) that is configured a number of sets of co-scheduled cells, a DCI format for multi-cell scheduling can provide complete or partial scheduling information, for cell-common or cell-specific scheduling parameters, for multiple PDSCH receptions or multiple PUSCH transmissions on respective multiple co-scheduled cells. When the DCI format for multi-cell scheduling provides partial scheduling information, the UE can determine remaining scheduling information from UE-specific RRC signaling, or by using other complementary methods.

In one example, a DCI format for multi-cell scheduling can have a same size as a DCI format for single cell scheduling. This can enable maintaining a total number of DCI format sizes when supporting multi-cell scheduling and avoid fragmentation of a number of PDCCH candidates that a UE (such as the UE 116) can monitor over an increased number of DCI format sizes, thereby avoiding having a smaller number of PDCCH candidates per DCI format size. In another example, the UE does not expect to receive a DCI format for multi-cell scheduling that is same as or has a same size as a DCI format 1_0 or 0_0 as a differentiation between single-cell scheduling and multi-cell scheduling may not be possible since an additional field to provide such differentiation may not be possible to include in a DCI format 1_0 or 0_0.

Various embodiments of the present disclosure describe a first approach which concatenates DCI format for multi-cell scheduling.

In certain embodiments, a DCI format for multi-cell scheduling can provide separate scheduling information by separate values of a corresponding field for each of the serving cells. A first value corresponds to a first cell, a second value corresponds to a second cell, and so on. Therefore, DCI format fields for the multiple cells are concatenated, thereby referring to such DCI format as a concatenated DCI format for multi-cell scheduling. This approach can be beneficial, for example, for co-scheduling cells that have different channel characteristics or configurations, such as for inter-band CA operation.

In one example, a concatenated DCI format for multi-cell scheduling is composed of multiple "field-blocks", wherein each field-block includes multiple values corresponding to the multiple co-scheduled cells.

In another example, a concatenated DCI format for multi-cell scheduling is composed of multiple "DCI format blocks", wherein each DCI format block provides scheduling information for a respective cell from the multiple co-scheduled cells.

Support of a concatenated DCI format for multi-cell scheduling can be restricted in the number of co-scheduled cells, such as for up to 2 cells.

In one example, a concatenated DCI format for multi-cell scheduling can exclude certain scheduling parameters compared to fields in a single-cell scheduling DCI format, wherein those parameters can be configured by higher layers. Such higher layer configuration can be per each co-scheduled cell, or per each subset of co-scheduled cells. For example, some resource allocation fields, such as PRB-to-VRB mapping, or PRB bundling, can be provided by higher layer signaling, while other fields such as a ZP CSI-RS trigger can be provided only by a single-cell scheduling DCI format.

In one example, a concatenated DCI format can include a set of cell-common scheduling information parameters wherein, for example, a block of cell-common fields can be placed first in the DCI format, followed by a number of blocks of cell-specific fields in ascending order of a cell index or CIF.

The set of cell-common scheduling information parameters can be predetermined in the specifications of the system operation, or can be provided by higher layer signaling. For example, the cell-common parameters can generally include parameters that do not relate to PDSCH receptions and in particular one or more of: a PUCCH resource indicator (PRI), a TPC command for PUCCH, or a PDSCH-to-HARQ_feedback timing indicator (K1) field, or a downlink assignment information (DAI) field, when applicable. Therefore, the UE determines to transmit HARQ feedback information corresponding to the multiple PDSCH of the multiple co-scheduled cells in a same PUCCH resource as indicated by the common PRI, or with a same TPC command, or with a same K1 timeline as indicated by the K1 parameter, as indicated in the cell-common fields of the concatenated DCI format. Another cell-common parameter can be a link direction for the co-scheduled cells, to indicate that all cells are co-scheduled for DL reception (that is, multiple PDSCHs) or for UL transmission (that is, multiple PUSCHs).

In one example, some of the DCI fields for multi-cell scheduling can have configurable size, including a size of zero bits. When a size of a DCI field is zero bits, the UE determines the corresponding parameter from higher layer configuration. For example, when a DCI format for multi-cell scheduling of PDSCHs includes zero bits for PUCCH resource indication, the UE can determine a PUCCH resource for transmission of HARQ-ACK feedback corresponding to the co-scheduled PDSCHs in a PUCCH resource provided by higher layers. The PUCCH resource can be common for all sets of co-scheduled cells configured to a UE. In another example, the UE can be configured a first PUCCH resource for set(s) of co-scheduled cells associated with a first scheduling cell, and a second PUCCH resource for set(s) of co-scheduled cells associated with a second scheduling cell. In another example, the UE can be configured a separate PUCCH resource for each set of co-scheduled cells.

In one example, values for some cell-specific scheduling parameters can be provided by the specifications of the system operation, or via higher layer signaling. Therefore, DCI fields corresponding to such cell-specific scheduling parameters can be absent in a concatenated DCI format for multi-cell scheduling.

Various embodiments of the present disclosure describe a second approach by multi-cell scheduling via multi-cell mapping. This is described in the following examples and embodiments, such as those of FIGS. 14-17.

Figure 14:
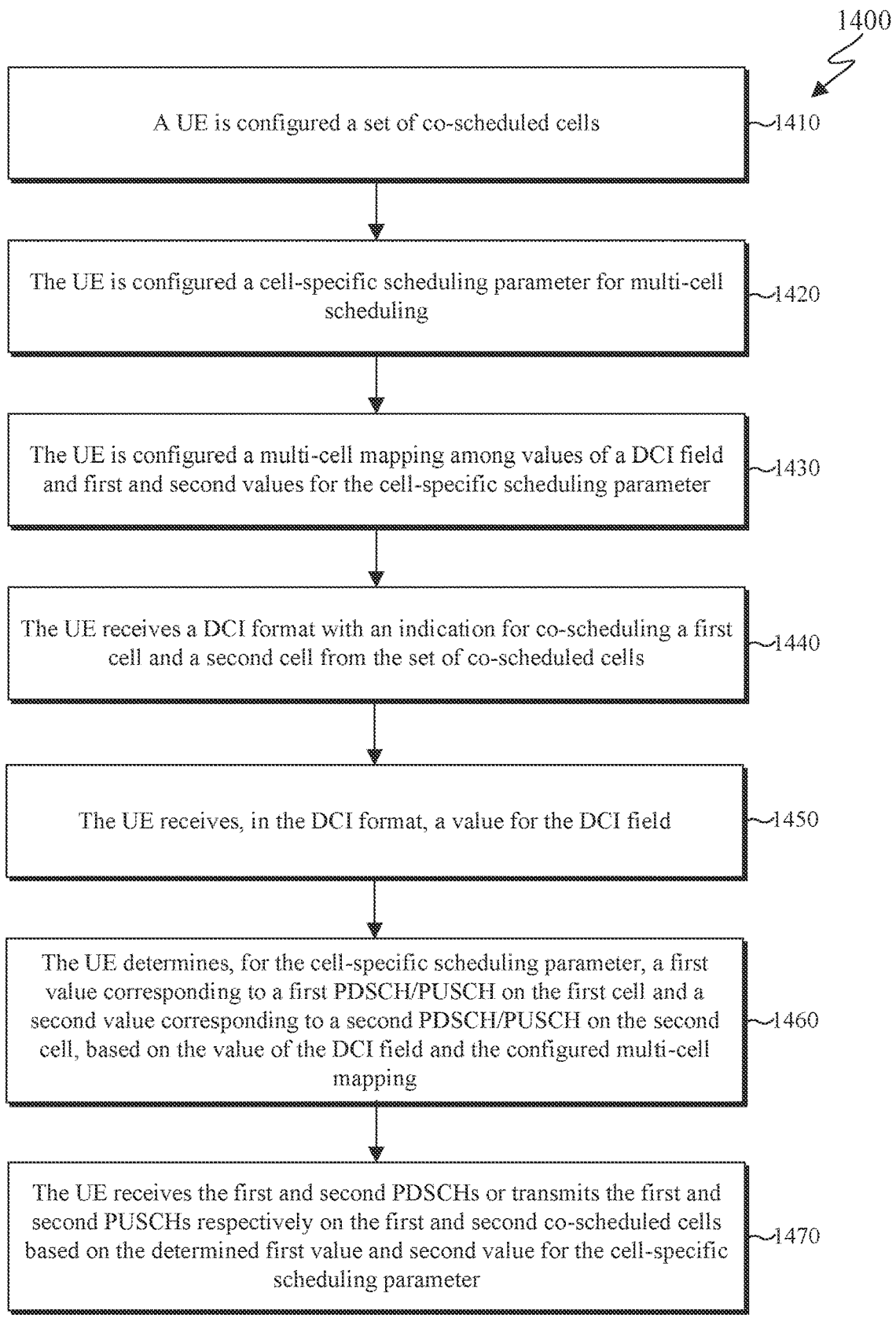
FIG. 14 illustrates a method for multi-cell scheduling based on DCI fields with multi-cell mapping, using configured one-to-many mappings/tables according to embodiments of the present disclosure.
Figure 15:
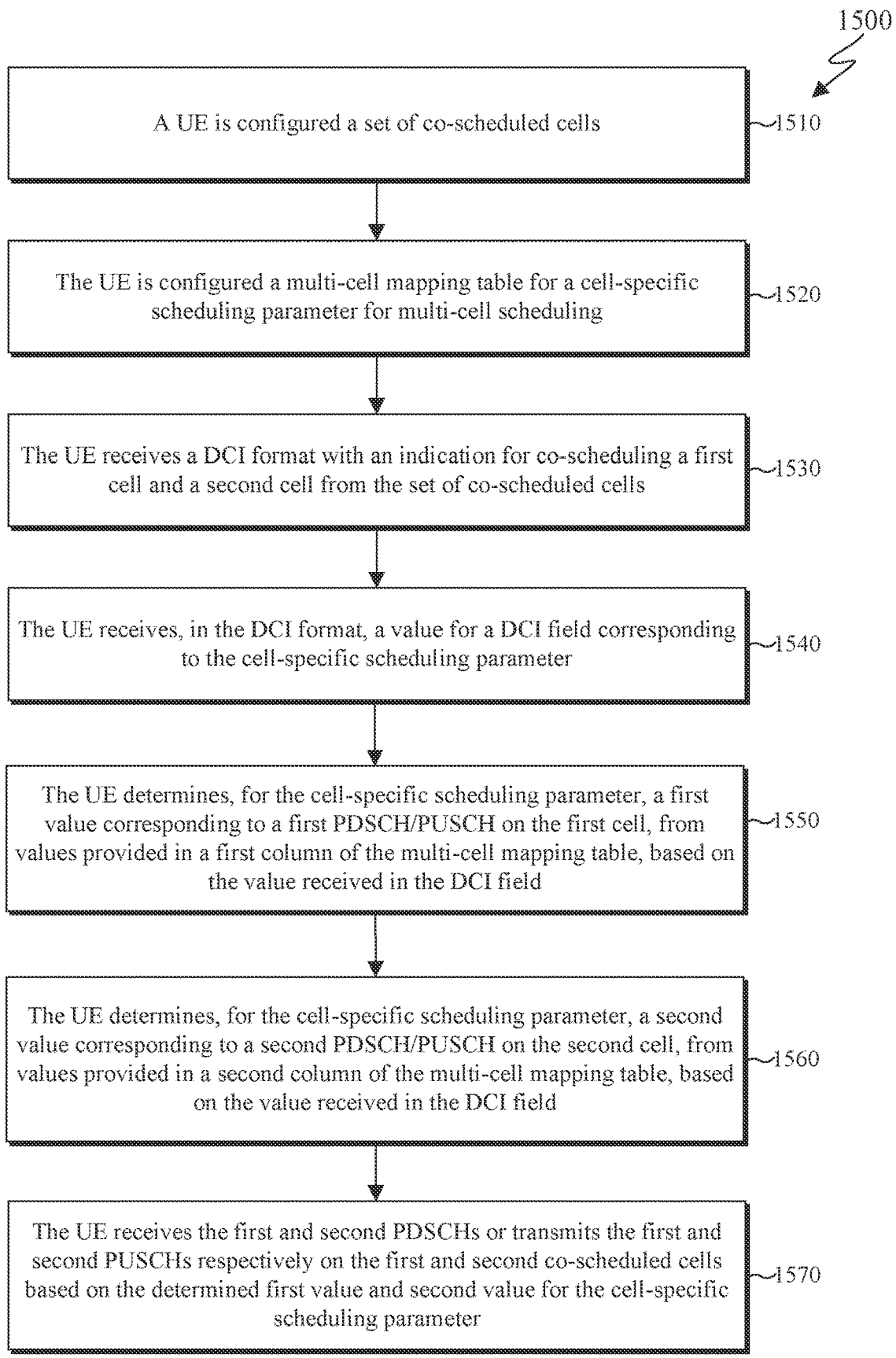
FIG. 15 illustrates a method for multi-cell scheduling based on DCI fields with multi-cell mapping table according to embodiments of the present disclosure.
Figure 16:
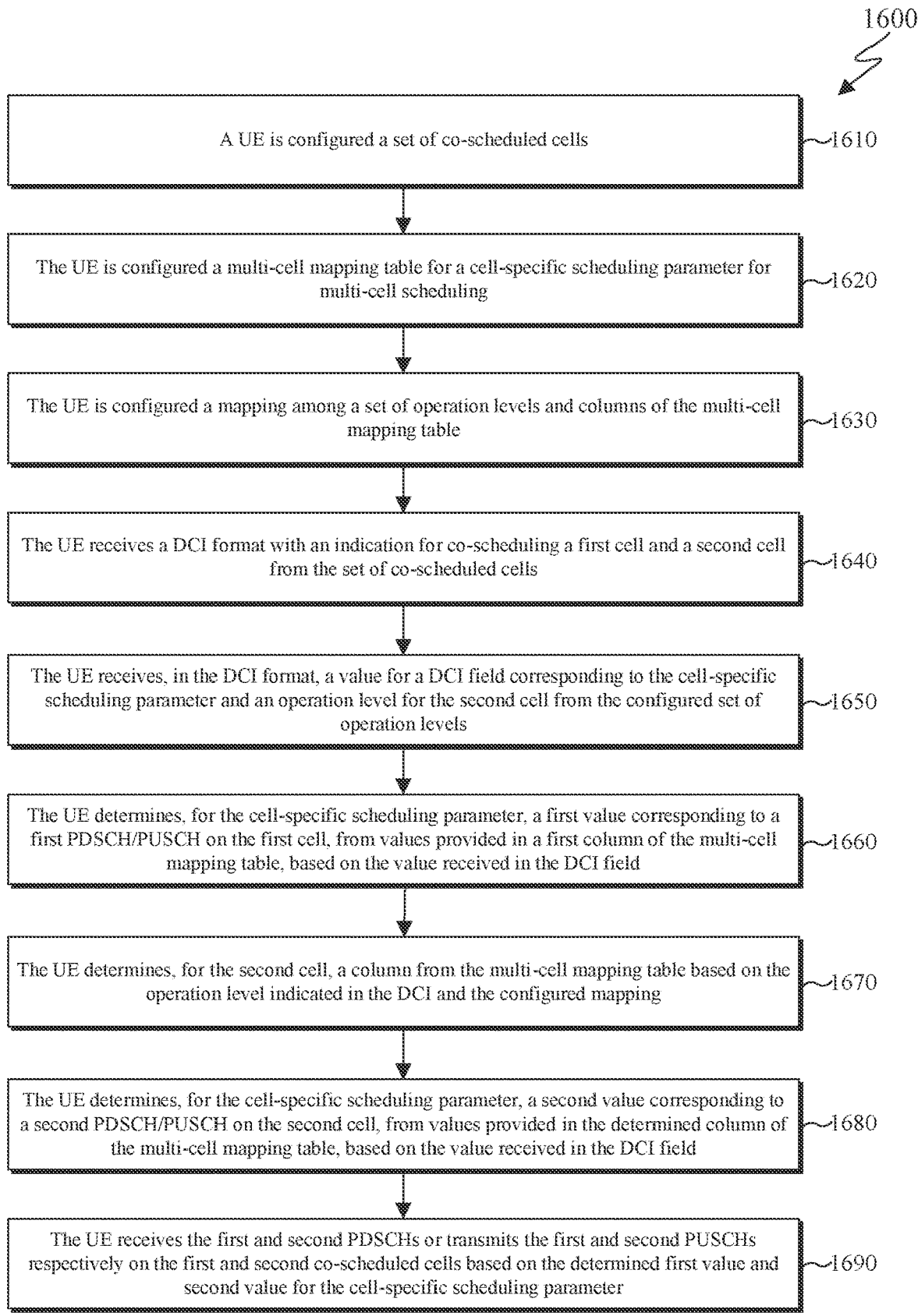
FIG. 16 illustrates a method for multi-cell scheduling based on DCI fields with multi-cell mapping along with a set of operation levels for the co-scheduled cells according to embodiments of the present disclosure.
Figure 17:
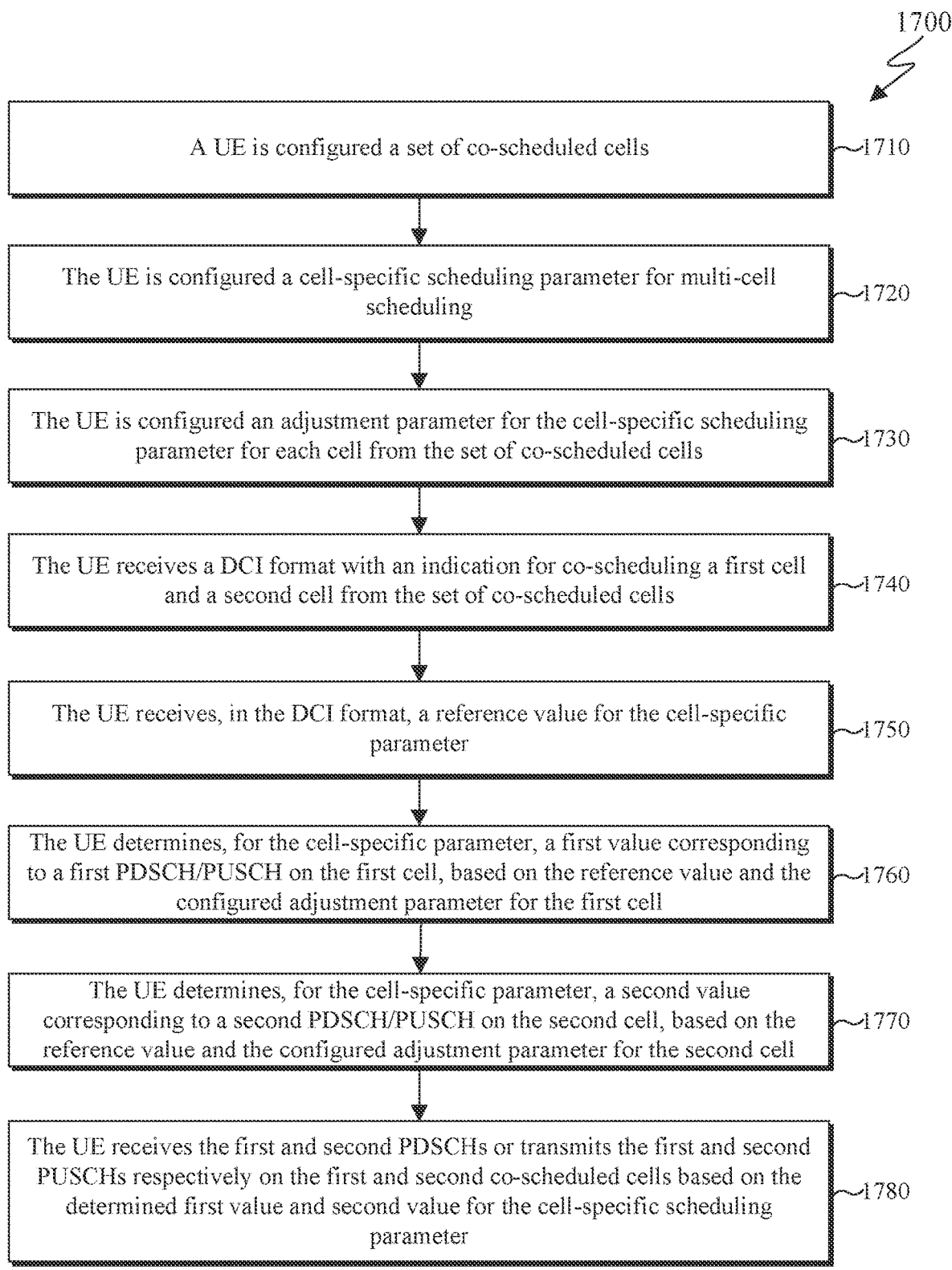
FIG. 17 illustrates a method for multi-cell scheduling based on a DCI field with multi-cell mapping, using multiple configured adjustment parameters corresponding to multiple co-scheduled cells according to embodiments of the present disclosure.

FIG. 14 illustrates a method 1400 for multi-cell scheduling based on DCI fields with multi-cell mapping, using configured one-to-many mappings/tables according to embodiments of the present disclosure. FIG. 15 illustrates a method 1500 for multi-cell scheduling based on DCI fields with multi-cell mapping table according to embodiments of the present disclosure. FIG. 16 illustrates a method 1600 for multi-cell scheduling based on DCI fields with multi-cell mapping along with a set of operation levels for the co-scheduled cells according to embodiments of the present disclosure. FIG. 17 illustrates a method 1700 for multi-cell scheduling based on a DCI field with multi-cell mapping, using multiple configured adjustment parameters corresponding to multiple co-scheduled cells according to embodiments of the present disclosure. The steps of the method 1400 of FIG. 14, the method 1500 of FIG. 15, the method 1600 of FIG. 16, and the method 1700 of FIG. 17 can be performed by any of the UEs 111-119 of FIG. 1, such as the UE 116 of FIG. 3. The methods 1400, 1500, 1600, and 1700 are for illustration only and other embodiments can be used without departing from the scope of the present disclosure.

In certain embodiments, a UE (such as the UE 116) can be provided information for multi-cell scheduling of multiple PDSCHs/PDCCHs on multiple respective cells using a multi-cell mapping, wherein a field in a DCI format can be interpreted to provide multiple values for a corresponding scheduling parameter for the multiple co-scheduled cells. Such interpretation can be based on a configured one-to-many mapping/table or based on multiple configured offset values that are applied to a reference value indicated by the DCI format. A field in a DCI format which can be interpreted based on multi-cell mapping may be referred to as a DCI field with multi-cell mapping. This approach can be beneficial, for example, for co-scheduling cells that have similar physical channel characteristics or configurations, such as for intra-band CA operation.

In one example, for any scheduling parameter corresponding to a DCI field with multi-cell mapping, a UE (such as the UE 116) can be provided a predetermined or configured mapping or table, also referred to as "code-points", such that a value of the DCI field can be mapped to multiple values for the corresponding scheduling parameter. In another example, for any scheduling parameter corresponding to a DCI field with multi-cell mapping, the UE can be configured one or more adjusting parameters, such as offset values or scaling factors, so that the UE can determine one or more additional values based on adjustment of a reference value indicated by the DCI field. In all methods, each DCI field with multi-cell mapping can have a one-to-many interpretation, rather than a one-to-one interpretation.

The method 1400, as illustrated in FIG. 14, describes an example procedure for multi-cell scheduling based on DCI fields with multi-cell mapping, using configured one-to-many mappings/tables.

In step 1410, a UE (such as the UE 116) is configured a set of co-scheduled cells. In step 1420, the UE is configured a cell-specific scheduling parameter for the co-scheduled cells. In step 1430, the UE is configured a multi-cell mapping among values of a DCI field and first and second values for the cell-specific scheduling parameter. In step 1440, the UE receives a DCI format with an indication for co-scheduling a first cell and a second cell from the set of co-scheduled cells. In step 1450, the UE receives, in the DCI format, a value for the DCI field. In step 1460, the UE determines, for the cell-specific scheduling parameter, a first value corresponding to a first PDSCH/PUSCH on the first cell and a second value corresponding to a second PDSCH/PUSCH on the second cell, based on the value of the DCI field and the configured multi-cell mapping. In step 1470, the UE receives the first and second PDSCHs or transmits the first and second PUSCHs, respectively, on the first and second co-scheduled cells based on the determined first value and second values for the cell-specific scheduling parameter.

In one example, for a DCI field with multi-cell mapping, a UE (such as the UE 116) can be configured a table with rows corresponding to possible values of the DCI field, and columns corresponding to different interpretations of the DCI field. For example, a first column can correspond to a first/baseline interpretation/values of the DCI field, a second column can correspond to a second interpretation/values of the DCI field, and so on. For instance, if an MCS field is a DCI field with multi-cell mapping, then a first column provides first/baseline MCS values corresponding to a first/baseline MCS table for 32 possible values of a 5-bit MCS field. In one example, a second column can correspond to a second MCS table that can be separate from the first MCS table or can be obtained by variations or permutations of entries of the first MCS table.

For example, a DCI field for MCS with value '00000' can refer to a first entry of a first MCS table, and a value '00001' can refer to a second entry of the first MCS table. Then, for the case of a DCI field with multi-cell mapping, in one example, the value '00000' can refer to the first entry of the first MCS table, and the value '00001' can also refer to the first entry of the first MCS table. In another example, the value '00000' can refer to a third entry of the first MCS table, and the value '00001' can refer to a fourth entry of a second MCS table. In yet another example, the value '00000' can refer to the first entry of the first MCS table, and the value '00001' can refer to a first entry of a third MCS table.

A DCI field with multi-cell mapping can be, for example, one or more of: MCS, antenna ports, TCI state, SRS resource indicator (SRI), transmitted precoding matrix indicator (TPMI), FDRA, or TDRA, and so on.

In one example, for a DCI field with multi-cell mapping, different interpretations of the DCI field value, such as different columns of a configured table associated with the DCI field, correspond to different co-scheduled cells. For example, a UE (such as the UE 116) configured for 2-cell scheduling can be provided a table with two columns, and a UE configured 4-cell scheduling can be provided a table with four columns. A first column can correspond to a first co-scheduled cell, a second column can correspond to a second co-scheduled cell, and so on. In one example, when the UE is configured a set of 4 co-scheduled cells and the UE is indicated two PDSCHs/PUSCHs on two out of the 4 co-scheduled cells, such as a first PDSCH on a first cell and a second PDSCH on a fourth cell, the UE operates with values provided in a first column and a fourth column of the configured table, for the first PDSCH and the second PDSCH, respectively, wherein the values are provided by a single value of the field in the DCI format mapping to the values in the first and fourth columns of the configured table.

The method 1500, as illustrated in FIG. 15 describes an example procedure for multi-cell scheduling based on DCI fields with multi-cell mapping table.

In step 1510 a UE (such as the UE 116) is configured a set of co-scheduled cells. In step 1520, the UE is configured a multi-cell mapping table for a cell-specific scheduling parameter for multi-cell scheduling. In step 1530, the UE receives a DCI format with an indication for co-scheduling a first cell and a second cell from the set of co-scheduled cells. In step 1540, the UE receives, in the DCI format, a value for a DCI field corresponding to the cell-specific scheduling parameter. In step 1550, the UE determines, for the cell-specific scheduling parameter, a first value corresponding to a first PDSCH/PUSCH on the first cell, from values provided in a first column of the multi-cell mapping table, based on the value received in the DCI field. In step 1560, the UE determines, for the cell-specific scheduling parameter, a second value corresponding to a second PDSCH/PUSCH on the second cell, from values provided in a second column of the multi-cell mapping table, based on the value received in the DCI field. In step 1570, the UE receives the first and second PDSCHs or transmits the first and second PUSCHs respectively on the first and second co-scheduled cells based on the determined first value and second value for the cell-specific scheduling parameter.

In one example, for a DCI field with multi-cell mapping, different interpretations of the DCI field value, such as different columns of a configured table associated with the DCI field, correspond to different levels of operation compared to a reference level. For example, a first column in the configured table refers to a reference operation level, wherein the UE can use first values of a scheduling parameter corresponding to the DCI field, while other columns refer to differential levels from the reference operation level. In another example, columns other than the first column can refer to absolute levels, instead of differential levels.

According to this method, a UE (such as the UE 116) can be provided an operation level for each of the co-scheduled cells and can determine a column from the configured table for the corresponding DCI field with multi-cell mapping for each of the co-scheduled cells. Then, for interpreting the DCI field with multi-cell mapping, the UE applies a first value from a first column of the configured table corresponding to the first operation level for a first co-scheduled cell and a second value from a second column of the configured table corresponding to the second operation level for a second co-scheduled cell. The first and second operation levels can be same or different. For example, when the first operation level is same as the second operation level, the UE applies a same value from a same column of the configured table for both the first and the second co-scheduled cells.

In one example, an operation level corresponding to a DCI field with multi-cell mapping can change over time for a serving cell. For example, for interpreting the DCI field with multi-cell mapping, the UE can apply a first value from a first column of the configured table corresponding to a first operation level for a first PDSCH/PUSCH on a cell in a first slot, and apply a second value from a second column of the configured table corresponding to a second operation level for a second PDSCH/PUSCH on the cell in a second slot.

In one example, for a cell from the set of co-scheduled cells, a UE (such as the UE 116) can be separately provided operation levels for different scheduling parameters, such as different column indexes in different tables, corresponding to different DCI fields with multi-cell mapping.

In another example, for a cell from the set of co-scheduled cells, a UE (such as the UE 116) can be provided a common operation level for different scheduling parameters, such as a same column index in different tables, corresponding to different DCI fields with multi-cell mapping.

In one example, a UE (such as the UE 116) receives information of operation level(s) corresponding to DCI fields with multi-cell mapping via higher layer signaling for each cell from the set of co-scheduled cells. Accordingly, the UE applies the configured operation level(s) when re-interpreting the DCI field with multi-cell mapping for any/all PDSCH or PUSCH scheduled on the cell by a multi-cell scheduling DCI format.

In another example, a UE (such as the UE 116) receives information of operation level(s) corresponding to DCI fields with multi-cell mapping via a DCI format for multi-cell scheduling. Therefore, the UE can receive a first multi-cell scheduling DCI format indicating first operation level(s) for a first PDSCH/PUSCH on a co-scheduled cell, and receive a second multi-cell scheduling DCI format indicating second operation level(s) for a second PDSCH/PUSCH on the co-scheduled cell. In one example, DCI-based indication can remain valid for all following multi-cell scheduling DCI formats, until the UE receives a new (DCI-based) indication for the operation levels.

In a further example, a UE (such as the UE 116) receives information of operation level(s) corresponding to DCI fields with multi-cell mapping via L2 signaling, such as a MAC-CE command. For example, a MAC-CE command provides a sub-selection of columns (possibly with repetition) from an RRC configured table for multi-cell mapping. For example, for a multi-cell mapping table with 4 columns, the MAC-CE indicates columns {1, 2, 2, 1} associated with a set of serving cells consisting cells {1, 2, 3, 4}. For example, the UE applies the MAC-CE, after a predetermined 'application time', to all DCI formats for multi-cell scheduling on a set of co-scheduled cells, until the UE receives a new indication, such as a new MAC-CE, for indication of operation levels. In one example, a MAC-CE can apply to all sets of co-scheduled cells corresponding to a same scheduling cell. The UE can determine the association of different sets of co-scheduled cells to the set of operation level, from the information provided by a same MAC-CE for indication of operation levels.

In yet another example, a UE (such as the UE 116) determines information of operation level(s) corresponding to DCI fields with multi-cell mapping for scheduling a PDSCH/PUSCH on a cell from a set of co-scheduled cells based on predetermined or configured UE measurements. Herein, UE measurements can refer to RSRP or SINR measurements, and so on, of a channel or signal, such as a reference signal associated with the scheduled PDSCH/PUSCH on a scheduled cell. In one example, a reference signal associated with a PDSCH/PUSCH can refer to a SSB or CSI-RS or SRS and so on, which is QCL with PDSCH/PUSCH, such as QCL TypeD, or is provided as (part of) a downlink or uplink, separate or joint TCI state for the PDSCH/PUSCH, or is provided as a reference or target spatial relation corresponding to the PDSCH/PUSCH, or is provided as a default beam/spatial relation for the PDSCH/PUSCH.

In one example, an indication of operation levels can be same for all scheduling parameters or for a group of scheduling parameters. In another example, the UE receives separate indication of operation levels for each scheduling parameter.

The method 1600, as illustrated in FIG. 16, describes an example procedure for multi-cell scheduling based on DCI fields with multi-cell mapping along with a set of operation levels for the co-scheduled cells.

In step 1610, a UE (such as the UE 116) is configured a set of co-scheduled cells. In step 1620, the UE is configured a mapping among a set of operation levels and columns of the multi-cell mapping table. In step 1630, the UE is configured a mapping among a set of operation levels and columns of the multi-cell mapping table. In step 1640, the UE receives a DCI format with an indication for co-scheduling a first cell and a second cell from the set of co-scheduled cells. In step 1650, the UE receives, in the DCI format, a value for a DCI field corresponding to the cell-specific scheduling parameter and an operation level for the second cell from the configured set of operation levels. In step 1660, the UE determines, for the cell-specific scheduling parameter, a first value corresponding to a first PDSCH/PUSCH on the first cell, from values provided in a first column of the multi-cell mapping table, based on the value received in the DCI field. In step 1670, the UE determines, for the second cell, a column from the multi-cell mapping table based on the operation level indicated in the DCI and the configured mapping. In step 1680, the UE determines, for the cell-specific scheduling parameter, a second value corresponding to a second PDSCH/PUSCH on the second cell, from values provided in the determined column of the multi-cell mapping table, based on the value received in the DCI field. In step 1690, the UE receives the first and second PDSCHs or transmits the first and second PUSCHs respectively on the first and second co-scheduled cells based on the determined first value and second value for the cell-specific scheduling parameter.

For example, a UE (such as the UE 116) can be configured a mapping among a number of RSRP ranges and a set of operation levels for a DCI field with multi-cell mapping, such as a set of column indexes in a configured mapping/table for the scheduling parameter corresponding to the DCI field with multi-cell mapping. For instance, the UE can be configured with N, such as N=4, RSRP ranges corresponding to N, such as N=4, operation levels. Therefore, a first RSRP range can be mapped to a first operation level or a first column index, a second RSRP range can be mapped to a second operation level or a second column index, and so on. In one example, the UE reports a determined RSRP range or a corresponding operation level or table column index to a serving gNB, for example, via L1 signaling in a PUSCH or PUCCH or via a MAC CE.

In one example, a UE (such as the UE 116) can be configured one or more adjusting parameters, such as offset values or scaling factors, so that the UE can determine one or more additional values for a scheduling parameter based on adjustment of a reference value indicated by a corresponding DCI field. For example, the UE can apply an offset on indexes of values corresponding to a scheduling parameter, or can directly apply an offset on a value of a scheduling parameter. For instance, when the UE is configured offset values in a set O∈{-2, -1, 0, 1, 2}, and a multi-cell scheduling DCI format indicates an MCS value corresponding to entry I=17 in an MCS table, an offset value O=2 refers to using an MCS value corresponding to entry I+O=17+2=19, and an offset value O=-1 refers to using an MCS value corresponding to entry I+O=17-1=16. In another example, when the UE is configured offset values in a set O∈{-20, -10, 0, 10, 20}, and a multi-cell scheduling DCI format indicates an MCS value corresponding to a coding rate with parameter R*[1024]=379 in an MCS table, an offset value P=10 refers to using an MCS value corresponding to a coding rate with parameter R*[1024]=379+10=389, and an offset value O=-20 refers to using an MCS value corresponding to a coding rate with parameter R*[1024]=379-20=359.

In one example, a UE (such as the UE 116) can be separately provided an adjusting parameter for each scheduling parameter/field of a respective multi-cell scheduling DCI format. In another example, a UE (such as the UE 116) can be provided a single adjusting parameter for all scheduling parameters/fields of a respective multi-cell scheduling DCI format. In yet another example, an adjusting parameter can be provided per higher layer configuration or can change based on indication by a multi-cell scheduling DCI format or a UE measurement of RSRP for a reference signal associated with a co-scheduled PDSCH/PUSCH. In a further example, a UE (such as the UE 116) can receive an indication for an operation level, that is mapped to a number of adjusting parameters for a number of scheduling parameters/fields of a respective multi-cell scheduling DCI format, wherein the mapping is provided by higher layer signaling.

A gNB (such as the BS 102) can configure a mapping/table or an adjusting parameter for reinterpretation of a DCI field with multi-cell mapping for multi-cell scheduling based on estimated combinations of parameter values across the set of co-scheduled cells. For example, for cells that have relatively similar physical channel characteristics, such as for intra-band CA operation, the gNB can configure or indicate same or similar values for various scheduling parameters such as for an FDRA, TDRA, or MCS. For enhanced operation, the gNB can determine variations of parameter values among the co-scheduled cells based on the relative operating frequencies and spatial/MIMO channel conditions, and so on, for the co-scheduled cells. For example, based on CSI reports for co-scheduled cells, the gNB can determine an MCS offset for scheduled cells from the co-scheduled cells.

In one example, a DCI field with multi-cell mapping for a scheduling parameter in a DCI format for multi-cell scheduling can have a same size as a corresponding DCI field for the same scheduling parameter in a DCI format for single cell scheduling.

In another example, a DCI field with multi-cell mapping can have a different size, for example, larger than a corresponding size in a DCI format for single-cell scheduling. For example, a DCI field with multi-cell mapping for MCS can have 6 or 7 bits. Such operation can be beneficial, for example, to support an extended mapping/table among possible values of the DCI field with multi-cell mapping (as rows in the table) and configured combinations of values of the corresponding scheduling parameter for co-scheduled cells (as columns in the table). Herein, an extended mapping/table refers to a table with extended rows, so that the UE can be provided more interpretations or combinations of values for the corresponding scheduling parameter for multi-cell scheduling.

In one example, for a single-cell scheduling DCI format, a UE (such as the UE 116) is provided an MCS field of 5 bits to indicate one from a maximum of 32 MCS values from an MCS table. For a multi-cell scheduling DCI and 2 co-scheduled cells, the UE can be provided an MCS field with only 5 bits (instead of 10 bits) to indicate a pair of MCS values from up to 32 possible pairs (instead of the maximum of 32×32=1024 possible pairs) of MCS values from the MCS table. Each MCS value for a first co-scheduled cell can be linked with only one MCS value for a second co-scheduled cell. For example, the MCS value for the second cell can be same as for the first cell or can be offset by a configured value relative to the MCS value of the first cell as previously described. In general, an offset between the MCS value of a first cell and the MCS value of a second cell can depend on MCS value of the first cell. For example, a first MCS value of the first cell can have a first offset from a second MCS value of the second cell, while a third MCS value of the first cell can have a second offset from a fourth MCS value of the second cell, wherein the first offset is different from the second offset. Herein, both the first and second offsets are configured in the mapping/table. However, when the UE is configured/indicated a single adjusting parameter, such as a single offset value, instead of a general one-to-many mapping/table, the UE applies a same offset, regardless of the MCS value of the first cell.

If an MCS field in a DCI format for multi-cell scheduling has a larger size than in a DCI format for single-cell scheduling, such as 6 bits vs. 5 bits, the UE can be indicated a pair of MCS values from up to 64 possible pairs of MCS values from an MCS table. This approach provides a trade-off between additional DCI overhead (up to a maximum of 5 bits) and additional scheduling flexibility since each MCS value for a first co-scheduled cell can be linked with two or more MCS values for a second co-scheduled cell. Therefore, the 64-row table will include multiple rows with a shared/repeated value in a first column but with different values in a second column for the first and second co-scheduled cells. Herein, the first column can correspond to a first co-scheduled cell and the second column can correspond to a second co-scheduled cell. In one example, a differential MCS field of 1 bit can be provided in addition to the MCS field of 5 bits, wherein the differential MCS field value provides an offset value relative to the MCS field value. For example, a '0' value for the differential MCS field can map to a 0 value for the offset and a '1' value for the differential MCS field can map to an offset value that is specified in the system operation or is provided by higher layer signaling.

Such a DCI field with multi-cell mapping with a 2-column table can also apply for multi-cell scheduling of more than 2 cells when more than one co-scheduled cell can be associated with a column from the 2 columns in the table, such as when more than one cell shares a same operation level.

In one example, a DCI field with multi-cell mapping can refer to two or more scheduling parameters. For example, the UE can be configured a one-to-many mapping with paired entries, so that a value indicated by the DCI field with multi-cell mapping can be re-interpreted as a pair of value for a pair of parameters, for each of the co-scheduled cells. For example, a pair of scheduling parameters can include FDRA and TDRA or can include MCS and number of antenna ports.

The method 1700, as illustrated in FIG. 17, describes an example procedure for multi-cell scheduling based on a DCI field with multi-cell mapping, using multiple configured adjustment parameters corresponding to multiple co-scheduled cells.

In step 1710, a UE (such as the UE 116) is configured a set of co-scheduled cells. In step 1720, the UE is configured a cell-specific scheduling parameter for multi-cell scheduling. In step 1730, the UE is configured an adjustment parameter for the cell-specific scheduling parameter for each cell from the set of co-scheduled cells. In step 1740, the UE receives a DCI format with an indication for co-scheduling a first cell and a second cell from the set of co-scheduled cells. In step 1750, the UE receives, in the DCI format, a reference value for the cell-specific parameter. In step 1760, the UE determines, for the cell-specific parameter, a first value corresponding to a first PDSCH/PUSCH on the first cell, based on the reference value and the configured adjustment parameter for the first cell. In step 1770, the UE determines, for the cell-specific parameter, a second value corresponding to a second PDSCH/PUSCH on the second cell, based on the reference value and the configured adjustment parameter for the second cell. In step 1780, the UE receives the first and second PDSCHs or transmits the first and second PUSCHs, respectively, on the first and second co-scheduled cells based on the determined first value and second value for the cell-specific scheduling parameter.

In one example, various approaches described in the above embodiments can be combined. For instance: (i) the UE determines values of a first set of cell-common scheduling information parameters from a corresponding set of cell-common DCI fields; and (ii) the UE determines values for a second set of cell-specific scheduling information parameters based on reinterpretation, for each of the co-scheduled cells, of a corresponding set of DCI fields with multi-cell mapping; and (iii) the UE determines values for remaining scheduling information parameters, for each of the co-scheduled cells, per predetermined values in specifications or based on higher layer configuration.

In one example, specifications for system operation can support multiple approaches from the various approaches described in the above embodiments. For example, the UE can be configured multiple approaches for multi-cell scheduling and determine an approach from the multiple approaches based on, for example, a number of co-scheduled cells, or a measurement of reference signals associated with the multiple PDSCHs/PUSCH.

In one example, a DCI format for multi-cell scheduling or any scheduling information block or DCI field that is used for multi-cell scheduling can have a configurable size, namely bit-width.

Although FIG. 14 illustrates the method 1400, FIG. 15 illustrates the method 1500, FIG. 16 illustrates the method 1600, and FIG. 17 illustrates the method 1700 of FIGS. 14-17. For example, while the method 800 and the method 900 are shown as a series of steps, various steps could overlap, occur in parallel, occur in a different order, or occur multiple times. In another example, steps may be omitted or replaced by other steps. For example, steps of the method 1400, the method 1500, the method 1600 and the method 1700 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
receiving first information for:
  a first number of sets of serving cells, and
  a first number of indexes having a one-to-one mapping with the first number of sets of serving cells;
receiving a first physical downlink control channel (PDCCH) that provides a first downlink control information (DCI) format, wherein:
  the first DCI format includes a first index from the first number of indexes, and
  the first index maps to a first set of serving cells from the first number of sets of serving cells;
determining first parameters for reception of first physical downlink shared channels (PDSCHs) or for transmission of first physical uplink shared channel (PUSCHs) on the first set of serving cells based on values of fields of the first DCI format; and
receiving the first PDSCHs or transmitting the first PUSCHs on the first set of serving cells based on the first parameters.

2. The method of claim 1, further comprising:
reporting a first capability for a maximum value for the first number of sets of serving cells.

3. The method of claim 1, further comprising:
reporting a first capability for a maximum number of cells in any of the first number of sets of serving cells for PDSCH reception, and
reporting a second capability for a maximum number of cells in any of the first number of sets of serving cells for PUSCH transmission.

4. The method of claim 1, further comprising:
receiving second information for:
  a second number of sets of serving cells, and
  a third PDCCH that provides a third DCI format, wherein:
    the second number of sets of serving cells is different than the first number of sets of serving cells,
    the third DCI format schedules only PUSCH transmissions on a second set of serving cells from the second number of sets of serving cells, and
    the first DCI format schedules only PDSCH receptions on the first set of serving cells from the first number of sets of serving cells.

5. The method of claim 1, further comprising:
receiving second information that indicates:
  a number of second indexes having a one-to-one mapping with the first number of sets of serving cells, and
  a number of UE-specific search space sets; and
determining a second index, from the second number of indexes, that is mapped to the first set of serving cells,
wherein receiving the first PDCCH comprises receiving the first PDCCH in a UE-specific search space set, from the number of UE-specific search space sets, corresponding to the second index.

6. The method of claim 1, further comprising:
determining acknowledgement information associated with the first PDSCH receptions;
determining a first slot for transmission of a physical uplink control channel (PUCCH) based on a slot offset value from a second slot for a PUCCH transmission that overlaps with a slot of a PDSCH reception, from the first PDSCH receptions, that ends last, wherein the slot offset value is indicated by the second DCI format; and
transmitting the PUCCH with the acknowledgement information in the first slot.

7. The method of claim 1, further comprising:
receiving second information for:
  a number of sets of values for a parameter for PDSCH receptions or PUSCH transmissions associated with the first set of serving cells, and
  a first mapping among a number of values for a field in the first DCI format and the number of sets of values for the parameter, wherein each set of values for the parameter, from the number of sets of values for the parameter, includes a respective value for the parameter for a respective PDSCH reception or a respective PUSCH transmission on a respective serving cell from the first set of serving cells; and
determining based on the first mapping, a set of values for the parameter, from the number of sets of values for the parameter, mapped to a value from the number of values for the field, wherein the value is provided by the field in the first DCI format;
wherein receiving the first PDSCHs or transmitting the first PUSCHs further comprises receiving the first PDSCHs or transmitting the first PUSCHs based on the set of values for the parameter.

8. A user equipment (UE) comprising:
a transceiver configured to:
receive first information for:
a first number of sets of serving cells, and
a first number of indexes having a one-to-one mapping with the first number of sets of serving cells;
receive a first physical downlink control channel (PDCCH) that provides a first downlink control information (DCI) format, wherein:
the first DCI format includes a first index from the first number of indexes, and
the first index maps to a first set of serving cells from the first number of sets of serving cells; and
a processor operably coupled to the transceiver, the processor configured to determine first parameters for reception of first physical downlink shared channels (PDSCHs) or for transmission of first physical uplink shared channel (PUSCHs) on the first set of serving cells based on values of fields of the first DCI format,
wherein the transceiver is further configured to receive the first PDSCHs or transmit the first PUSCHs on the first set of serving cells based on the first parameters.

9. The UE of claim 8, wherein the transceiver is further configured to report a first capability for a maximum value for the first number of sets of serving cells.

10. The UE of claim 8, wherein the transceiver is further configured to:
report a first capability for a maximum number of cells in any of the first number of sets of serving cells for PDSCH reception, and
report a second capability for a maximum number of cells in any of the first number of sets of serving cells for PUSCH transmission.

11. The UE of claim 8, wherein the transceiver is further configured to receive second information for:
a second number of sets of serving cells, and
a third PDCCH that provides a third DCI format, wherein:
the second number of sets of serving cells is different than the first number of sets of serving cells,
the third DCI format schedules only PUSCH transmissions on a second set of serving cells from the second number of sets of serving cells, and
the first DCI format schedules only PDSCH receptions on the first set of serving cells from the first number of sets of serving cells.

12. The UE of claim 8, wherein:
the transceiver is further configured to receive second information that indicates:
a number of second indexes having a one-to-one mapping with the first number of sets of serving cells, and
a number of UE-specific search space sets;
the processor is further configured to determine a second index, from the second number of indexes, that is mapped to the first set of serving cells; and
the transceiver is further configured to receive the first PDCCH in a UE-specific search space set, from the number of UE-specific search space sets, corresponding to the second index.

13. The UE of claim 8, wherein:
the processor is further configured to:
determine acknowledgement information associated with the first PDSCH receptions;
determine a first slot for transmission of a physical uplink control channel (PUCCH) based on a slot offset value from a second slot for a PUCCH transmission that overlaps with a slot of a PDSCH reception, from the first PDSCH receptions, that ends last, wherein the slot offset value is indicated by the second DCI format, and
the transceiver is further configured to transmit the PUCCH with the acknowledgement information in the first slot.

14. The UE of claim 8, wherein:
the transceiver is further configured to receive second information for:
a number of sets of values for a parameter for the first-PDSCH receptions or PUSCH transmissions associated with the first set of serving cells, and
a first mapping among a number of values for a field in the first DCI format and the number of sets of values for the parameter, wherein each set of values for the parameter, from the number of sets of values for the parameter, includes a respective value for the parameter for a respective PDSCH reception or a respective PUSCH transmission on a respective serving cell from the first set of serving cells,
the processor is further configured to determine based on the first mapping, a set of values for the parameter, from the number of sets of values for the parameter, mapped to a value from the number of values for the field, wherein the value is provided by the field in the first DCI format, and
the transceiver is further configured to receive the first PDSCHs or transmit the first PUSCHs based on the set of values for the parameter.

15. A base station comprising:
a transceiver configured to;
transmit first information for:
a first number of sets of serving cells, and
a first number of indexes having a one-to-one mapping with the first number of sets of serving cells;
transmit a first physical downlink control channel (PDCCH) that provides a first downlink control information (DCI) format, wherein:
the first DCI format includes a first index from the first number of indexes, and
the first index maps to a first set of serving cells from the first number of sets of serving cells; and
a processor operably coupled to the transceiver, the processor configured to determine first parameters for transmission of first physical downlink shared channels (PDSCHs) or for reception of first physical uplink shared channel (PUSCHs) on the first set of serving cells from the first number of sets of serving cells-based on values of fields of the first DCI format,
wherein the transceiver is further configured to: transmit the first PDSCHs or receive the first PUSCHs on the first set of serving cells based on the first parameters.

16. The base station of claim 15, wherein the transceiver is further configured to receive a reporting for a first capability for a maximum value for the first number of sets of serving cells.

17. The base station of claim 15, wherein the transceiver is further configured to:
receive a report for a first capability for a maximum number of cells in any of the first number of sets of serving cells for PDSCH reception, and
receive a report for a second capability for a maximum number of cells in any of the first number of sets of serving cells for PUSCH transmission.

18. The base station of claim 15, wherein the transceiver is further configured to transmit second information for:
a second number of sets of serving cells, and a third DCI format, wherein:
  the second number of sets of serving cells is different than the first number of sets of serving cells,
  the third DCI format schedules only PUSCH reception on a second set of serving cells from the second number of sets of serving cells, and
  the first DCI format schedules only PDSCH transmission on the first set of serving cells from the first number of sets of serving cells.

19. The base station of claim 15, wherein:
the transceiver is further configured to transmit second information that indicates:
  a number of second indexes having a one-to-one mapping with the first number of sets of serving cells, and
  a number of UE-specific search space sets;
the processor is further configured to determine a second index, from the number of second indexes, that is mapped to the first set of serving cells; and
the transceiver is further configured to transmit the first PDCCH in a UE-specific search space set, from the number of UE-specific search space sets, corresponding to the second index.

20. The base station of claim 15, wherein:
the processor is configured to determine a first slot for reception of a physical uplink control channel (PUCCH) based on a slot offset value from a second slot for a PUCCH reception that overlaps with a slot of a PDSCH transmission, from the first PDSCH transmissions, that ends last,
the slot offset value is indicated by the second DCI format,
the PUCCH includes acknowledgement information associated with the first PDSCH transmissions, and
the transceiver is further configured to receive the PUCCH with the acknowledgement information in the first slot.

* * * * *